United States Patent
Tasci

(10) Patent No.: US 11,868,531 B1
(45) Date of Patent: Jan. 9, 2024

(54) WEARABLE DEVICE PROVIDING FOR THUMB-TO-FINGER-BASED INPUT GESTURES DETECTED BASED ON NEUROMUSCULAR SIGNALS, AND SYSTEMS AND METHODS OF USE THEREOF

(71) Applicant: META PLATFORMS TECHNOLOGIES, LLC, Menlo Park, CA (US)

(72) Inventor: Tugce Tasci, New York, NY (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/576,815

(22) Filed: Jan. 14, 2022

Related U.S. Application Data

(60) Provisional application No. 63/172,588, filed on Apr. 8, 2021.

(51) Int. Cl.
    *G06F 3/01* (2006.01)
    *G06N 20/00* (2019.01)
    (Continued)

(52) U.S. Cl.
    CPC .............. *G06F 3/015* (2013.01); *G06F 1/163* (2013.01); *G06F 3/014* (2013.01); *G06F 3/017* (2013.01);
    (Continued)

(58) Field of Classification Search
    CPC .......... G06F 3/015; G06F 1/163; G06F 3/014; G06F 3/017; G06F 3/023; G06N 20/00; G06T 19/006
    See application file for complete search history.

(56) References Cited

U.S. PATENT DOCUMENTS

| 1,411,995 A | 4/1922 | Dull |
| 3,408,133 A | 10/1968 | Lee |

(Continued)

FOREIGN PATENT DOCUMENTS

| CA | 2902045 A1 | 8/2014 |
| CA | 2921954 A1 | 2/2015 |

(Continued)

OTHER PUBLICATIONS

Brownlee J., "Finite State Machines (FSM): Finite State Machines as a Control Technique in Artificial Intelligence (AI)," FSM, Jun. 2002, 12 pages.

(Continued)

*Primary Examiner* — Afroza Chowdhury
(74) *Attorney, Agent, or Firm* — Morgan, Lewis & Bockius LLP

(57) ABSTRACT

Methods of causing performance of commands at a computing device based on neuromuscular signals from thumb-initiated gestures are provided. A method includes receiving, by a wearable device, a sequence of neuromuscular signals indicating that a user is instructing a thumb on the user's hand to contact a portion of the user's hand. The portion of the user's hand is associated with at least one input command available at a computing device. The method further includes responsive to receiving the sequence of neuromuscular signals, providing, by the wearable device, data to cause the computing device to perform the at least one input command. The method also includes in response to receiving a second sequence of neuromuscular signals indicating that the user is instructing the thumb on the user's hand to contact the portion of the user's hand twice, providing data to cause the computing device to perform a second input command.

20 Claims, 15 Drawing Sheets

(51) Int. Cl.
　　　*G06F 1/16* 　　　(2006.01)
　　　*G06T 19/00* 　　　(2011.01)
　　　*G06F 3/023* 　　　(2006.01)

(52) U.S. Cl.
　　　CPC ............. *G06F 3/023* (2013.01); *G06N 20/00* (2019.01); *G06T 19/006* (2013.01)

(56) References Cited

U.S. PATENT DOCUMENTS

| | | |
|---|---|---|
| 3,580,243 A | 5/1971 | Johnson |
| 3,620,208 A | 11/1971 | Wayne et al. |
| 3,712,716 A | 1/1973 | Cornsweet et al. |
| 3,735,425 A | 5/1973 | Hoshall et al. |
| 3,880,146 A | 4/1975 | Everett et al. |
| 4,055,168 A | 10/1977 | Miller et al. |
| 4,602,639 A | 7/1986 | Hoogendoorn et al. |
| 4,705,408 A | 11/1987 | Jordi |
| 4,817,064 A | 3/1989 | Milles |
| 4,896,120 A | 1/1990 | Kamil |
| 4,978,213 A | 12/1990 | El Hage |
| 5,003,978 A | 4/1991 | Dunseath, Jr. |
| D322,227 S | 12/1991 | Warhol |
| 5,081,852 A | 1/1992 | Cox |
| 5,103,323 A | 4/1992 | Magarinos et al. |
| 5,231,674 A | 7/1993 | Cleveland et al. |
| 5,251,189 A | 10/1993 | Thorp |
| D348,660 S | 7/1994 | Parsons |
| 5,445,869 A | 8/1995 | Ishikawa et al. |
| 5,462,065 A | 10/1995 | Cusimano |
| 5,467,104 A | 11/1995 | Furness, III et al. |
| 5,482,051 A | 1/1996 | Reddy et al. |
| 5,589,956 A | 12/1996 | Morishima et al. |
| 5,596,339 A | 1/1997 | Furness, III et al. |
| 5,605,059 A | 2/1997 | Woodward |
| 5,625,577 A | 4/1997 | Kunii et al. |
| 5,683,404 A | 11/1997 | Johnson |
| 5,742,421 A | 4/1998 | Wells et al. |
| 6,005,548 A | 12/1999 | Latypov et al. |
| 6,008,781 A | 12/1999 | Furness, III et al. |
| 6,009,210 A | 12/1999 | Kang |
| 6,027,216 A | 2/2000 | Guyton et al. |
| 6,032,530 A | 3/2000 | Hock |
| D422,617 S | 4/2000 | Simioni |
| 6,066,794 A | 5/2000 | Longo |
| 6,184,847 B1 | 2/2001 | Fateh et al. |
| 6,236,476 B1 | 5/2001 | Son et al. |
| 6,238,338 B1 | 5/2001 | DeLuca et al. |
| 6,244,873 B1 | 6/2001 | Hill et al. |
| 6,317,103 B1 | 11/2001 | Furness, III et al. |
| 6,377,277 B1 | 4/2002 | Yamamoto |
| D459,352 S | 6/2002 | Giovanniello |
| 6,411,843 B1 | 6/2002 | Zarychta |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,639,570 B2 | 10/2003 | Furness, III et al. |
| 6,658,287 B1 | 12/2003 | Litt et al. |
| 6,720,984 B1 | 4/2004 | Jorgensen et al. |
| 6,743,982 B2 | 6/2004 | Biegelsen et al. |
| 6,771,294 B1 | 8/2004 | Pulli et al. |
| 6,774,885 B1 | 8/2004 | Even-Zohar |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,901,286 B1 | 5/2005 | Sinderby et al. |
| 6,927,343 B2 | 8/2005 | Watanabe et al. |
| 6,942,621 B2 | 9/2005 | Avinash et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,028,507 B2 | 4/2006 | Rapport |
| 7,086,218 B1 | 8/2006 | Pasach |
| 7,089,148 B1 | 8/2006 | Bachmann et al. |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,351,975 B2 | 4/2008 | Brady et al. |
| 7,450,107 B2 | 11/2008 | Radley-Smith |
| 7,473,888 B2 | 1/2009 | Wine et al. |
| 7,491,892 B2 | 2/2009 | Wagner et al. |
| 7,517,725 B2 | 4/2009 | Reis |
| 7,558,622 B2 | 7/2009 | Tran |
| 7,574,253 B2 | 8/2009 | Edney et al. |
| 7,580,742 B2 | 8/2009 | Tan et al. |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,684,105 B2 | 3/2010 | Lamontagne et al. |
| 7,747,113 B2 | 6/2010 | Mukawa et al. |
| 7,761,390 B2 | 7/2010 | Ford |
| 7,773,111 B2 | 8/2010 | Cleveland et al. |
| 7,787,946 B2 | 8/2010 | Stahmann et al. |
| 7,805,386 B2 | 9/2010 | Greer |
| 7,809,435 B1 | 10/2010 | Ettare et al. |
| 7,844,310 B2 | 11/2010 | Anderson |
| D628,616 S | 12/2010 | Yuan |
| 7,850,306 B2 | 12/2010 | Uusitalo et al. |
| 7,870,211 B2 | 1/2011 | Pascal et al. |
| D633,939 S | 3/2011 | Puentes et al. |
| D634,771 S | 3/2011 | Fuchs |
| 7,901,368 B2 | 3/2011 | Flaherty et al. |
| 7,925,100 B2 | 4/2011 | Howell et al. |
| 7,948,763 B2 | 5/2011 | Chuang |
| D640,314 S | 6/2011 | Yang |
| D643,428 S | 8/2011 | Janky et al. |
| D646,192 S | 10/2011 | Woode |
| D649,177 S | 11/2011 | Cho et al. |
| 8,054,061 B2 | 11/2011 | Prance et al. |
| D654,622 S | 2/2012 | Hsu |
| 8,120,828 B2 | 2/2012 | Schwerdtner |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| 8,190,249 B1 | 5/2012 | Gharieb et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| D667,482 S | 9/2012 | Healy et al. |
| D669,522 S | 10/2012 | Klinar et al. |
| D669,523 S | 10/2012 | Wakata et al. |
| D671,590 S | 11/2012 | Klinar et al. |
| 8,311,623 B2 | 11/2012 | Sanger |
| 8,348,538 B2 | 1/2013 | Van Loenen et al. |
| 8,351,651 B2 | 1/2013 | Lee |
| 8,355,671 B2 | 1/2013 | Kramer et al. |
| 8,384,683 B2 | 2/2013 | Luo |
| 8,386,025 B2 | 2/2013 | Hoppe |
| 8,389,862 B2 | 3/2013 | Arora et al. |
| 8,421,634 B2 | 4/2013 | Tan et al. |
| 8,427,977 B2 | 4/2013 | Workman et al. |
| D682,343 S | 5/2013 | Waters |
| D682,727 S | 5/2013 | Bulgari |
| 8,435,191 B2 | 5/2013 | Barboutis et al. |
| 8,437,844 B2 | 5/2013 | Syed Momen et al. |
| 8,447,704 B2 | 5/2013 | Tan et al. |
| D685,019 S | 6/2013 | Li |
| 8,467,270 B2 | 6/2013 | Gossweiler, III et al. |
| 8,469,741 B2 | 6/2013 | Oster et al. |
| D687,087 S | 7/2013 | Iurilli |
| 8,484,022 B1 | 7/2013 | Vanhoucke |
| D689,862 S | 9/2013 | Liu |
| 8,570,273 B1 | 10/2013 | Smith |

(56) References Cited

U.S. PATENT DOCUMENTS

| | | |
|---|---|---|
| D692,941 S | 11/2013 | Klinar et al. |
| 8,591,411 B2 | 11/2013 | Banet et al. |
| D695,333 S | 12/2013 | Farnam et al. |
| D695,454 S | 12/2013 | Moore |
| 8,620,361 B2 | 12/2013 | Bailey et al. |
| 8,624,124 B2 | 1/2014 | Koo et al. |
| 8,634,119 B2 | 1/2014 | Bablumyan et al. |
| D701,555 S | 3/2014 | Markovitz et al. |
| 8,666,212 B1 | 3/2014 | Amirparviz |
| 8,702,629 B2 | 4/2014 | Giuffrida et al. |
| 8,704,882 B2 | 4/2014 | Turner |
| D704,248 S | 5/2014 | Dichiara |
| 8,718,980 B2 | 5/2014 | Garudadri et al. |
| 8,743,052 B1 | 6/2014 | Keller et al. |
| 8,744,543 B2 | 6/2014 | Li et al. |
| 8,754,862 B2 | 6/2014 | Zaliva |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,880,163 B2 | 11/2014 | Barachant et al. |
| 8,883,287 B2 | 11/2014 | Boyce et al. |
| 8,890,875 B2 | 11/2014 | Jammes et al. |
| 8,892,479 B2 | 11/2014 | Tan et al. |
| 8,895,865 B2 | 11/2014 | Lenahan et al. |
| D719,568 S | 12/2014 | Heinrich et al. |
| D719,570 S | 12/2014 | Heinrich et al. |
| 8,912,094 B2 | 12/2014 | Koo et al. |
| 8,914,472 B1 | 12/2014 | Lee et al. |
| 8,922,481 B1 | 12/2014 | Kauffmann et al. |
| D723,093 S | 2/2015 | Li |
| 8,954,135 B2 | 2/2015 | Yuen et al. |
| D724,647 S | 3/2015 | Rohrbach |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,037,530 B2 | 5/2015 | Tan et al. |
| 9,086,687 B2 | 7/2015 | Park et al. |
| 9,092,664 B2 | 7/2015 | Forutanpour et al. |
| D736,664 S | 8/2015 | Paradise et al. |
| 9,107,586 B2 | 8/2015 | Tran |
| D738,373 S | 9/2015 | Davies et al. |
| 9,135,708 B2 | 9/2015 | Ebisawa |
| 9,146,730 B2 | 9/2015 | Lazar |
| D741,855 S | 10/2015 | Park et al. |
| 9,170,674 B2 | 10/2015 | Forutanpour et al. |
| D742,272 S | 11/2015 | Bailey et al. |
| D742,874 S | 11/2015 | Cheng et al. |
| D743,963 S | 11/2015 | Osterhout |
| 9,182,826 B2 | 11/2015 | Powledge et al. |
| 9,211,417 B2 | 12/2015 | Heldman et al. |
| 9,218,574 B2 | 12/2015 | Phillipps et al. |
| D747,714 S | 1/2016 | Erbeus |
| D747,759 S | 1/2016 | Ho |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |
| D756,359 S | 5/2016 | Bailey et al. |
| 9,329,694 B2 | 5/2016 | Slonneger |
| 9,341,659 B2 | 5/2016 | Poupyrev et al. |
| 9,349,280 B2 | 5/2016 | Baldwin et al. |
| 9,351,653 B1 | 5/2016 | Harrison |
| D758,476 S | 6/2016 | Ho |
| D760,313 S | 6/2016 | Ho et al. |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,393,418 B2 | 7/2016 | Giuffrida et al. |
| 9,402,582 B1 | 8/2016 | Parviz et al. |
| 9,408,316 B2 | 8/2016 | Bailey et al. |
| 9,418,927 B2 | 8/2016 | Axisa et al. |
| D766,895 S | 9/2016 | Choi |
| 9,439,566 B2 | 9/2016 | Arne et al. |
| D768,627 S | 10/2016 | Rochat et al. |
| 9,459,697 B2 | 10/2016 | Bedikian et al. |
| 9,472,956 B2 | 10/2016 | Michaelis et al. |
| 9,477,313 B2 | 10/2016 | Mistry et al. |
| D771,735 S | 11/2016 | Lee et al. |
| 9,483,123 B2 | 11/2016 | Aleem et al. |
| 9,529,434 B2 | 12/2016 | Choi et al. |
| D780,828 S | 3/2017 | Bonaventura et al. |
| D780,829 S | 3/2017 | Bonaventura et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,652,047 B2 | 5/2017 | Mullins et al. |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,807,221 B2 | 10/2017 | Bailey et al. |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 9,921,641 B1 | 3/2018 | Worley, III et al. |
| 9,996,983 B2 | 6/2018 | Mullins |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,185,416 B2 | 1/2019 | Mistry et al. |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,429,928 B2 | 10/2019 | Morun et al. |
| 10,437,335 B2 | 10/2019 | Daniels |
| 10,460,455 B2 | 10/2019 | Giurgica-Tiron et al. |
| 10,489,986 B2 | 11/2019 | Kaifosh et al. |
| 10,496,168 B2 | 12/2019 | Kaifosh et al. |
| 10,504,286 B2 | 12/2019 | Kaifosh et al. |
| 10,520,378 B1 | 12/2019 | Brown et al. |
| 10,528,135 B2 | 1/2020 | Bailey et al. |
| 10,558,273 B2 | 2/2020 | Park et al. |
| 10,592,001 B2 | 3/2020 | Berenzweig et al. |
| 10,610,737 B1 | 4/2020 | Crawford |
| 10,676,083 B1 | 6/2020 | De Sapio et al. |
| 10,687,759 B2 | 6/2020 | Guo et al. |
| 10,905,350 B2 | 2/2021 | Berenzweig et al. |
| 10,905,383 B2 | 2/2021 | Barachant |
| 10,937,414 B2 | 3/2021 | Berenzweig et al. |
| 10,990,174 B2 | 4/2021 | Kaifosh et al. |
| 11,009,951 B2 | 5/2021 | Bailey et al. |
| 11,150,730 B1 | 10/2021 | Anderson et al. |
| 2001/0033402 A1 | 10/2001 | Popovich |
| 2002/0003627 A1 | 1/2002 | Rieder |
| 2002/0009972 A1 | 1/2002 | Amento et al. |
| 2002/0030636 A1 | 3/2002 | Richards |
| 2002/0032386 A1 | 3/2002 | Sackner et al. |
| 2002/0077534 A1 | 6/2002 | DuRousseau |
| 2002/0094701 A1 | 7/2002 | Biegelsen et al. |
| 2002/0120415 A1 | 8/2002 | Millott et al. |
| 2002/0120916 A1 | 8/2002 | Snider, Jr. |
| 2002/0198472 A1 | 12/2002 | Kramer |
| 2003/0030595 A1 | 2/2003 | Radley-Smith |
| 2003/0036691 A1 | 2/2003 | Stanaland et al. |
| 2003/0051505 A1 | 3/2003 | Robertson et al. |
| 2003/0144586 A1 | 7/2003 | Tsubata |

(56) References Cited

U.S. PATENT DOCUMENTS

| | | |
|---|---|---|
| 2003/0144829 A1 | 7/2003 | Geatz et al. |
| 2003/0171921 A1 | 9/2003 | Manabe et al. |
| 2003/0182630 A1 | 9/2003 | Saund et al. |
| 2003/0184544 A1 | 10/2003 | Prudent |
| 2004/0010210 A1 | 1/2004 | Avinash et al. |
| 2004/0024312 A1 | 2/2004 | Zheng |
| 2004/0054273 A1 | 3/2004 | Finneran et al. |
| 2004/0068409 A1 | 4/2004 | Tanaka et al. |
| 2004/0073104 A1 | 4/2004 | Brun Del Re et al. |
| 2004/0080499 A1 | 4/2004 | Lui |
| 2004/0092839 A1 | 5/2004 | Shin et al. |
| 2004/0194500 A1 | 10/2004 | Rapport |
| 2004/0210165 A1 | 10/2004 | Marmaropoulos et al. |
| 2004/0243342 A1 | 12/2004 | Rekimoto |
| 2004/0254617 A1 | 12/2004 | Hemmerling et al. |
| 2005/0005637 A1 | 1/2005 | Rapport |
| 2005/0012715 A1 | 1/2005 | Ford |
| 2005/0070227 A1 | 3/2005 | Shen et al. |
| 2005/0070791 A1 | 3/2005 | Edney et al. |
| 2005/0115561 A1 | 6/2005 | Stahmann et al. |
| 2005/0119701 A1 | 6/2005 | Lauter et al. |
| 2005/0177038 A1 | 8/2005 | Kolpin et al. |
| 2005/0179644 A1 | 8/2005 | Alsio et al. |
| 2006/0018833 A1 | 1/2006 | Murphy et al. |
| 2006/0037359 A1 | 2/2006 | Stinespring |
| 2006/0058699 A1 | 3/2006 | Mtiello et al. |
| 2006/0061544 A1 | 3/2006 | Min et al. |
| 2006/0121958 A1 | 6/2006 | Jung et al. |
| 2006/0129057 A1 | 6/2006 | Maekawa et al. |
| 2006/0132705 A1 | 6/2006 | Li |
| 2006/0149338 A1 | 7/2006 | Flaherty et al. |
| 2006/0211956 A1 | 9/2006 | Sankai |
| 2006/0238707 A1 | 10/2006 | Elvesjo et al. |
| 2007/0009151 A1 | 1/2007 | Pittman et al. |
| 2007/0016265 A1 | 1/2007 | Davoodi et al. |
| 2007/0023662 A1 | 2/2007 | Brady et al. |
| 2007/0078308 A1 | 4/2007 | Daly |
| 2007/0132785 A1 | 6/2007 | Ebersole, Jr. et al. |
| 2007/0148624 A1 | 6/2007 | Nativ |
| 2007/0172797 A1 | 7/2007 | Hada et al. |
| 2007/0177770 A1 | 8/2007 | Derchak et al. |
| 2007/0185697 A1 | 8/2007 | Tan et al. |
| 2007/0256494 A1 | 11/2007 | Nakamura et al. |
| 2007/0276270 A1 | 11/2007 | Tran |
| 2007/0279852 A1 | 12/2007 | Daniel et al. |
| 2007/0285399 A1 | 12/2007 | Lund |
| 2008/0001735 A1 | 1/2008 | Tran |
| 2008/0032638 A1 | 2/2008 | Anderson |
| 2008/0051673 A1 | 2/2008 | Kong et al. |
| 2008/0052643 A1 | 2/2008 | Ike et al. |
| 2008/0058668 A1 | 3/2008 | Seyed Momen et al. |
| 2008/0103639 A1 | 5/2008 | Troy et al. |
| 2008/0103769 A1 | 5/2008 | Schultz et al. |
| 2008/0136775 A1 | 6/2008 | Conant |
| 2008/0152217 A1 | 6/2008 | Greer |
| 2008/0163130 A1 | 7/2008 | Westerman |
| 2008/0214360 A1 | 9/2008 | Stirling et al. |
| 2008/0221487 A1 | 9/2008 | Zohar et al. |
| 2008/0262772 A1 | 10/2008 | Luinge et al. |
| 2008/0278497 A1 | 11/2008 | Jammes et al. |
| 2008/0285805 A1 | 11/2008 | Luinge et al. |
| 2009/0005700 A1 | 1/2009 | Joshi et al. |
| 2009/0007597 A1 | 1/2009 | Hanevold |
| 2009/0027337 A1 | 1/2009 | Hildreth |
| 2009/0031757 A1 | 2/2009 | Harding |
| 2009/0040016 A1 | 2/2009 | Ikeda |
| 2009/0051544 A1 | 2/2009 | Niknejad |
| 2009/0079607 A1 | 3/2009 | Denison et al. |
| 2009/0079813 A1 | 3/2009 | Hildreth |
| 2009/0082692 A1 | 3/2009 | Hale et al. |
| 2009/0082701 A1 | 3/2009 | Zohar et al. |
| 2009/0085864 A1 | 4/2009 | Kutliroff et al. |
| 2009/0102580 A1 | 4/2009 | Uchaykin |
| 2009/0109241 A1 | 4/2009 | Tsujimoto |
| 2009/0112080 A1 | 4/2009 | Matthews |
| 2009/0124881 A1 | 5/2009 | Rytky |
| 2009/0147004 A1 | 6/2009 | Ramon et al. |
| 2009/0179824 A1 | 7/2009 | Tsujimoto et al. |
| 2009/0189864 A1 | 7/2009 | Walker et al. |
| 2009/0189867 A1 | 7/2009 | Krah et al. |
| 2009/0195497 A1 | 8/2009 | Fitzgerald et al. |
| 2009/0204031 A1 | 8/2009 | McNames et al. |
| 2009/0207464 A1 | 8/2009 | Wiltshire et al. |
| 2009/0209878 A1 | 8/2009 | Sanger |
| 2009/0251407 A1 | 10/2009 | Flake et al. |
| 2009/0258669 A1 | 10/2009 | Nie et al. |
| 2009/0265671 A1 | 10/2009 | Sachs et al. |
| 2009/0318785 A1 | 12/2009 | Ishikawa et al. |
| 2009/0319230 A1 | 12/2009 | Case, Jr. et al. |
| 2009/0322653 A1 | 12/2009 | Putilin et al. |
| 2009/0326406 A1 | 12/2009 | Tan et al. |
| 2009/0327171 A1 | 12/2009 | Tan et al. |
| 2010/0030532 A1 | 2/2010 | Arora et al. |
| 2010/0041974 A1 | 2/2010 | Ting et al. |
| 2010/0063794 A1 | 3/2010 | Hernandez-Rebollar |
| 2010/0066664 A1 | 3/2010 | Son et al. |
| 2010/0106044 A1 | 4/2010 | Linderman |
| 2010/0113910 A1 | 5/2010 | Brauers et al. |
| 2010/0142015 A1 | 6/2010 | Kuwahara et al. |
| 2010/0149073 A1 | 6/2010 | Chaum et al. |
| 2010/0150415 A1 | 6/2010 | Atkinson et al. |
| 2010/0228487 A1 | 9/2010 | Leuthardt et al. |
| 2010/0234696 A1 | 9/2010 | Li et al. |
| 2010/0240981 A1 | 9/2010 | Barboutis et al. |
| 2010/0249635 A1 | 9/2010 | Van Der Reijden |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0306713 A1 | 12/2010 | Geisner et al. |
| 2010/0315266 A1 | 12/2010 | Gunawardana et al. |
| 2010/0317958 A1 | 12/2010 | Beck et al. |
| 2011/0007035 A1 | 1/2011 | Shai |
| 2011/0018754 A1 | 1/2011 | Tojima et al. |
| 2011/0025982 A1 | 2/2011 | Takahashi |
| 2011/0054360 A1 | 3/2011 | Son et al. |
| 2011/0065319 A1 | 3/2011 | Oster et al. |
| 2011/0066381 A1 | 3/2011 | Garudadri et al. |
| 2011/0072510 A1 | 3/2011 | Cheswick |
| 2011/0077484 A1 | 3/2011 | Van Slyke et al. |
| 2011/0082838 A1 | 4/2011 | Niemela |
| 2011/0092826 A1 | 4/2011 | Lee et al. |
| 2011/0119216 A1 | 5/2011 | Wigdor |
| 2011/0133934 A1 | 6/2011 | Tan et al. |
| 2011/0134026 A1 | 6/2011 | Kang et al. |
| 2011/0151974 A1 | 6/2011 | Deaguero |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0173574 A1 | 7/2011 | Clavin et al. |
| 2011/0181527 A1 | 7/2011 | Capela et al. |
| 2011/0205242 A1 | 8/2011 | Friesen |
| 2011/0213278 A1 | 9/2011 | Horak et al. |
| 2011/0221672 A1 | 9/2011 | Osterhout et al. |
| 2011/0224507 A1 | 9/2011 | Banet et al. |
| 2011/0224556 A1 | 9/2011 | Moon et al. |
| 2011/0224564 A1 | 9/2011 | Moon et al. |
| 2011/0230782 A1 | 9/2011 | Bartol et al. |
| 2011/0248914 A1 | 10/2011 | Sherr |
| 2011/0262002 A1 | 10/2011 | Lee |
| 2011/0270135 A1 | 11/2011 | Dooley et al. |
| 2011/0295100 A1 | 12/2011 | Hegde et al. |
| 2011/0313762 A1 | 12/2011 | Ben-David et al. |
| 2012/0002256 A1 | 1/2012 | Lacoste et al. |
| 2012/0007821 A1 | 1/2012 | Zaliva |
| 2012/0029322 A1 | 2/2012 | Wartena et al. |
| 2012/0051005 A1 | 3/2012 | Vanfleteren et al. |
| 2012/0052268 A1 | 3/2012 | Axisa et al. |
| 2012/0053439 A1 | 3/2012 | Ylostalo et al. |
| 2012/0066163 A1 | 3/2012 | Balls et al. |
| 2012/0071092 A1 | 3/2012 | Pasquero et al. |
| 2012/0071780 A1 | 3/2012 | Barachant et al. |
| 2012/0101357 A1 | 4/2012 | Hoskuldsson et al. |

(56) References Cited

U.S. PATENT DOCUMENTS

| | | |
|---|---|---|
| 2012/0117514 A1 | 5/2012 | Kim et al. |
| 2012/0139817 A1 | 6/2012 | Freeman |
| 2012/0157789 A1 | 6/2012 | Kangas et al. |
| 2012/0157886 A1 | 6/2012 | Tenn et al. |
| 2012/0165695 A1 | 6/2012 | Kidmose et al. |
| 2012/0182309 A1 | 7/2012 | Griffin et al. |
| 2012/0184838 A1 | 7/2012 | John |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0226130 A1 | 9/2012 | De Graff et al. |
| 2012/0249797 A1 | 10/2012 | Haddick et al. |
| 2012/0265090 A1 | 10/2012 | Fink et al. |
| 2012/0265480 A1 | 10/2012 | Oshima |
| 2012/0275621 A1 | 11/2012 | Elko |
| 2012/0283526 A1 | 11/2012 | Gommesen et al. |
| 2012/0283896 A1 | 11/2012 | Persaud et al. |
| 2012/0293548 A1 | 11/2012 | Perez et al. |
| 2012/0302858 A1 | 11/2012 | Kidmose et al. |
| 2012/0320532 A1 | 12/2012 | Wang |
| 2012/0323521 A1 | 12/2012 | De Foras et al. |
| 2013/0004033 A1 | 1/2013 | Trugenberger |
| 2013/0005303 A1 | 1/2013 | Song et al. |
| 2013/0016292 A1 | 1/2013 | Miao et al. |
| 2013/0016413 A1 | 1/2013 | Saeedi et al. |
| 2013/0020948 A1 | 1/2013 | Han et al. |
| 2013/0027341 A1 | 1/2013 | Mastandrea |
| 2013/0038707 A1 | 2/2013 | Cunningham et al. |
| 2013/0077820 A1 | 3/2013 | Marais et al. |
| 2013/0080794 A1 | 3/2013 | Hsieh |
| 2013/0106686 A1 | 5/2013 | Bennett |
| 2013/0123656 A1 | 5/2013 | Heck |
| 2013/0123666 A1 | 5/2013 | Giuffrida et al. |
| 2013/0127708 A1 | 5/2013 | Jung et al. |
| 2013/0131538 A1 | 5/2013 | Gaw et al. |
| 2013/0135223 A1 | 5/2013 | Shai |
| 2013/0135722 A1 | 5/2013 | Yokoyama |
| 2013/0141375 A1 | 6/2013 | Ludwig et al. |
| 2013/0144629 A1 | 6/2013 | Johnston et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0215235 A1 | 8/2013 | Russell |
| 2013/0217998 A1 | 8/2013 | Mahfouz et al. |
| 2013/0221996 A1 | 8/2013 | Poupyrev et al. |
| 2013/0222384 A1 | 8/2013 | Futterer |
| 2013/0232095 A1 | 9/2013 | Tan et al. |
| 2013/0259238 A1 | 10/2013 | Xiang et al. |
| 2013/0265229 A1 | 10/2013 | Forutanpour et al. |
| 2013/0265437 A1 | 10/2013 | Thorn et al. |
| 2013/0271292 A1 | 10/2013 | McDermott |
| 2013/0285901 A1 | 10/2013 | Lee et al. |
| 2013/0285913 A1 | 10/2013 | Griffin et al. |
| 2013/0293580 A1 | 11/2013 | Spivack |
| 2013/0310979 A1 | 11/2013 | Herr et al. |
| 2013/0312256 A1 | 11/2013 | Wesselmann et al. |
| 2013/0317382 A1 | 11/2013 | Le |
| 2013/0317648 A1 | 11/2013 | Assad |
| 2013/0332196 A1 | 12/2013 | Pinsker |
| 2013/0335302 A1 | 12/2013 | Crane et al. |
| 2014/0005743 A1 | 1/2014 | Giuffrida et al. |
| 2014/0020945 A1 | 1/2014 | Hurwitz et al. |
| 2014/0028539 A1 | 1/2014 | Newham et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0051946 A1 | 2/2014 | Arne et al. |
| 2014/0052150 A1 | 2/2014 | Taylor et al. |
| 2014/0074179 A1 | 3/2014 | Heldman et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0100432 A1 | 4/2014 | Golda et al. |
| 2014/0107493 A1 | 4/2014 | Yuen et al. |
| 2014/0121471 A1 | 5/2014 | Walker |
| 2014/0122958 A1 | 5/2014 | Greenebrg et al. |
| 2014/0132512 A1 | 5/2014 | Gomez Sainz-Garcia |
| 2014/0139422 A1 | 5/2014 | Mistry et al. |
| 2014/0142937 A1 | 5/2014 | Powledge et al. |
| 2014/0143064 A1 | 5/2014 | Tran |
| 2014/0147820 A1 | 5/2014 | Snow et al. |
| 2014/0157168 A1 | 6/2014 | Albouyeh et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0200432 A1 | 7/2014 | Banerji et al. |
| 2014/0201666 A1 | 7/2014 | Bedikian et al. |
| 2014/0202643 A1 | 7/2014 | Hikmet et al. |
| 2014/0204455 A1 | 7/2014 | Popovich et al. |
| 2014/0223462 A1 | 8/2014 | Aimone et al. |
| 2014/0226193 A1 | 8/2014 | Sun |
| 2014/0232651 A1 | 8/2014 | Kress et al. |
| 2014/0236031 A1 | 8/2014 | Banet et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0258864 A1 | 9/2014 | Shenoy et al. |
| 2014/0277622 A1 | 9/2014 | Raniere |
| 2014/0278139 A1 | 9/2014 | Hong et al. |
| 2014/0278441 A1 | 9/2014 | Ton et al. |
| 2014/0279860 A1 | 9/2014 | Pan et al. |
| 2014/0282282 A1 | 9/2014 | Holz |
| 2014/0285326 A1 | 9/2014 | Luna et al. |
| 2014/0285429 A1 | 9/2014 | Simmons |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0358825 A1 | 12/2014 | Phillipps et al. |
| 2014/0359540 A1 | 12/2014 | Kelsey et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0368424 A1 | 12/2014 | Choi et al. |
| 2014/0368428 A1 | 12/2014 | Pinault |
| 2014/0368474 A1 | 12/2014 | Kim et al. |
| 2014/0368896 A1 | 12/2014 | Nakazono et al. |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0019135 A1 | 1/2015 | Kacyvenski et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0036221 A1 | 2/2015 | Stephenson |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0072326 A1 | 3/2015 | Mauri et al. |
| 2015/0084860 A1 | 3/2015 | Aleem et al. |
| 2015/0091790 A1 | 4/2015 | Forutanpour et al. |

(56) References Cited

U.S. PATENT DOCUMENTS

| | | |
|---|---|---|
| 2015/0094564 A1 | 4/2015 | Tashman et al. |
| 2015/0099946 A1 | 4/2015 | Sahin |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0148728 A1 | 5/2015 | Sallum et al. |
| 2015/0157944 A1 | 6/2015 | Gottlieb |
| 2015/0160621 A1 | 6/2015 | Yilmaz |
| 2015/0169074 A1 | 6/2015 | Ataee et al. |
| 2015/0170421 A1 | 6/2015 | Mandella et al. |
| 2015/0177841 A1 | 6/2015 | Vanblon et al. |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0185838 A1 | 7/2015 | Camacho-Perez et al. |
| 2015/0186609 A1 | 7/2015 | Utter, II |
| 2015/0187355 A1 | 7/2015 | Parkinson et al. |
| 2015/0193949 A1 | 7/2015 | Katz et al. |
| 2015/0199025 A1 | 7/2015 | Holz |
| 2015/0205126 A1 | 7/2015 | Schowengerdt |
| 2015/0205134 A1 | 7/2015 | Bailey et al. |
| 2015/0213191 A1 | 7/2015 | Abdelghani et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0242009 A1 | 8/2015 | Xiao et al. |
| 2015/0242120 A1 | 8/2015 | Rodriguez |
| 2015/0242575 A1 | 8/2015 | Abovitz et al. |
| 2015/0261306 A1 | 9/2015 | Lake |
| 2015/0261318 A1 | 9/2015 | Scavezze et al. |
| 2015/0272483 A1 | 10/2015 | Etemad et al. |
| 2015/0277575 A1 | 10/2015 | Ataee et al. |
| 2015/0288944 A1 | 10/2015 | Nistico et al. |
| 2015/0289995 A1 | 10/2015 | Wilkinson et al. |
| 2015/0296553 A1 | 10/2015 | DiFranco et al. |
| 2015/0302168 A1 | 10/2015 | De Sapio et al. |
| 2015/0305672 A1 | 10/2015 | Grey et al. |
| 2015/0309563 A1 | 10/2015 | Connor |
| 2015/0309582 A1 | 10/2015 | Gupta |
| 2015/0310766 A1 | 10/2015 | Alshehri et al. |
| 2015/0312175 A1 | 10/2015 | Langholz |
| 2015/0313496 A1 | 11/2015 | Connor |
| 2015/0323998 A1 | 11/2015 | Kudekar et al. |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0351690 A1 | 12/2015 | Toth et al. |
| 2015/0355716 A1 | 12/2015 | Balasubramanian et al. |
| 2015/0355718 A1 | 12/2015 | Slonneger |
| 2015/0362734 A1 | 12/2015 | Moser et al. |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2015/0378161 A1 | 12/2015 | Bailey et al. |
| 2015/0378162 A1 | 12/2015 | Bailey et al. |
| 2015/0378164 A1 | 12/2015 | Bailey et al. |
| 2015/0379770 A1 | 12/2015 | Haley, Jr. et al. |
| 2016/0011668 A1 | 1/2016 | Gilad-Bachrach et al. |
| 2016/0020500 A1 | 1/2016 | Matsuda |
| 2016/0026853 A1 | 1/2016 | Wexler et al. |
| 2016/0033771 A1 | 2/2016 | Tremblay et al. |
| 2016/0049073 A1 | 2/2016 | Lee |
| 2016/0050037 A1 | 2/2016 | Webb |
| 2016/0071319 A1 | 3/2016 | Fallon et al. |
| 2016/0092504 A1 | 3/2016 | Mitri et al. |
| 2016/0099010 A1 | 4/2016 | Sainath et al. |
| 2016/0107309 A1 | 4/2016 | Walsh et al. |
| 2016/0113587 A1 | 4/2016 | Kothe et al. |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xiaoli et al. |
| 2016/0170710 A1 | 6/2016 | Kim et al. |
| 2016/0187992 A1 | 6/2016 | Yamamoto et al. |
| 2016/0195928 A1 | 7/2016 | Wagner et al. |
| 2016/0199699 A1 | 7/2016 | Klassen |
| 2016/0202081 A1 | 7/2016 | Debieuvre et al. |
| 2016/0206206 A1 | 7/2016 | Avila et al. |
| 2016/0207201 A1 | 7/2016 | Herr et al. |
| 2016/0217614 A1 | 7/2016 | Kraver et al. |
| 2016/0235323 A1 | 8/2016 | Tadi et al. |
| 2016/0238845 A1 | 8/2016 | Alexander et al. |
| 2016/0239080 A1 | 8/2016 | Marcolina et al. |
| 2016/0242646 A1 | 8/2016 | Obma |
| 2016/0259407 A1 | 9/2016 | Schick |
| 2016/0262687 A1 | 9/2016 | Vaidyanathan et al. |
| 2016/0263458 A1 | 9/2016 | Mather et al. |
| 2016/0274365 A1 | 9/2016 | Bailey et al. |
| 2016/0274732 A1 | 9/2016 | Bang et al. |
| 2016/0274758 A1 | 9/2016 | Bailey |
| 2016/0282947 A1 | 9/2016 | Schwarz et al. |
| 2016/0291768 A1 | 10/2016 | Cho et al. |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1 | 10/2016 | Wagner et al. |
| 2016/0313890 A1 | 10/2016 | Walline et al. |
| 2016/0313899 A1 | 10/2016 | Noel |
| 2016/0314623 A1 | 10/2016 | Coleman et al. |
| 2016/0327796 A1 | 11/2016 | Bailey et al. |
| 2016/0327797 A1 | 11/2016 | Bailey et al. |
| 2016/0342227 A1 | 11/2016 | Natzke et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0350973 A1 | 12/2016 | Shapira et al. |
| 2016/0377865 A1 | 12/2016 | Alexander et al. |
| 2016/0377866 A1 | 12/2016 | Alexander et al. |
| 2017/0025026 A1 | 1/2017 | Ortiz Catalan |
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068095 A1 | 3/2017 | Holland et al. |
| 2017/0068445 A1 | 3/2017 | Lee et al. |
| 2017/0075426 A1 | 3/2017 | Camacho Perez et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0095178 A1 | 4/2017 | Schoen et al. |
| 2017/0097753 A1 | 4/2017 | Bailey et al. |
| 2017/0115483 A1 | 4/2017 | Aleem et al. |
| 2017/0119472 A1 | 5/2017 | Herrmann et al. |
| 2017/0123487 A1* | 5/2017 | Hazra ................ G06F 3/04845 |
| 2017/0124474 A1 | 5/2017 | Kashyap |
| 2017/0124816 A1 | 5/2017 | Yang et al. |
| 2017/0127354 A1 | 5/2017 | Garland et al. |
| 2017/0147077 A1 | 5/2017 | Park et al. |
| 2017/0153701 A1 | 6/2017 | Mahon et al. |
| 2017/0161635 A1 | 6/2017 | Oono et al. |
| 2017/0188878 A1 | 7/2017 | Lee |
| 2017/0188980 A1 | 7/2017 | Ash |
| 2017/0197142 A1 | 7/2017 | Stafford et al. |
| 2017/0205876 A1 | 7/2017 | Vidal et al. |
| 2017/0209055 A1 | 7/2017 | Pantelopoulos et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0220923 A1 | 8/2017 | Bae et al. |
| 2017/0237789 A1 | 8/2017 | Harner et al. |
| 2017/0259167 A1 | 9/2017 | Cook et al. |
| 2017/0262064 A1 | 9/2017 | Ofir et al. |
| 2017/0277282 A1 | 9/2017 | Go |
| 2017/0285744 A1 | 10/2017 | Juliato |
| 2017/0285756 A1 | 10/2017 | Wang et al. |
| 2017/0285757 A1 | 10/2017 | Robertson et al. |

(56) References Cited

U.S. PATENT DOCUMENTS

| | | |
|---|---|---|
| 2017/0285848 A1 | 10/2017 | Rosenberg et al. |
| 2017/0296363 A1 | 10/2017 | Yetkin et al. |
| 2017/0299956 A1 | 10/2017 | Holland et al. |
| 2017/0301630 A1 | 10/2017 | Nguyen et al. |
| 2017/0308118 A1 | 10/2017 | Ito |
| 2017/0308165 A1 | 10/2017 | Erivantcev et al. |
| 2017/0312614 A1 | 11/2017 | Tran et al. |
| 2017/0329392 A1 | 11/2017 | Keskin et al. |
| 2017/0329404 A1 | 11/2017 | Keskin et al. |
| 2017/0340506 A1 | 11/2017 | Zhang et al. |
| 2017/0344706 A1 | 11/2017 | Torres et al. |
| 2017/0347908 A1 | 12/2017 | Watanabe et al. |
| 2017/0371403 A1 | 12/2017 | Wetzler et al. |
| 2018/0000367 A1 | 1/2018 | Longinotti-Buitoni |
| 2018/0018825 A1 | 1/2018 | Kim et al. |
| 2018/0020285 A1 | 1/2018 | Zass |
| 2018/0020951 A1 | 1/2018 | Kaifosh et al. |
| 2018/0020978 A1 | 1/2018 | Kaifosh et al. |
| 2018/0020990 A1 | 1/2018 | Park et al. |
| 2018/0024634 A1 | 1/2018 | Kaifosh et al. |
| 2018/0024635 A1 | 1/2018 | Kaifosh et al. |
| 2018/0024641 A1 | 1/2018 | Mao et al. |
| 2018/0064363 A1 | 3/2018 | Morun et al. |
| 2018/0067553 A1 | 3/2018 | Morun et al. |
| 2018/0068489 A1 | 3/2018 | Kim et al. |
| 2018/0074332 A1 | 3/2018 | Li et al. |
| 2018/0081439 A1 | 3/2018 | Daniels |
| 2018/0088675 A1 | 3/2018 | Vogel et al. |
| 2018/0088765 A1 | 3/2018 | Bailey |
| 2018/0092599 A1 | 4/2018 | Kerth et al. |
| 2018/0093181 A1 | 4/2018 | Goslin et al. |
| 2018/0095542 A1 | 4/2018 | Mallinson |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0107275 A1 | 4/2018 | Chen et al. |
| 2018/0120948 A1 | 5/2018 | Aleem et al. |
| 2018/0133551 A1 | 5/2018 | Chang et al. |
| 2018/0140441 A1 | 5/2018 | Poirters |
| 2018/0150033 A1 | 5/2018 | Lake et al. |
| 2018/0153430 A1* | 6/2018 | Ang ............... A61B 5/4851 |
| 2018/0153444 A1 | 6/2018 | Yang et al. |
| 2018/0154140 A1 | 6/2018 | Bouton et al. |
| 2018/0168905 A1 | 6/2018 | Goodall et al. |
| 2018/0178008 A1 | 6/2018 | Bouton et al. |
| 2018/0217249 A1 | 8/2018 | La Salla et al. |
| 2018/0239430 A1 | 8/2018 | Tadi et al. |
| 2018/0240459 A1 | 8/2018 | Weng et al. |
| 2018/0247443 A1 | 8/2018 | Briggs et al. |
| 2018/0279919 A1 | 10/2018 | Bansbach et al. |
| 2018/0301057 A1 | 10/2018 | Hargrove et al. |
| 2018/0307314 A1 | 10/2018 | Connor |
| 2018/0314879 A1 | 11/2018 | Khwaja et al. |
| 2018/0321745 A1 | 11/2018 | Morun et al. |
| 2018/0321746 A1 | 11/2018 | Morun et al. |
| 2018/0330549 A1 | 11/2018 | Brenton |
| 2018/0333575 A1 | 11/2018 | Bouton |
| 2018/0344195 A1 | 12/2018 | Morun et al. |
| 2018/0356890 A1 | 12/2018 | Zhang et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0027141 A1 | 1/2019 | Strong et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0056422 A1 | 2/2019 | Park et al. |
| 2019/0076716 A1 | 3/2019 | Chiou et al. |
| 2019/0113973 A1 | 4/2019 | Coleman et al. |
| 2019/0121305 A1 | 4/2019 | Kaifosh et al. |
| 2019/0121306 A1 | 4/2019 | Kaifosh et al. |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0196585 A1 | 6/2019 | Laszlo et al. |
| 2019/0196586 A1 | 6/2019 | Laszlo et al. |
| 2019/0197778 A1 | 6/2019 | Sachdeva et al. |
| 2019/0212817 A1 | 7/2019 | Kaifosh et al. |
| 2019/0223748 A1 | 7/2019 | Al-Natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0279407 A1 | 9/2019 | McHugh et al. |
| 2019/0294243 A1 | 9/2019 | Laszlo et al. |
| 2019/0324549 A1 | 10/2019 | Araki et al. |
| 2019/0348026 A1 | 11/2019 | Berenzweig et al. |
| 2019/0348027 A1 | 11/2019 | Berenzweig et al. |
| 2019/0357787 A1 | 11/2019 | Barachant et al. |
| 2019/0362557 A1 | 11/2019 | Lacey et al. |
| 2020/0042089 A1 | 2/2020 | Ang et al. |
| 2020/0057661 A1 | 2/2020 | Bendfeldt |
| 2020/0065569 A1 | 2/2020 | Nduka et al. |
| 2020/0069210 A1 | 3/2020 | Berenzweig et al. |
| 2020/0069211 A1 | 3/2020 | Berenzweig et al. |
| 2020/0073483 A1 | 3/2020 | Berenzweig et al. |
| 2020/0097081 A1 | 3/2020 | Stone et al. |
| 2020/0097083 A1* | 3/2020 | Mao ............... G06F 3/014 |
| 2020/0111260 A1 | 4/2020 | Osborn et al. |
| 2020/0125171 A1 | 4/2020 | Morun et al. |
| 2020/0142490 A1 | 5/2020 | Xiong et al. |
| 2020/0159322 A1 | 5/2020 | Morun et al. |
| 2020/0163562 A1 | 5/2020 | Neaves |
| 2020/0225320 A1 | 7/2020 | Belskikh et al. |
| 2020/0245873 A1 | 8/2020 | Frank et al. |
| 2020/0249752 A1* | 8/2020 | Parshionikar ......... G06F 1/1694 |
| 2020/0275895 A1 | 9/2020 | Barachant |
| 2020/0301509 A1 | 9/2020 | Liu et al. |
| 2020/0320335 A1 | 10/2020 | Shamun et al. |
| 2021/0064132 A1* | 3/2021 | Rubin ............... G06F 3/0481 |
| 2021/0109598 A1 | 4/2021 | Zhang et al. |
| 2021/0117523 A1 | 4/2021 | Kim et al. |
| 2021/0290159 A1 | 9/2021 | Bruinsma et al. |

FOREIGN PATENT DOCUMENTS

| | | |
|---|---|---|
| CA | 2939644 A1 | 8/2015 |
| CN | 1838933 A | 9/2006 |
| CN | 102246125 A | 11/2011 |
| CN | 103777752 A | 5/2014 |
| CN | 105190578 A | 12/2015 |
| CN | 106102504 A | 11/2016 |
| CN | 110300542 A | 10/2019 |
| CN | 111902077 A | 11/2020 |
| CN | 112074225 A | 12/2020 |
| CN | 112469469 A | 3/2021 |
| CN | 112822992 A | 5/2021 |
| DE | 4412278 A1 | 10/1995 |
| EP | 0301790 A2 | 2/1989 |
| EP | 1345210 A2 | 9/2003 |
| EP | 1408443 B1 | 10/2006 |
| EP | 2198521 B1 | 6/2012 |
| EP | 2541763 A1 | 1/2013 |
| EP | 2733578 A2 | 5/2014 |
| EP | 2959394 A1 | 12/2015 |
| EP | 3104737 A1 | 12/2016 |
| EP | 3200051 A1 | 8/2017 |
| EP | 3487395 A1 | 5/2019 |
| EP | 2959394 B1 | 5/2021 |
| JP | S61198892 A | 9/1986 |
| JP | H05277080 A | 10/1993 |
| JP | H07248873 A | 9/1995 |
| JP | 3103427 B2 | 10/2000 |
| JP | 2002287869 A | 10/2002 |
| JP | 2003303047 A | 10/2003 |
| JP | 2005095561 A | 4/2005 |
| JP | 2005352739 A | 12/2005 |
| JP | 2008192004 A | 8/2008 |
| JP | 2009050679 A | 3/2009 |
| JP | 2010520561 A | 6/2010 |
| JP | 2013160905 A | 8/2013 |

(56) References Cited

FOREIGN PATENT DOCUMENTS

| | | | |
|---|---|---|---|
| JP | 2016507851 A | 3/2016 |
| JP | 2017509386 A | 4/2017 |
| JP | 2019023941 A | 2/2019 |
| JP | 2021072136 A | 5/2021 |
| KR | 20110040165 A | 4/2011 |
| KR | 20120094870 A | 8/2012 |
| KR | 20120097997 A | 9/2012 |
| KR | 20150123254 A | 11/2015 |
| KR | 20160121552 A | 10/2016 |
| KR | 20170067873 A | 6/2017 |
| KR | 20170107283 A | 9/2017 |
| KR | 101790147 B1 | 10/2017 |
| WO | 9527341 A1 | 10/1995 |
| WO | 2006086504 A2 | 8/2006 |
| WO | 2008109248 A2 | 9/2008 |
| WO | 2009042313 A1 | 4/2009 |
| WO | 2010104879 A2 | 9/2010 |
| WO | 2011011750 A1 | 1/2011 |
| WO | 2011070554 A2 | 6/2011 |
| WO | 2012155157 A1 | 11/2012 |
| WO | 2014130871 A1 | 8/2014 |
| WO | 2014155288 A2 | 10/2014 |
| WO | 2014186370 A1 | 11/2014 |
| WO | 2014194257 A1 | 12/2014 |
| WO | 2014197443 A1 | 12/2014 |
| WO | 2015027089 A1 | 2/2015 |
| WO | 2015063520 A1 | 5/2015 |
| WO | 2015073713 A1 | 5/2015 |
| WO | 2015081113 A1 | 6/2015 |
| WO | 2015100172 A1 | 7/2015 |
| WO | 2015123445 A1 | 8/2015 |
| WO | 2015123775 A1 | 8/2015 |
| WO | 2015184760 A1 | 12/2015 |
| WO | 2015192117 A1 | 12/2015 |
| WO | 2015199747 A1 | 12/2015 |
| WO | 2016041088 A1 | 3/2016 |
| WO | 2017062544 A1 | 4/2017 |
| WO | 2017075611 A1 | 5/2017 |
| WO | 2017092225 A1 | 6/2017 |
| WO | 2017120669 A1 | 7/2017 |
| WO | 2017172185 A1 | 10/2017 |
| WO | 2017208167 A1 | 12/2017 |
| WO | 2018022602 A1 | 2/2018 |
| WO | 2018098046 A2 | 5/2018 |
| WO | 2019099758 A1 | 5/2019 |
| WO | 2019147953 A1 | 8/2019 |
| WO | 2019147958 A1 | 8/2019 |
| WO | 2019147996 A1 | 8/2019 |
| WO | 2019217419 A2 | 11/2019 |
| WO | 2019226259 A1 | 11/2019 |
| WO | 2019231911 A1 | 12/2019 |
| WO | 2020047429 A1 | 3/2020 |
| WO | 2020061440 A1 | 3/2020 |
| WO | 2020061451 A1 | 3/2020 |
| WO | 2020072915 A1 | 4/2020 |

OTHER PUBLICATIONS

Communication Pursuant to Rule 164(1) EPC, Partial Supplementary European Search Report for European Application No. 14753949. 8, dated Sep. 30, 2016, 7 pages.
Costanza E., et al., "EMG as a Subtle Input Interface for Mobile Computing," Mobile HCI, LNCS 3160, 2004, pp. 426-430.
Costanza E., et al., "Toward Subtle Intimate Interfaces for Mobile Devices Using an EMG Controller," CHI, Proceedings of the SIGCHI Conference on Human Factors in Computing Systems, Apr. 2-7, 2005, pp. 481-489.
Final Office Action dated Jan. 3, 2019 for U.S. Appl. No. 14/465,194, filed Aug. 21, 2014, 61 Pages.
Final Office Action dated Jan. 10, 2018 for U.S. Appl. No. 14/465,194, filed Aug. 21, 2014, 50 Pages.
Final Office Action dated Oct. 21, 2021 for U.S. Appl. No. 16/899,843, filed Jun. 12, 2020, 29 Pages.
Final Office Action dated Oct. 21, 2021 for U.S. Appl. No. 16/899,843, filed May 12, 2020, 29 Pages.
First Office Action dated Nov. 25, 2020, for Canadian Application No. 2921954, filed Aug. 21, 2014, 4 pages.
Ghasemzadeh H., et al., "A Body Sensor Network With Electromyogram and Inertial Sensors: Multimodal Interpretation of Muscular Activities," IEEE Transactions on Information Technology in Biomedicine, Mar. 2010, vol. 14 (2), pp. 198-206.
Gourmelon L., et al., "Contactless Sensors for Surface Electromyography," Proceedings of the 28th IEEE EMBS Annual International Conference, New York City, NY, Aug. 30-Sep. 3, 2006, pp. 2514-2517.
International Search Report and Written Opinion for International Application No. PCT/US2014/017799, dated May 16, 2014, 9 pages.
International Search Report and Written Opinion for International Application No. PCT/US2014/037863, dated Aug. 21, 2014, 10 pages.
International Preliminary Report on Patentability for International Application No. PCT/US2014/052143, dated Mar. 3, 2016, 7 pages.
International Search Report and Written Opinion for International Application No. PCT/US2014/052143, dated Nov. 21, 2014, 8 Pages.
International Search Report and Written Opinion for International Application No. PCT/US2014/067443, dated Feb. 27, 2015, 8 pages.
International Search Report and Written Opinion for International Application No. PCT/US2015/015675, dated May 27, 2015, 9 Pages.
Janssen C., "Radio Frequency (RF)," 2013, [Retrieved on Jul. 12, 2017], 2 pages, Retrieved from the Internet: URL: https://web.archive.org/web/20130726153946/https://www.techopedia.com/definition/5083/radio-frequency-rf.
Merriam-Webster, "Radio Frequencies," download date Jul. 12, 2017, 2 pages, Retrieved from the Internet: URL: https://www.merriam-webster.com/table/collegiate/radiofre.htm.
Morris D., et al., "Emerging Input Technologies for Always-Available Mobile Interaction," Foundations and Trends in Human-Computer Interaction, 2010, vol. 4 (4), pp. 245-316.
Naik G.R., et al., "Real-Time Hand Gesture Identification for Human Computer Interaction Based on ICA of Surface Electromyogram," IADIS International Conference Interfaces and Human Computer Interaction, 2007, pp. 83-90.
Non-Final Office Action dated May 7, 2021 for U.S. Appl. No. 16/899,843, filed May 12, 2020, 24 Pages.
Non-Final Office Action dated Sep. 11, 2019 for U.S. Appl. No. 14/465,194, filed Aug. 21, 2014, 72 Pages.
Non-Final Office Action dated May 12, 2022 for U.S. Appl. No. 16/899,843, filed Jun. 12, 2020, 34 Pages.
Non-Final Office Action dated Aug. 15, 2018 for U.S. Appl. No. 14/465,194, filed Aug. 21, 2014, 64 Pages.
Non-Final Office Action dated Aug. 17, 2017 for U.S. Appl. No. 14/465,194, filed Aug. 21, 2014, 81 Pages.
Notice of Allowance dated Mar. 11, 2020 for U.S. Appl. No. 14/465,194, filed Aug. 21, 2014, 29 Pages.
Picard R.W., et al., "Affective Wearables," Proceedings of the IEEE 1st International Symposium on Wearable Computers, ISWC, Cambridge, MA, USA, Oct. 13-14, 1997, pp. 90-97.
Rekimoto J., "GestureWrist and GesturePad: Unobtrusive Wearable Interaction Devices," ISWC Proceedings of the 5th IEEE International Symposium on Wearable Computers, 2001, 7 pages.
Saponas T.S., et al., "Making Muscle-Computer Interfaces More Practical," CHI, Atlanta, Georgia, USA, Apr. 10-15, 2010, 4 pages.
Sato M., et al., "Touche: Enhancing Touch Interaction on Humans, Screens, Liquids, and Everyday Objects," CHI, Austin, Texas, May 5-10, 2012, 10 pages.
Ueno A., et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007, pp. 5731-5734.

(56) References Cited

OTHER PUBLICATIONS

Ueno A., et al., "Feasibility of Capacitive Sensing of Surface Electromyographic Potential through Cloth," Sensors and Materials, 2012, vol. 24 (6), pp. 335-346.
Xiong A., et al., "A Novel HCI based on EMG and IMU," Proceedings of the 2011 IEEE International Conference on Robotics and Biomimetics, Phuket, Thailand, Dec. 7-11, 2011, pp. 2653-2657.
Xu Z., et al., "Hand Gesture Recognition and Virtual Game Control Based on 3D Accelerometer and EMG Sensors," Proceedings of the 14th International Conference on Intelligent User Interfaces, D211 Sanibel Island, Florida, Feb. 8-11, 2009, pp. 401-406.
Zhang X., et al., "A Framework for Hand Gesture Recognition Based on Accelerometer and EMG Sensors," IEEE Transactions on Systems, Man, and Cybernetics—Part A: Systems and Humans, Nov. 2011, vol. 41 (6), pp. 1064-1076.
International Search Report and Written Opinion for International Application No. PCT/US2018/063215, dated Mar. 21, 2019, 17 Pages.
International Search Report and Written Opinion for International Application No. PCT/US2019/015167, dated May 21, 2019, 7 Pages.
International Search Report and Written Opinion for International Application No. PCT/US2019/015174, dated May 21, 2019, 8 pages.
International Search Report and Written Opinion for International Application No. PCT/US2019/015244, dated May 16, 2019, 8 Pages.
International Search Report and Written Opinion for International Application No. PCT/US2019/020065, dated May 16, 2019, 10 Pages.
International Search Report and Written Opinion for International Application No. PCT/US2019/028299, dated Aug. 9, 2019, 12 pages.
International Search Report and Written Opinion for International Application No. PCT/US2019/031114, dated Dec. 20, 2019, 18 Pages.
International Search Report and Written Opinion for International Application No. PCT/US2019/034173, dated Sep. 18, 2019, 10 Pages.
International Search Report and Written Opinion for International Application No. PCT/US2019/037302, dated Oct. 11, 2019, 13 Pages.
International Search Report and Written Opinion for International Application No. PCT/US2019/042579, dated Oct. 31, 2019, 8 Pages.
International Search Report and Written Opinion for International Application No. PCT/US2019/046351, dated Nov. 7, 2019, 9 pages.
International Search Report and Written Opinion for International Application No. PCT/US2019/049094, dated Jan. 9, 2020, 27 Pages.
International Search Report and Written Opinion for International Application No. PCT/US2019/052131, dated Dec. 6, 2019, 8 pages.
International Search Report and Written Opinion for International Application No. PCT/US2019/052151, dated Jan. 15, 2020, 10 pages.
International Search Report and Written Opinion for International Application No. PCT/US2019/054716, dated Dec. 20, 2019, 11 Pages.
International Search Report and Written Opinion for International Application No. PCT/US2019/061759, dated Jan. 29, 2020, 12 pages.
International Search Report and Written Opinion for International Application No. PCT/US2019/063587, dated Mar. 25, 2020, 16 pages.
International Search Report and Written Opinion for International Application No. PCT/US2020/025735, dated Jun. 22, 2020, 10 pages.
International Search Report and Written Opinion for International Application No. PCT/US2020/025772, dated Aug. 3, 2020, 11 pages.
International Search Report and Written Opinion for International Application No. PCT/US2020/025797, dated Jul. 9, 2020, 10 pages.
International Search Report and Written Opinion for International Application No. PCT/US2020/049274, dated Feb. 1, 2021, 17 pages.
International Search Report and Written Opinion for International Application No. PCT/US2020/061392, dated Mar. 12, 2021, 12 pages.
International Search Report and Written Opinion for International Application No. PCT/US2017/043792, dated Oct. 5, 2017, 9 Pages.
International Search Report and Written Opinion for International Application No. PCT/US2019/015134, dated May 15, 2019, 11 Pages.
International Search Report and Written Opinion for International Application No. PCT/US2019/015180, dated May 28, 2019, 10 Pages.
International Search Report and Written Opinion for International Application No. PCT/US2019/015183, dated May 3, 2019, 8 Pages.
International Search Report and Written Opinion for International Application No. PCT/US2019/015238, dated May 16, 2019, 8 Pages.
Invitation to Pay Additional Fees for International Application No. PCT/US2019/031114, dated Aug. 6, 2019, 7 pages.
Invitation to Pay Additional Fees for International Application No. PCT/US2019/049094, dated Oct. 24, 2019, 2 Pages.
Itoh Y., et al., "Interaction-Free Calibration for Optical See-Through Head-Mounted Displays based on 3D Eye Localization," IEEE Symposium on 3D User Interfaces (3DUI), 2014, pp. 75-82.
Jiang H., "Effective and Interactive Interpretation of Gestures by Individuals with Mobility Impairments," Thesis/ Dissertation Acceptance, Purdue University Graduate School, Graduate School Form 30, Updated on Jan. 15, 2015, 24 pages.
Kainz et al., "Approach to Hand Tracking and Gesture Recognition Based on Depth-Sensing Cameras and EMG Monitoring," ACTA Informatica Pragensia, vol. 3, Jan. 1, 2014, pp. 104-112, Retrieved from the Internet: URL: https://aip.vse.cz/pdfs/aip/2014/01/08.pdf.
Kawaguchi J., et al., "Estimation of Finger Joint Angles Based on Electromechanical Sensing of Wrist Shape," IEEE Transactions on Neural Systems and Rehabilitation Engineering, Sep. 2017, vol. 25 (9), pp. 1409-1418.
Kessler D., "Optics of Near to Eye Displays (NEDs)," Presentation—Oasis, Tel Aviv, Feb. 19, 2013, 37 pages.
Kim H., et al., "Real-Time Human Pose Estimation and Gesture Recognition from Depth Images Using Superpixels and SVM Classifier," Sensors, 2015, vol. 15, pp. 12410-12427.
Kipke D.R., et al., "Silicon-Substrate Intracortical Microelectrode Arrays for Long-Term Recording of Neuronal Spike Activity in Cerebral Cortex," IEEE Transactions on Neural Systems and Rehabilitation Engineering, Jun. 2003, vol. 11 (2), 5 pages, Retrieved on Oct. 7, 2019 [Jul. 10, 2019] Retrieved from the Internet: URL:.
Koerner M.D., "Design and Characterization of the Exo-Skin Haptic Device: A Novel Tendon Actuated Textile Hand Exoskeleton," Abstract of thesis for Drexel University Masters Degree [online], Nov. 2, 2017, 5 pages, Retrieved from the Internet: URL: https://dialog.proquest.com/professional/docview/1931047627?accountid=153692.
Krees B.C., et al., "Diffractive and Holographic Optics as Optical Combiners in Head Mounted Displays," UbiComp, Zurich, Switzerland, Sep. 8-12, 2013, pp. 1479-1482.
Kress B., et al., "A Review of Head-Mounted Displays (HMD) Technologies and Applications for Consumer Electronics," Proceedings of SPIE, 2013, vol. 8720, pp. 87200A-1-87200A-13.
Kress B., "Optical Architectures for See-Through Wearable Displays," Presentation, Bay Area SID Seminar, Apr. 30, 2014, 156 pages.
Lake et al., "Method and Apparatus for Analyzing Capacitive EMG and IMU Sensor Signals for Gesture Control," Amendment filed Aug. 21, 2015, for U.S. Appl. No. 14/186,878, 13 pages.

(56) References Cited

OTHER PUBLICATIONS

Lake et al., "Method and Apparatus for Analyzing Capacitive EMG and IMU Sensor Signals for Gesture Control," Office Action dated Jun. 17, 2015, for U.S. Appl. No. 14/186,878, 13 pages.
Lake et al.' "Method and Apparatus for Analyzing Capacitive EMG and IMU Sensor Signals for Gesture Control," Preliminary Amendment filed May 9, 2014, for U.S. Appl. No. 14/186,878, 9 pages.
Lake et al., "Method and Apparatus for Analyzing Capacitive EMG and IMU Sensor Signals for Gesture Control," U.S. Appl. No. 14/186,878, filed Feb. 21, 2014, 29 pages.
Lake et al., "Methods and Devices for Combining Muscle Activity Sensor Signals and Inertial Sensor Signals for Gesture-Based Control," Amendment filed Jan. 8, 2016, for U.S. Appl. No. 14/186,889, 16 pages.
Lake et al., "Methods and Devices for Combining Muscle Activity Sensor Signals and Inertial Sensor Signals for Gesture-Based Control," Amendment filed Jul. 13, 2016, for U.S. Appl. No. 14/186,889, 12 pages.
Lake et al., "Methods and Devices for Combining Muscle Activity Sensor Signals and Inertial Sensor Signals for Gesture-Based Control," Office Action dated Jun. 16, 2016, for U.S. Appl. No. 14/186,889, 13 pages.
Lake et al., "Methods and Devices for Combining Muscle Activity Sensor Signals and Inertial Sensor Signals for Gesture-Based Control," Office Action dated Nov. 5, 2015, for U.S. Appl. No. 14/186,889, 11 pages.
Lake et al., "Methods and Devices That Combine Muscle Activity Sensor Signals and Inertial Sensor Signals for Gesture-Based Control," U.S. Appl. No. 14/186,889, filed Feb. 21, 2014, 58 pages.
Lee D.C., et al., "Motion and Force Estimation System of Human Fingers," Journal of Institute of Control, Robotics and Systems, 2011, vol. 17 (10), pp. 1014-1020.
Notice of Allowance dated Jun. 28, 2021 for U.S. Appl. No. 15/882,858, filed Jan. 29, 2018, 18 pages.
Notice of Allowance dated Nov. 3, 2022 for U.S. Appl. No. 16/899,843, filed Jun. 12, 2020, 10 pages.
Notice of Allowance dated Mar. 30, 2018 for U.S. Appl. No. 14/539,773, filed Nov. 12, 2014, 17 pages.
Notice of Allowance dated Nov. 30, 2018 for U.S. Appl. No. 15/799,628, filed Oct. 31, 2017, 19 Pages.
Notice of Allowance dated Jul. 31, 2019 for U.S. Appl. No. 16/257,979, filed Jan. 25, 2019, 22 Pages.
Notice of Allowance received for U.S. Appl. No. 14/155, 107 dated Aug. 30, 2019, 16 pages.
Office action for European Application No. 17835112.8, dated Feb. 11, 2022, 11 Pages.
Office Action for European Patent Application No. 19743717.1, dated Apr. 11, 2022, 10 pages.
Office Action dated Jan. 20, 2023 for Chinese Application No. 201780059093.7, filed Jul. 25, 2017, 16 pages.
Office Action dated Sep. 28, 2022 for Chinese Application No. 201780059093.7, filed Jul. 25, 2017, 16 pages.
Partial Supplementary European Search Report for European Application No. 18879156.0, dated Dec. 7, 2020, 9 pages.
Preinterview First Office Action dated Jun. 24, 2020 for U.S. Appl. No. 16/785,680, filed Feb. 10, 2020, 90 Pages.
Restriction Requirement dated Aug. 8, 2017 for U.S. Appl. No. 14/553,657, filed Nov. 25, 2014, 7 Pages.
Saponas T.S., et al., "Demonstrating the Feasibility of Using Forearm Electromyography for Muscle-Computer Interfaces," CHI Proceedings, Physiological Sensing for Input, Apr. 5-10, 2008, pp. 515-524.
Saponas T.S., et al., "Enabling Always-Available Input with Muscle-Computer Interfaces," Conference: Proceedings of the 22nd Annual ACM Symposium on User Interface Software and Technology, Oct. 7, 2009, pp. 167-176.
Sartori M., et al., "Neural Data-Driven Musculoskeletal Modeling for Personalized Neurorehabilitation Technologies," IEEE Transactions on Biomedical Engineering, May 5, 2016, vol. 63 (5), pp. 879-893.
Sauras-Perez P., et al., "A Voice and Pointing Gesture Interaction System for Supporting Human Spontaneous Decisions in Autonomous Cars," Clemson University, All Dissertations, May 2017, 174 pages.
Schowengerdt B.T., et al., "Stereoscopic Retinal Scanning Laser Display With Integrated Focus Cues for Ocular Accommodation," Proceedings of SPIE-IS T Electronic Imaging, 2004, vol. 5291, pp. 366-376.
Shen S., et al., "I Am a Smartwatch and I Can Track My User's Arm," University of Illinois at Urbana-Champaign, MobiSys, Jun. 25-30, 2016, 12 pages.
Silverman N.L., et al., "58.5L: Late-News Paper: Engineering a Retinal Scanning Laser Display with Integrated Accommodative Depth Cues," SID 03 Digest, 2003, pp. 1538-1541.
Son M., et al., "Evaluating the Utility of Two Gestural Discomfort Evaluation Methods," PLOS One, Apr. 19, 2017, 21 pages.
Strbac M., et al., "Microsoft Kinect-Based Artificial Perception System for Control of Functional Electrical Stimulation Assisted Grasping," Hindawi Publishing Corporation, BioMed Research International [online], 2014, Article No. 740469, 13 pages, Retrieved from the Internet: URL: https://dx.doi.org/10.1155/2014/740469.
Takatsuka Y., et al., "Retinal Projection Display Using Diffractive Optical Element," Tenth International Conference on Intelligent Information Hiding and Multimedia Signal Processing, IEEE, 2014, pp. 403-406.
Torres T., "Myo Gesture Control Armband," PCMag, Jun. 8, 2015, 9 pages, Retrieved from the Internet: URL: https://www.pcmag.com/article2/0,2817,2485462,00.asp.
Urey H., "Diffractive Exit-Pupil Expander for Display Applications," Applied Optics, Nov. 10, 2001, vol. 40 (32), pp. 5840-5851.
Urey H., et al., "Optical Performance Requirements for MEMS-Scanner Based Microdisplays," Conferences on MOEMS and Miniaturized Systems, SPIE, 2000, vol. 4178, pp. 176-185.
Valero-Cuevas F.J., et al., "Computational Models for Neuromuscular Function," IEEE Reviews in Biomedical Engineering, 2009, vol. 2, NIH Public Access Author Manuscript [online], Jun. 16, 2011 [Retrieved on Jul. 29, 2019], 52 pages, Retrieved from the Internet: URL: https://www.ncbi.nlm.nih.gov/pmc/articles/PMC3116649/.
Viirre E., et al., "The Virtual Retinal Display: A New Technology for Virtual Reality and Augmented Vision in Medicine," Proceedings of Medicine Meets Virtual Reality, IOS Press and Ohmsha, 1998, pp. 252-257.
Wijk U., et al., "Forearm Amputee's Views of Prosthesis Use and Sensory Feedback," Journal of Hand Therapy, Jul. 2015, vol. 28 (3), pp. 269-278.
Wittevrongel B., et al., "Spatiotemporal Beamforming: A Transparent and Unified Decoding Approach to Synchronous Visual Brain-Computer Interfacing," Frontiers in Neuroscience, Nov. 15, 2017, vol. 11, Article No. 630, 13 Pages.
Wodzinski M., et al., "Sequential Classification of Palm Gestures Based on A* Algorithm and MLP Neural Network for Quadrocopter Control," Metrology and Measurement Systems, 2017, vol. 24 (2), pp. 265-276.
Written Opinion for International Application No. PCT/US2014/057029, dated Feb. 24, 2015, 9 Pages.
Xue Y., et al., "Multiple Sensors Based Hand Motion Recognition Using Adaptive Directed Acyclic Graph," Applied Sciences, MDPI, 2017, vol. 7 (358), pp. 1-14.
Yang Z., et al., "Surface EMG Based Handgrip Force Predictions Using Gene Expression Programming," Neurocomputing, 2016, vol. 207, pp. 568-579.
Zacharaki E.I., et al., "Spike Pattern Recognition by Supervised Classification in Low Dimensional Embedding Space," Brain Informatics, 2016, vol. 3, pp. 73-83.
Non-Final Office Action dated May 26, 2020 for U.S. Appl. No. 16/353,998, filed Mar. 14, 2019, 60 Pages.
Non-Final Office Action dated Nov. 27, 2020 for U.S. Appl. No. 16/258,279, filed Jan. 25, 2019, 44 Pages.
Non-Final Office Action dated Aug. 28, 2018 for U.S. Appl. No. 16/023,276, filed Jun. 29, 2018, 10 pages.
Non-Final Office Action dated Aug. 28, 2018 for U.S. Appl. No. 16/023,300, filed Jun. 29, 2018, 11 pages.

(56) References Cited

OTHER PUBLICATIONS

Non-Final Office Action dated Jun. 28, 2021 for U.S. Appl. No. 16/550,905, filed Aug. 26, 2019, 5 Pages.
Non-Final Office Action dated Apr. 29, 2019 for U.S. Appl. No. 16/257,979, filed Jan. 25, 2019, 63 Pages.
Non-Final Office Action dated Apr. 30, 2019 for U.S. Appl. No. 15/659,072, filed Jul. 25, 2017, 99 Pages.
Non-Final Office Action dated Apr. 30, 2020 for U.S. Appl. No. 15/974,430, filed May 8, 2018, 57 Pages.
Non-Final Office Action dated Dec. 30, 2019 for U.S. Appl. No. 16/593,446, filed Oct. 4, 2019, 43 pages.
Non-Final Office Action dated Jun. 30, 2016 for U.S. Appl. No. 14/505,836, filed Oct. 3, 2014, 37 Pages.
Non-Final Office Action dated Oct. 30, 2019 for U.S. Appl. No. 15/882,858, filed Jan. 29, 2018, 22 Pages.
Non-Final Office Action received for U.S. Appl. No. 14/155,087 dated Aug. 16, 2016, 28 pages.
Non-Final Office Action received for U.S. Appl. No. 14/155,087 dated Aug. 7, 2017, 28 pages.
Non-Final Office Action received for U.S. Appl. No. 14/155,087 dated Feb. 17, 2016, 26 pages.
Non-Final Office Action received for U.S. Appl. No. 14/155,087 dated Mar. 31, 2015, 22 pages.
Non-Final Office Action received for U.S. Appl. No. 14/155,107 dated Aug. 17, 2016, 37 pages.
Non-Final Office Action received for U.S. Appl. No. 14/155,107 dated Aug. 7, 2017, 34 pages.
Non-Final Office Action received for U.S. Appl. No. 14/155,107 dated Feb. 11, 2016, 42 pages.
Non-Final Office Action received for U.S. Appl. No. 14/155,107 dated Jul. 13, 2018, 45 pages.
Non-Final Office Action received for U.S. Appl. No. 14/155, 107 dated Mar. 31, 2015, 26 pages.
Notice of Allowance dated Feb. 1, 2023 for U.S. Appl. No. 17/141,646, filed Jan. 5, 2021, 7 pages.
Notice of Allowance dated May 1, 2019 for U.S. Appl. No. 16/137,960, filed Sep. 21, 2018, 14 pages.
Notice of Allowance dated Nov. 2, 2020 for U.S. Appl. No. 15/974,454, filed May 8, 2018, 24 Pages.
Notice of Allowance dated Nov. 4, 2019 for U.S. Appl. No. 15/974,384, filed May 8, 2018, 39 Pages.
Notice of Allowance dated Mar. 5, 2019 for U.S. Appl. No. 16/057,573, filed Aug. 7, 2018, 31 Pages.
Notice of Allowance dated Feb. 6, 2020 for U.S. Appl. No. 16/424,144, filed May 28, 2019, 28 Pages.
Notice of Allowance dated Feb. 8, 2019 for U.S. Appl. No. 16/023,276, filed Jun. 29, 2018, 15 pages.
Notice of Allowance dated Mar. 8, 2023 for U.S. Appl. No. 16/899,843, filed Jun. 12, 2020, 11 pages.
Notice of Allowance dated Feb. 9, 2022 for U.S. Appl. No. 15/882,858, filed Jan. 29, 2018, 9 pages.
Notice of Allowance dated Nov. 10, 2021 for U.S. Appl. No. 15/882,858, filed Jan. 29, 2018, 6 pages.
Notice of Allowance dated Dec. 14, 2022 for U.S. Appl. No. 15/882,858, filed Jan. 29, 2018, 10pages.
Notice of Allowance dated Jul. 15, 2021 for U.S. Appl. No. 15/882,858, filed Jan. 29, 2018, 2 pages.
Notice of Allowance dated Jun. 15, 2018 for U.S. Appl. No. 15/799,621, filed Oct. 31, 2017, 27 pages.
Notice of Allowance dated Dec. 16, 2020 for U.S. Appl. No. 16/593,446, filed Oct. 4, 2019, 44 pages.
Notice of Allowance dated Jul. 18, 2022 for U.S. Appl. No. 16/550,905, filed Aug. 26, 2019, 7 pages.
Notice of Allowance dated May 18, 2020 for U.S. Appl. No. 16/258,279, filed Jan. 25, 2019, 42 Pages.
Notice of Allowance dated May 18, 2022 for U.S. Appl. No. 15/882,858, filed Jan. 29, 2018, 10 pages.
Notice of Allowance dated Aug. 19, 2020 for U.S. Appl. No. 16/557,427, filed Aug. 30, 2019, 22 Pages.
Notice of Allowance dated Jul. 19, 2019 for U.S. Appl. No. 16/258,409, filed Jan. 25, 2019, 36 Pages.
Notice of Allowance dated Apr. 20, 2022 for U.S. Appl. No. 14/461,044, filed Aug. 15, 2014, 08 pages.
Notice of Allowance dated May 20, 2020 for U.S. Appl. No. 16/389,419, filed Apr. 19, 2019, 28 Pages.
Notice of Allowance dated Aug. 22, 2022 for U.S. Appl. No. 15/882,858, filed Jan. 29, 2018, 9 pages.
Notice of Allowance dated Oct. 22, 2021 for U.S. Appl. No. 15/882,858, filed Jan. 29, 2018 , 8 pages.
Notice of Allowance dated Aug. 23, 2021 for U.S. Appl. No. 15/974,430, filed May 8, 2018, 12 pages.
Notice of Allowance dated Dec. 23, 2020 for U.S. Appl. No. 15/659,072, filed Jul. 25, 2017, 26 Pages.
Notice of Allowance dated Mar. 24, 2023 for U.S. Appl. No. 17/141,646, filed Jan. 5, 2021, 4 pages.
Notice of Allowance dated Sep. 24, 2020 for U.S. Appl. No. 16/292,609, filed Mar. 5, 2019, 20 Pages.
Notice of Allowance dated Mar. 25, 2022 for U.S. Appl. No. 16/550,905, filed Aug. 26, 2019, 7 pages.
Notice of Allowance dated Sep. 25, 2018 for U.S. Appl. No. 14/553,657, filed Nov. 25, 2014, 25 Pages.
Notice of Allowance dated Jan. 28, 2019 for U.S. Appl. No. 16/023,300, filed Jun. 29, 2018, 31 pages.
Final Office Action received for U.S. Appl. No. 14/155,087 dated Jul. 20, 2015, 27 pages.
Final Office Action received for U.S. Appl. No. 14/155,087 dated Jul. 8, 2016, 27 pages.
Final Office Action received for U.S. Appl. No. 14/155,087 dated Nov. 27, 2017, 40 pages.
Final Office Action received for U.S. Appl. No. 14/155, 107 dated Dec. 19, 2016, 35 pages.
Final Office Action received for U.S. Appl. No. 14/155, 107 dated Jan. 17, 2019, 46 pages.
Final Office Action received for U.S. Appl. No. 14/155, 107 dated Jul. 16, 2015, 28 pages.
Final Office Action received for U.S. Appl. No. 14/155, 107 dated Jul. 8, 2016, 31 pages.
Final Office Action received for U.S. Appl. No. 14/155, 107 dated Nov. 27, 2017, 44 pages.
Fong H.C., et al., "PepperGram With Interactive Control," 22ND International Conference Onvirtual System Multimedia (VSMM), Oct. 17, 2016, 5 pages.
Gallina A., et al., "Surface EMG Biofeedback," Surface Electromyography: Physiology, Engineering, and Applications, 2016, pp. 485-500.
Gargiulo G., et al., "Giga-Ohm High-Impedance FET Input Amplifiers for Dry Electrode Biosensor Circuits and Systems," Integrated Microsystems: Electronics, Photonics, and Biotechnolgy, Dec. 19, 2017, 41 Pages, Retrieved from the Internet: URL: https://www.researchgate.net/profile/Alistair_Mcewan/publication/255994293_Gigaohm_high_impedance_FETinput_amplifiers_for_dry_electrode_biosensor_circuits_and_systems/links/Of31753a7d0287f5f7000000/Giga-ohm-.
Gopura R.A.R.C., et al., "A Human Forearm and Wrist Motion Assist Exoskeleton Robot With EMG-Based Fuzzy-Neuro Control," Proceedings of the 2nd Biennial IEEE/RAS-EMBS International Conference on Biomedical Robotics and Biomechatronics, Oct. 19-22, 2008, 6 pages.
Hainich R.R., et al., "Chapter 10: Near-Eye Displays," Displays: Fundamentals & Applications, AK Peters/CRC Press, 2011, 65 pages.
Hauschild M., et al., "A Virtual Reality Environment for Designing and Fitting Neural Prosthetic Limbs," IEEE Transactions on Neural Systems and Rehabilitation Engineering, Mar. 2007, vol. 15 (1), pp. 9-15.
Hornstein S., et al., "Maradin's Micro-Mirror—System Level Synchronization Notes," SID Digest, 2012, pp. 981-984.
"IEEE 100 The Authoritative Dictionary of IEEE Standards Terms," Seventh Edition, Standards Information Network IEEE Press, Dec. 2000, 3 pages.
International Preliminary Report on Patentability for International Application No. PCT/US2014/017799, dated Sep. 3, 2015, 8 Pages.

(56) References Cited

OTHER PUBLICATIONS

International Preliminary Report on Patentability for International Application No. PCT/US2014/037863, dated Nov. 26, 2015, 8 pages.
International Preliminary Report on Patentability for International Application No. PCT/US2014/067443, dated Jun. 9, 2016, 7 pages.
International Preliminary Report on Patentability for International Application No. PCT/US2015/015675, dated Aug. 25, 2016, 8 Pages.
International Preliminary Report on Patentability for International Application No. PCT/US2017/043686, dated Feb. 7, 2019, 8 pages.
International Preliminary Report on Patentability for International Application No. PCT/US2017/043693, dated Feb. 7, 2019, 7 Pages.
International Preliminary Report on Patentability for International Application No. PCT/US2017/043791, dated Feb. 7, 2019, 9 Pages.
International Preliminary Report on Patentability for International Application No. PCT/US2017/043792, dated Feb. 7, 2019, 8 Pages.
International Preliminary Report on Patentability for International Application No. PCT/US2018/056768, dated Apr. 30, 2020, 7 pages.
International Preliminary Report on Patentability for International Application No. PCT/US2018/061409, dated May 28, 2020, 10 pages.
International Preliminary Report on Patentability for International Application No. PCT/US2019/015174, dated Aug. 6, 2020, 7 pages.
International Preliminary Report on Patentability for International Application No. PCT/US2019/015183, dated Aug. 6, 2020, 7 pages.
International Preliminary Report on Patentability for International Application No. PCT/US2019/015238, dated Aug. 6, 2020, 7 pages.
International Preliminary Report on Patentability for International Application No. PCT/US2019/028299, dated Dec. 10, 2020, 11 pages.
International Preliminary Report on Patentability for International Application No. PCT/US2019/031114, dated Nov. 19, 2020, 16 pages.
International Preliminary Report on Patentability for International Application No. PCT/US2019/034173, dated Dec. 10, 2020, 9 pages.
International Preliminary Report on Patentability for International Application No. PCT/US2019/046351, dated Feb. 25, 2021, 8 pages.
International Preliminary Report on Patentability for International Application No. PCT/US2019/049094, dated Mar. 11, 2021, 24 Pages.
International Preliminary Report on Patentability for International Application No. PCT/US2019/052131, dated Apr. 1, 2021, 8 pages.
International Preliminary Report on Patentability for International Application No. PCT/US2019/052151, dated Apr. 1, 2021, 9 pages.
International Preliminary Report on Patentability for International Application No. PCT/US2019/054716, dated Apr. 15, 2021, 10 pages.
International Preliminary Report on Patentability for International Application No. PCT/US2019/061759, dated May 27, 2021, 12 pages.
International Preliminary Report on Patentability for International Application No. PCT/US2019/063587, dated Jun. 10, 2021, 13 pages.
International Preliminary Report on Patentability for International Application No. PCT/US2020/049274, dated Mar. 17, 2022, 14 pages.
International Preliminary Report on Patentability for International Application No. PCT/US2020/061392, dated Jun. 9, 2022, 11 pages.
International Search Report and Written Opinion for International Application No. PCT/US2016/018293, dated Jun. 8, 2016, 17 Pages.
International Search Report and Written Opinion for International Application No. PCT/US2016/018298, dated Jun. 8, 2016, 14 Pages.
International Search Report and Written Opinion for International Application No. PCT/US2016/018299, dated Jun. 8, 2016, 12 Pages.
International Search Report and Written Opinion for International Application No. PCT/US2016/067246, dated Apr. 25, 2017, 10 Pages.
International Search Report and Written Opinion for International Application No. PCT/US2017/043686, dated Oct. 6, 2017, 9 Pages.
International Search Report and Written Opinion for International Application No. PCT/US2017/043693, dated Oct. 6, 2017, 7 Pages.
International Search Report and Written Opinion for International Application No. PCT/US2017/043791, dated Oct. 5, 2017, 10 Pages.
International Search Report and Written Opinion for International Application No. PCT/US2018/056768, dated Jan. 15, 2019, 8 pages.
International Search Report and Written Opinion for International Application No. PCT/US2018/061409, dated Mar. 12, 2019, 11 pages.
Levola T., "7.1: Invited Paper: Novel Diffractive Optical Components for Near to Eye Displays," SID Symposium Digest of Technical Papers, 2006, vol. 37 (1), pp. 64-67.
Li Y., et al., "Motor Function Evaluation of Hemiplegic Upper-Extremities Using Data Fusion from Wearable Inertial and Surface EMG Sensors," Sensors, MDPI, 2017, vol. 17 (582), pp. 1-17.
Liao C.D., et al., "The Evolution of MEMS Displays," IEEE Transactions on Industrial Electronics, Apr. 2009, vol. 56 (4), pp. 1057-1065.
Lippert T.M., "Chapter 6: Display Devices: RSD™ (Retinal Scanning Display)," The Avionics Handbook, CRC Press, 2001, 8 pages.
Lopes J., et al., "Hand/Arm Gesture Segmentation by Motion Using IMU and EMG Sensing," ScienceDirect, Jun. 27-30, 2017, vol. 11, pp. 107-113.
Majaranta P., et al., "Chapter 3: Eye Tracking and Eye-Based Human-Computer Interaction," Advances in Physiological Computing, Springer-Verlag London, 2014, pp. 39-65.
Marcard T.V., et al., "Sparse Inertial Poser: Automatic 3D Human Pose Estimation from Sparse IMUs," arxiv.org, Computer Graphics Forum, 2017, vol. 36 (2), 12 pages, XP080759137.
Martin H., et al., "A Novel Approach of Prosthetic Arm Control using Computer Vision, Biosignals, and Motion Capture," IEEE Symposium on Computational Intelligence in Robotic Rehabilitation and Assistive Technologies (CIR2AT), 2014, 5 pages.
Mcintee S.S., "A Task Model of Free-Space Movement-Based Geastures," Dissertation, Graduate Faculty of North Carolina State University, Computer Science, 2016, 129 pages.
Mendes Jr.J.J.A., et al., "Sensor Fusion and Smart Sensor in Sports and Biomedical Applications," Sensors, 2016, vol. 16 (1569), pp. 1-31.
Mohamed O.H., "Homogeneous Cognitive Based Biometrics for Static Authentication," Dissertation submitted to University of Victoria, Canada, 2010, [last accessed Oct. 11, 2019], 149 pages, Retrieved from the Internet: URL: http://hdl.handle.net/1828/321.
Morun C., et al., "Systems, Articles, and Methods for Capacitive Electromyography Sensors," U.S. Appl. No. 16/437,351, filed Jun. 11, 2019, 51 pages.
Naik G.R., et al., "Source Separation and Identification issues in Bio Signals: A Solution using Blind Source Separation," Chapter 4 of Recent Advances in Biomedical Engineering, Intech, 2009, 23 pages.
Naik G.R., et al., "Subtle Hand Gesture Identification for HCI Using Temporal Decorrelation Source Separation BSS of Surface EMG," Digital Image Computing Techniques and Applications, IEEE Computer Society, 2007, pp. 30-37.
Negro F., et al., "Multi-Channel Intramuscular and Surface EMG Decomposition by Convolutive Blind Source Separation," Journal of Neural Engineering, Feb. 29, 2016, vol. 13, 18 Pages.
Non-Final Office Action dated Mar. 1, 2018 for U.S. Appl. No. 14/553,657, filed Nov. 25, 2014, 29 Pages.
Non-Final Office Action dated Mar. 2, 2021 for U.S. Appl. No. 15/974,430, filed May 8, 2018, 32 Pages.
Non-Final Office Action dated May 2, 2018 for U.S. Appl. No. 15/799,628, filed Oct. 31, 2017, 25 Pages.

(56) References Cited

OTHER PUBLICATIONS

Non-Final Office Action dated Sep. 2, 2020 for U.S. Appl. No. 15/882,858, filed Jan. 29, 2018, 66 Pages.
Non-Final Office Action dated Aug. 3, 2020 for U.S. Appl. No. 16/593,446, filed Oct. 4, 2019, 44 pages.
Non-Final Office Action dated Jun. 3, 2021 for U.S. Appl. No. 15/816,435, filed Nov. 17, 2017, 32 Pages.
Non-Final Office Action dated Jun. 5, 2020 for U.S. Appl. No. 15/659,072, filed Jul. 25, 2017, 59 Pages.
Non-Final Office Action dated Nov. 6, 2018 for U.S. Appl. No. 16/057,573, filed Aug. 7, 2018, 14 Pages.
Non-Final Office Action dated Sep. 6, 2019 for U.S. Appl. No. 16/424,144, filed May 28, 2019, 11 Pages.
Non-Final Office Action dated Oct. 7, 2022 for U.S. Appl. No. 17/141,646, filed Jan. 5, 2021, 6 pages.
Non-Final Office Action dated Feb. 8, 2021 for U.S. Appl. No. 16/557,342, filed Aug. 30, 2019, 11 Pages.
Non-Final Office Action dated Oct. 8, 2020 for U.S. Appl. No. 16/577,207, filed Sep. 20, 2019, 51 Pages.
Non-Final Office Action dated Apr. 9, 2019 for U.S. Appl. No. 16/258,409, filed Jan. 25, 2019, 71 Pages.
Non-Final Office Action dated Aug. 11, 2021 for U.S. Appl. No. 16/577,207, filed Sep. 20, 2019, 35 Pages.
Non-Final Office Action dated Jun. 13, 2019 for U.S. Appl. No. 16/258,279, filed Jan. 25, 2019, 38 Pages.
Non-Final Office Action dated Sep. 14, 2017 for U.S. Appl. No. 14/539,773, filed Nov. 12, 2014, 28 pages.
Non-Final Office Action dated Jun. 15, 2020 for U.S. Appl. No. 16/292,609, filed Mar. 5, 2019, 26 Pages.
Non-Final Office Action dated Jun. 15, 2020 for U.S. Appl. No. 16/557,342, filed Aug. 30, 2019, 46 Pages.
Non-Final Office Action dated Jan. 16, 2020 for U.S. Appl. No. 16/389,419, filed Apr. 19, 2019, 26 Pages.
Non-Final Office Action dated May 16, 2019 for U.S. Appl. No. 15/974,384, filed May 8, 2018, 13 Pages.
Non-Final Office Action dated May 16, 2019 for U.S. Appl. No. 15/974,430, filed May 8, 2018, 12 Pages.
Non-Final Office Action dated Dec. 17, 2018 for U.S. Appl. No. 16/137,960, filed Sep. 21, 2018, 10 pages.
Non-Final Office Action dated Jan. 18, 2018 for U.S. Appl. No. 15/799,621, filed Oct. 31, 2017, 10 pages.
Non-Final Office Action dated Nov. 19, 2019 for U.S. Appl. No. 16/577,207, filed Sep. 20, 2019, 32 Pages.
Non-Final Office Action dated Aug. 20, 2020 for U.S. Appl. No. 15/974,454, filed May 8, 2018, 59 Pages.
Non-Final Office Action dated Dec. 20, 2019 for U.S. Appl. No. 15/974,454, filed May 8, 2018, 41 Pages.
Non-Final Office Action dated Jan. 22, 2020 for U.S. Appl. No. 15/816,435, filed Nov. 17, 2017, 35 Pages.
Non-Final Office Action dated Jun. 22, 2017 for U.S. Appl. No. 14/461,044, filed Aug. 15, 2014, 21 Pages.
Non-Final Office Action dated Oct. 22, 2019 for U.S. Appl. No. 16/557,342, filed Aug. 30, 2019, 16 Pages.
Non-Final Office Action dated Dec. 23, 2019 for U.S. Appl. No. 16/557,383, filed Aug. 30, 2019, 53 Pages.
Non-Final Office Action dated Dec. 23, 2019 for U.S. Appl. No. 16/557,427, filed Aug. 30, 2019, 52 Pages.
Non-Final Office Action dated Feb. 23, 2017 for U.S. Appl. No. 14/505,836, filed Oct. 3, 2014, 54 Pages.
Non-Final Office Action dated Jul. 23, 2020 for U.S. Appl. No. 16/593,446, filed Oct. 4, 2019, 28 pages.
Non-Final Office Action dated May 24, 2019 for U.S. Appl. No. 16/353,998, filed Mar. 14, 2019, 20 Pages.
Non-Final Office Action dated Feb. 25, 2021 for U.S. Appl. No. 14/461,044, filed Aug. 15, 2014, 17 Pages.
Csapo A.B., et al., "Evaluation of Human-Myo Gesture Control Capabilities in Continuous Search and Select Operations," 7th IEEE International Conference on Cognitive Infocommunications, Oct. 16-18, 2016, pp. 000415-000420.
Cui L., et al., "Diffraction From Angular Multiplexing Slanted vol. Hologram Gratings," Optik, 2005, vol. 116, pp. 118-122.
Curatu C., et al., "Dual Purpose Lens for an Eye-Tracked Projection Head-Mounted Display," International Optical Design Conference SPIE-OSA, 2006, vol. 6342, pp. 63420X-1-63420X-7.
Curatu C., et al., "Projection-Based Head-Mounted Display With Eye-Tracking Capabilities," Proceedings of SPIE, 2005, vol. 5875, pp. 58750J-1-58750J-9.
Davoodi R., et al., "Development of a Physics-Based Target Shooting Game to Train Amputee Users of Multi joint Upper Limb Prostheses," Presence, Massachusetts Institute of Technology, 2012, vol. 21 (1), pp. 85-95.
Delis A.L., et al., "Development of a Myoelectric Controller Based on Knee Angle Estimation," Biodevices, International Conference on Biomedical Electronics and Devices, Jan. 17, 2009, 7 pages.
Diener L., et al., "Direct Conversion From Facial Myoelectric Signals to Speech Using Deep Neural Networks," International Joint Conference on Neural Networks (IJCNN), Oct. 1, 2015, 7 pages.
Ding I-J., et al., "HMM with Improved Feature Extraction-Based Feature Parameters for Identity Recognition of Gesture Command Operators by Using a Sensed Kinect-Data Stream," Neurocomputing, 2017, vol. 262, pp. 108-119.
Essex D., "Tutorial on Optomechanical Beam Steering Mechanisms," OPTI 521 Tutorial, College of Optical Sciences, University of Arizona, 2006, 8 pages.
European Search Report for European Application No. 19861903.3, dated Oct. 12, 2021, 2 pages.
European Search Report for European Application No. 19863248.1, dated Oct. 19, 2021, 2 pages.
European Search Report for European Application No. 19868789.9, dated May 9, 2022, 9 pages.
European Search Report for European Application No. 19890394.0, dated Apr. 29, 2022, 9 pages.
Extended European Search Report for European Application No. 17835111.0, dated Nov. 21, 2019, 6 pages.
Extended European Search Report for European Application No. 17835112.8, dated Feb. 5, 2020, 17 pages.
Extended European Search Report for European Application No. 17835140.9, dated Nov. 26, 2019, 10 Pages.
Extended European Search Report for European Application No. 18869441.8, dated Nov. 17, 2020, 20 Pages.
Extended European Search Report for European Application No. 18879156.0, dated Mar. 12, 2021, 11 pages.
Extended European Search Report for European Application No. 19743717.1, dated Mar. 3, 2021, 12 pages.
Extended European Search Report for European Application No. 19744404.5, dated Mar. 29, 2021, 11 pages.
Extended European Search Report for European Application No. 19799947.7, dated May 26, 2021, 10 pages.
Extended European Search Report for European Application No. 19806723.3, dated Jul. 7, 2021, 13 pages.
Extended European Search Report for European Application No. 19810524.9, dated Mar. 17, 2021, 11 pages.
Extended European Search Report for European Application No. 19850130.6, dated Sep. 1, 2021, 14 Pages.
Extended European Search Report for European Application No. 19855191.3, dated Dec. 6, 2021, 11 pages.
Extended European Search Report for European Application No. 19883839.3, dated Dec. 15, 2021, 7 pages.
Farina D., et al., "Man/Machine Interface Based on the Discharge Timings of Spinal Motor Neurons After Targeted Muscle Reinnervation," Nature Biomedical Engineering, Feb. 6, 2017, vol. 1, Article No. 0025, pp. 1-12.
Favorskaya M., et al., "Localization and Recognition of Dynamic Hand Gestures Based on Hierarchy of Manifold Classifiers," International Archives of the Photogrammetry, Remote Sensing and Spatial Information Sciences, May 25-27, 2015, vol. XL-5/W6, pp. 1-8.
Fernandez E., et al., "Optimization of a Thick Polyvinyl Alcohol-Acrylamide Photopolymer for Data Storage Using a Combination of Angular and Peristrophic Holographic Multiplexing," Applied Optics, Oct. 10, 2009, vol. 45 (29), pp. 7661-7666.

(56) References Cited

OTHER PUBLICATIONS

Final Office Action dated Jun. 2, 2020 for U.S. Appl. No. 15/882,858, filed Jan. 29, 2018, 127 Pages.
Final Office Action dated Jun. 2, 2020 for U.S. Appl. No. 16/557,383, filed Aug. 30, 2019, 66 Pages.
Final Office Action dated Nov. 3, 2020 for U.S. Appl. No. 15/974,430, filed May 8, 2018, 27 Pages.
Final Office Action dated Feb. 4, 2020 for U.S. Appl. No. 16/577,207, filed Sep. 20, 2019, 76 Pages.
Final Office Action dated Feb. 4, 2021 for U.S. Appl. No. 15/882,858, filed Jan. 29, 2018, 42 Pages.
Final Office Action dated Jun. 5, 2020 for U.S. Appl. No. 16/557,427, filed Aug. 30, 2019, 95 Pages.
Final Office Action dated Oct. 8, 2020 for U.S. Appl. No. 16/557,342, filed Aug. 30, 2019, 73 Pages.
Final Office Action dated Apr. 9, 2020 for U.S. Appl. No. 15/974,454, filed May 8, 2018, 19 Pages.
Final Office Action dated Dec. 11, 2019 for U.S. Appl. No. 15/974,430, filed May 8, 2018, 30 Pages.
Final Office Action dated Jan. 13, 2021 for U.S. Appl. No. 16/577,207, filed Sep. 20, 2019, 91 Pages.
Final Office Action dated Dec. 18, 2019 for U.S. Appl. No. 16/258,279, filed Jan. 25, 2019, 45 Pages.
Final Office Action dated Nov. 18, 2020 for U.S. Appl. No. 14/461,044, filed Aug. 15, 2014, 14 Pages.
Final Office Action dated Feb. 19, 2021 for U.S. Appl. No. 16/258,279, filed Jan. 25, 2019, 58 Pages.
Final Office Action dated Jul. 23, 2021 for U.S. Appl. No. 14/461,044, filed Aug. 15, 2014, 15 Pages.
Final Office Action dated Sep. 23, 2020 for U.S. Appl. No. 15/816,435, filed Nov. 17, 2017, 70 Pages.
Final Office Action dated Jan. 28, 2020 for U.S. Appl. No. 16/557,342, filed Aug. 30, 2019, 15 Pages.
Final Office Action dated Jul. 28, 2017 for U.S. Appl. No. 14/505,836, filed Oct. 3, 2014, 52 Pages.
Final Office Action dated Jun. 28, 2021 for U.S. Appl. No. 16/557,342, filed Aug. 30, 2019, 11 Pages.
Final Office Action dated Nov. 29, 2019 for U.S. Appl. No. 15/659,072, filed Jul. 25, 2017, 36 Pages.
Final Office Action dated Nov. 29, 2019 for U.S. Appl. No. 16/353,998, filed Mar. 14, 2019, 33 Pages.
Final Office Action received for U.S. Appl. No. 14/155,087 dated Dec. 16, 2016, 32 pages.
Al-Jumaily A., et al., "Electromyogram(EMG) Driven System based Virtual Reality for Prosthetic and Rehabilitation Devices," Proceedings of the 11TH Internationalconference on Information Integration Andweb-Based Applications Services, Jan. 1, 2009, pp. 582-586.
Al-Mashhadany Y.I., "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages.
Ai-Timemy A.H., et al., "Improving the Performance Against Force Variation of EMG Controlled Multifunctional Upper-Limb Prostheses for Transradial Amputees," IEEE Transactions on Neural Systems and Rehabilitation Engineering, Jun. 2016, vol. 24 (6), 12 Pages.
Amitai Y., "P-27: A Two-Dimensional Aperture Expander for Ultra-Compact, High-Performance Head-Worn Displays," SID Symposium Digest of Technical Papers, 2005, vol. 36 (1), pp. 360-363.
Arkenbout E.A., et al., "Robust Hand Motion Tracking through Data Fusion of 5DT Data Glove and Nimble VR Kinect Camera Measurements," Sensors, 2015, vol. 15, pp. 31644-31671.
Ayras P., et al., "Exit Pupil Expander With a Large Field of View Based on Diffractive Optics," Journal of the SID, 2009, vol. 17 (8), pp. 659-664.

Bailey et al., Wearable Muscle Interface Systems, Devices and Methods That Interact With Content Displayed On an Electronic Display, Office Action dated Mar. 31, 2015, for U.S. Appl. No. 14/155,107, 17 pages.
Bailey et al., "Muscle Interface Device and Method for Interacting With Content Displayed on Wearable Head Mounted Displays," Amendment filed Aug. 25, 2015, for U.S. Appl. No. 14/155,087, 10 pages.
Bailey et al., "Muscle Interface Device and Method for Interacting With Content Displayed on Wearable Head Mounted Displays," Amendment filed Aug. 9, 2016, for U.S. Appl. No. 14/155,087, 8 pages.
Bailey et al., "Muscle Interface Device and Method for Interacting With Content Displayed on Wearable Head Mounted Displays," Amendment filed May 17, 2016, for U.S. Appl. No. 14/155,087, 13 pages.
Bailey et al., "Muscle Interface Device and Method for Interacting With Content Displayed on Wearable Head Mounted Displays," Office Action dated Feb. 17, 2016, for U.S. Appl. No. 14/155,087, 16 pages.
Bailey et al., "Muscle Interface Device and Method for Interacting With Content Displayed on Wearable Head Mounted Displays," Office Action dated Jul. 20, 2015, for U.S. Appl. No. 14/155,087, 14 pages.
Bailey et al., "Muscle Interface Device and Method for Interacting With Content Displayed on Wearable Head Mounted Displays," Office Action dated Jul. 8, 2016, for U.S. Appl. No. 14/155,087, 16 pages.
Bailey et al., "Muscle Interface Device and Method for Interacting With Content Displayed on Wearable Head Mounted Displays," Office Action dated Mar. 31, 2015, for U.S. Appl. No. 14/155,087, 15 pages.
Bailey et al., "Muscle Interface Device and Method for Interacting With Content Displayed on Wearable Head Mounted Displays," Preliminary Amendment filed Jan. 28, 2014, for U.S. Appl. No. 14/155,087, 8 pages.
Bailey et al., "Wearable Muscle Interface Systems, Devices and Methods That Interact With. Content Displayed on an Electronic Display," Amendment filed Aug. 9, 2016, for U.S. Appl. No. 14/155,107, 8 pages.
Bailey et al., "Wearable Muscle Interface Systems, Devices and Methods That Interact With Content Displayed on an Electronic Display," Amendment filed May 11, 2016, for U.S. Appl. No. 14/155,107, 15 pages.
Bailey et al., Wearable Muscle Interface Systems, Devices and Methods That Interact With Content Displayed on an Electronic Display/ Office Action dated Feb. 11, 2016, for U.S. Appl. No. 14/155,107, 20 pages.
Bailey et al., Wearable Muscle Interface Systems, Devices and Methods That Interact With Content Displayed on an Electronic Display, Office Action dated Jul. 16, 2015, for U.S. Appl. No. 14/155,107, 20 pages.
Bailey et al., Wearable Muscle Interface Systems. Devices and Methods That Interact With Content Displayed on an Electronic Display/ Office Action dated Jul. 8, 2016, for U.S. Appl. No. 14/155,107, 21 pages.
Benko H., et al., "Enhancing Input On and Above the Interactive Surface with Muscle Sensing," The ACM International Conference on Interactive Tabletops and Surfaces (ITS), Nov. 23-25, 2009, pp. 93-100.
Berenzweig A., et al., "Wearable Devices and Methods for Improved Speech Recognition," U.S. Appl. No. 16/785,680, filed Feb. 10, 2020, 67 pages.
Boyali A., et al., "Spectral Collaborative Representation based Classification for Hand Gestures Recognition on Electromyography Signals," Biomedical Signal Processing and Control, 2016, vol. 24, pp. 11-18.
Cannan J., et al., "A Wearable Sensor Fusion Armband for Simple Motion Control and Selection for Disabled and Non-Disabled Users," Computer Science and Electronic Engineering Conference, IEEE, Sep. 12, 2012, pp. 216-219, XP032276745.
Chellappan K.V., et al., "Laser-Based Displays: A Review," Applied Optics, Sep. 1, 2010, vol. 49 (25), pp. F79-F98.

(56) References Cited

OTHER PUBLICATIONS

Cheng J., et al., "A Novel Phonology- and Radical-Coded Chinese Sign Language Recognition Framework Using Accelerometer and Surface Electromyography Sensors," Sensors, 2015, vol. 15, pp. 23303-23324.
Communication Pursuant to Article 94(3) for European Patent Application No. 17835112.8, dated Dec. 14, 2020, 6 Pages.
Co-pending U.S. Appl. No. 15/659,072, inventors Patrick; Kaifosh et al., filed Jul. 25, 2017.
Co-pending U.S. Appl. No. 15/816,435, inventors Ning; Guo et al., filed Nov. 17, 2017.
Co-pending U.S. Appl. No. 15/882,858, inventors Stephen; Lake et al., filed Jan. 29, 2018.
Co-pending U.S. Appl. No. 15/974,430, inventors Adam; Berenzweig et al., filed May 8, 2018.
Co-pending U.S. Appl. No. 16/353,998, inventors Patrick; Kaifosh et al., filed Mar. 14, 2019.
Co-pending U.S. Appl. No. 16/557,383, inventors Adam; Berenzweig et al., filed Aug. 30, 2019.
Co-pending U.S. Appl. No. 16/557,427, inventors Adam; Berenzweig et al., filed Aug. 30, 2019.
Co-Pending U.S. Appl. No. 15/974,430, filed May 8, 2018, 44 Pages.
Co-Pending U.S. Appl. No. 16/353,998, filed Mar. 14, 2019, 43 pages.
Co-Pending U.S. Appl. No. 16/557,383, filed Aug. 30, 2019, 94 Pages.
Co-Pending U.S. Appl. No. 16/557,427, filed Aug. 30, 2019, 93 Pages.
Co-Pending U.S. Appl. No. 16/577,207, filed Sep. 20, 2019, 67 Pages.
Co-Pending U.S. Appl. No. 14/505,836, filed Oct. 3, 2014, 59 Pages.
Co-Pending U.S. Appl. No. 15/816,435, filed Nov. 17, 2017, 24 Pages.
Co-Pending U.S. Appl. No. 15/882,858, filed Jan. 29, 2018, 54 Pages.
Co-Pending U.S. Appl. No. 15/974,384, filed May 8, 2018, 44 Pages.
Co-Pending U.S. Appl. No. 15/974,454, filed May 8, 2018, 45 Pages.
Co-Pending U.S. Appl. No. 16/557,342, filed Aug. 30, 2019, 93 Pages.
Co-Pending U.S. Appl. No. 16/430,299, filed Jun. 3, 2019, 42 Pages.
Corazza S., et al.," A Markerless Motion Capture System to Study Musculoskeletal Biomechanics: Visual Hull and Simulated Annealing Approach," Annals of Biomedical Engineering, Jul. 2006, vol. 34 (6), pp. 1019-1029, [Retrieved on Dec. 11, 2019], 11 pages, Retrieved from the Internet: URL: https://www.researchgate.net/publication/6999610_A_Markerless_Motion_Capture_System_to_Study_Musculoskeletal_Biomechanics_Visual_Hull_and_Simulated_Annealing_Approach.
Corrected Notice of Allowance dated Mar. 17, 2023 for U.S. Appl. No. 17/141,646, filed Jan. 5, 2021, 2 pages.
Cote-Allard U., et al., "Deep Learning for Electromyographic Hand Gesture Signal Classification Using Transfer Learning," IEEE Transactions on Neural Systems and Rehabilitation Engineering, Jan. 26, 2019, vol. 27 (4), 11 Pages.

\* cited by examiner

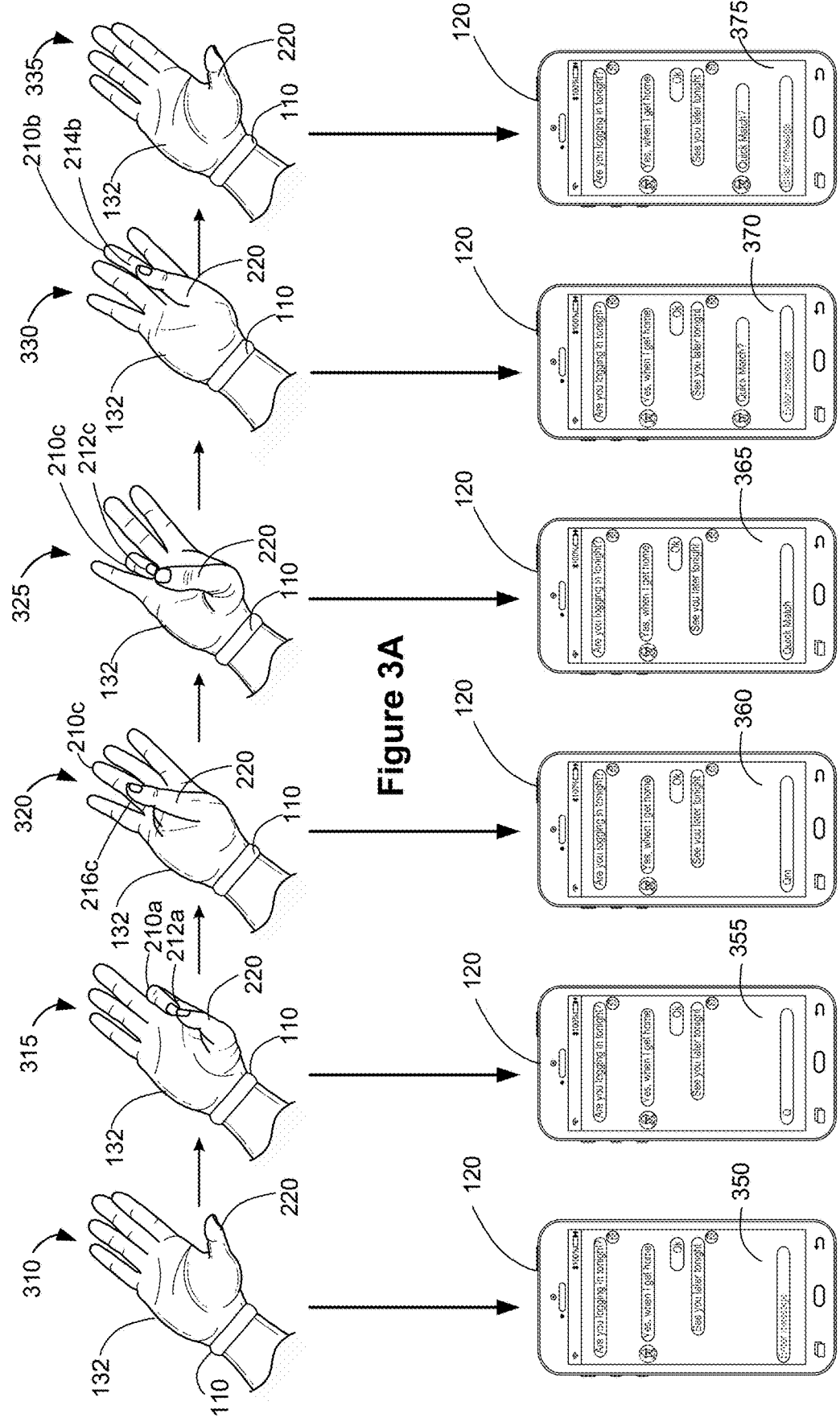

700 (Cont.)

714-a
Receive one more sequence of neuromuscular signals indicating that the user is instructing the thumb on the user's hand to contact the different portion of the user's hand thrice, the different portion of the user's hand is also associated with a second additional input command available at the computing device, the second additional input command being distinct from the additional input command and the first additional input command; and

714-b
In response to receiving the one more sequence of neuromuscular signals indicating that the user is instructing the thumb on the user's hand to contact the different portion of the user's hand thrice, provide data to the computing device to cause the computing device to perform the second additional input command.

716-a
The portion of the user's hand is a palm-side portion of a first finger of the user's hand, and

716-b
the different portion of the user's hand is a palm-side portion of a second finger of the user's hand.

718-a
The portion of the user's hand is a palm-side portion of the first finger that is located above one of the distal phalange of the first finger, the intermediate phalange of the first finger, or the proximal phalange of the first finger, and

718-a
The different portion of the user's hand is a palm-side portion of the second finger that is located above one of the distal phalange of the second finger, the intermediate phalange of the second finger, or the proximal phalange of the second finger.

720
Each finger of the user's hand is associated with a different command available at the computing device.

722
The input commands each correspond to typing commands.

724
Performing the at least one input command at the computing device includes causing selection of an alphanumeric symbol and updating a user interface presented by the computing device to reflect selection of the symbol.

726
Performing the at least one input command at the computing device includes performing an action associated with a modifier key.

728
The sequence of neuromuscular signals is processed using a trained statistical model that was determined using stored sequences of neuromuscular signals to determine that the user is instructing the thumb on the user's hand to contact the portion of the user's hand.

730
The sequence of neuromuscular signals is received without requiring the user to wear sensors on any part of the user's hand.

732
Performance of the at least one command at the computing device includes causing a visual change within an artificial-reality interface controlled at least in part by the computing device.

734
Causing the visual change within the artificial-reality interface includes causing the visual change within a messaging application available with the artificial-reality interface.

Figure 7D

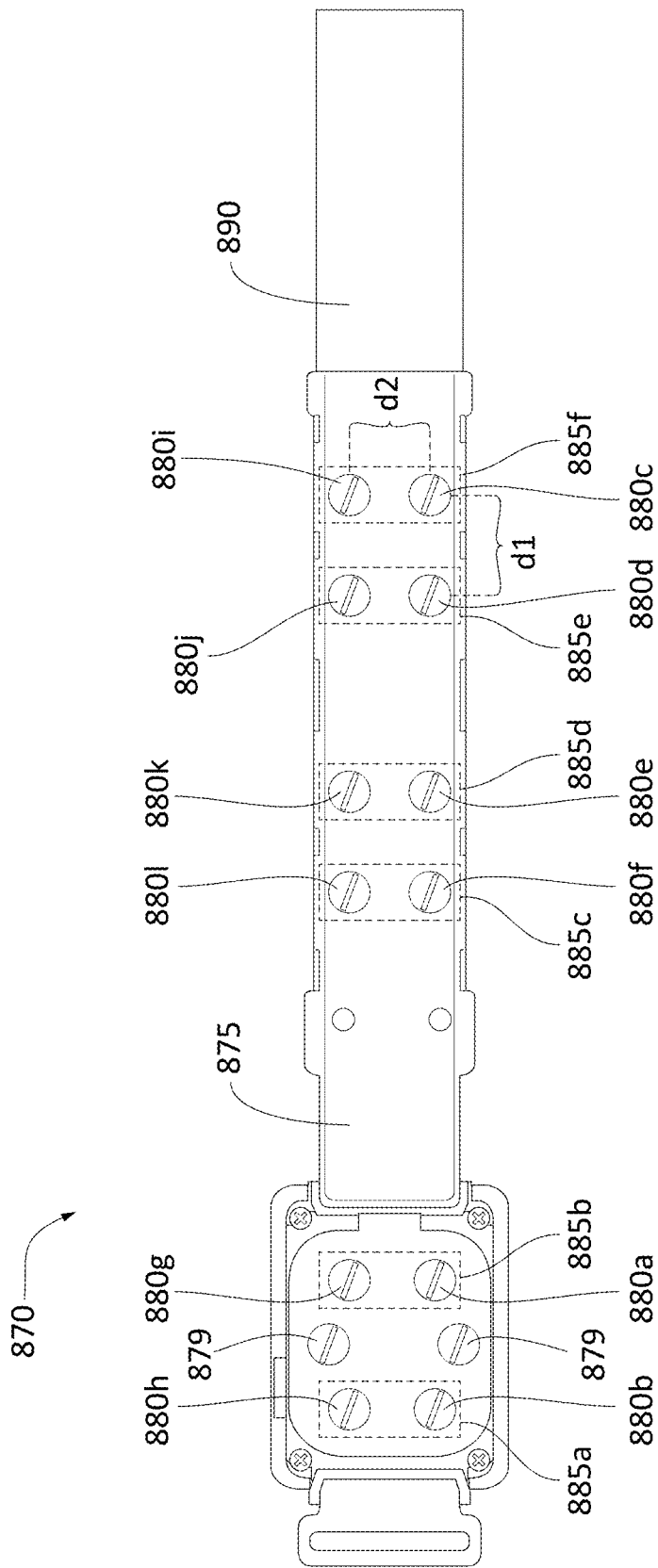

WEARABLE DEVICE PROVIDING FOR THUMB-TO-FINGER-BASED INPUT GESTURES DETECTED BASED ON NEUROMUSCULAR SIGNALS, AND SYSTEMS AND METHODS OF USE THEREOF

RELATED APPLICATION

This application claims priority to U.S. Provisional Patent Application No. 63/172,588, filed Apr. 8, 2021, entitled "Wearable Device Providing for Thumb-To-Finger-Based Input Gestures Detected Based on Neuromuscular Signals, and Systems and Methods of Use Thereof," which is hereby incorporated by reference in its entirety.

TECHNICAL FIELD

The present disclosure relates generally to wearable devices and methods for sensing neuromuscular signals (e.g., used to determine motor actions that the user intends to perform with their hand), and more particularly, to arm-wearable devices including a wearable structure configured to detect neuromuscular signals based on actual or intended movements of a user's thumb to contact a portion of a user's fingers.

BACKGROUND

Some wearable devices use full-range and space-consuming user movements, such as entire arm, hand, and/or body movements, to detect motor actions of a user. These devices use the detected motor actions to identify user gestures that correspond to instructions that can be provided as inputs to different computing devices. These full-range movements can be socially unacceptable, and are also unsuitable for text-input operations such as providing typing inputs. Further, to perform the full-range user movements, the user is required to have a minimum amount space available (e.g., at least an arm-width of space) and is required to expend considerably more energy than is required to operate a phone, tablet, or other handheld devices.

As such, it would be desirable to address one or more of the above-identified issues by providing wearable devices that can detect motor actions of a user in a user-friendly, convenient, discrete, socially acceptable manner (especially for text-input operations) while accurately detecting motor actions to control operations performed at a computing device.

SUMMARY

The wearable devices and methods described herein address at least one of the above-mentioned drawings by causing the performance of commands at a computing device based on detected neuromuscular signals from one-handed gestures (e.g., thumb-to-finger-based gestures, which can be gestures in which a user either intends to or actually does cause their thumb to contact some portion of one of their fingers). In particular, the wearable devices and methods described herein detect a sequence or pattern of neuromuscular signals based on a user instructing (or intending to instruct) a thumb on his or her hand to contact a portion of his or her hand. The portion of the user's hand is associated with a corresponding input command at a computing device (e.g., associations between respective portions of the user's hand and respective input comments (e.g., the input commands can be actuations of various alphanumeric characters or command keys from a keyboard) can be predefined and stored in a memory of the computing device and/or the wearable device, such that when a thumb-initiated gesture at a respective portion of the user's hand is detected, the predefined association between that respective portion and a respective input command can be retrieved to allow for performance of the respective input command). The wearable devices and methods described herein, after receiving or detecting the sequence of neuromuscular signals indicating that the user is instructing his or her thumb to contact the portion of his or her hand, provide data to the computing device which causes the computing device to perform the input command. The portion of the user's hand can be palm side portions of a finger (e.g., pointer finger, middle finger, ring finger, pinky finger), dorsal portions of the finger, side portions of the finger, as well as any other surface on the user's hand that can be contacted by his or her thumb. The wearable devices and methods described herein allow for minimal user movement to provide the desired input commands at a computing device, which reduces the amount of space required by a user to perform a recognizable gesture (e.g., limiting movement to the user's hand, which can be move discretely), reduces a total amount of energy that a user must expend to perform a gesture, and reduce or eliminate the use of large awkward movements to perform the gesture. These improvements allow for the wearable device to be designed such that it is comfortable, functional, practical, and socially acceptable for day-to-day use. These improvements are also important for text-based input commands, such as typing within a messaging application or document-editing application, as currently known gestures for such text-based input commands can be cumbersome and inefficient especially when used in artificial-reality environments (such as artificial-reality and virtual-reality environments).

Further, the wearable devices described herein can also improve users' interactions with artificial-reality environments and also improve user adoption of artificial-reality environments more generally by providing a form factor that is socially acceptable and compact, thereby allowing the user to wear the device throughout their day (and thus making it easier to interact with such environments in tandem with (as a complement to) everyday life). As one example, the wearable devices and gestures described herein, in one embodiment, provide improved techniques for text-based input gestures used with artificial-reality environments. In the descriptions that follow, references are made to artificial-reality environments, which include, but are not limited to, virtual-reality (VR) environments (including non-immersive, semi-immersive, and fully-immersive VR environments), augmented-reality environments (including marker-based augmented-reality environments, markerless augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein can be used with any of these types of artificial-reality environments.

(A1) In accordance with some embodiments, a method of causing performance of commands at a computing device based on neuromuscular signals from thumb-initiated gestures is provided. The method includes receiving a sequence of neuromuscular signals indicating that a user is instructing a thumb on the user's hand to contact a portion of the user's hand. The portion of the user's hand is associated with at least one input command available at a computing device. The method further includes, in response to receiving the sequence of neuromuscular signals indicating that the user is instructing the thumb on the user's hand to contact the portion of the user's hand, data is provided to the computing device to cause the computing device to perform the at least one input command.

(A2) In some embodiments of (A1), the method includes receiving a second sequence of neuromuscular signals indicating that the user is instructing the thumb on the user's hand to contact the portion of the user's hand twice. The user's hand may also be associated with a second input command available at the computing device, and the second input command is distinct from the at least one input command. The method further includes, in response to receiving the second sequence of neuromuscular signals indicating that the user is instructing the thumb on the user's hand to contact the portion of the user's hand twice and providing data to the computing device to cause the computing device to perform the second input command.

(A3) In some embodiments of any of (A1)-(A2), the method includes receiving a third sequence of neuromuscular signals indicating that the user is instructing the thumb on the user's hand to contact the portion of the user's hand thrice (i.e., three times). The portion of the user's hand is also associated with a third input command available at the computing device, and the third input command is distinct from the at least one input command and the second input command. The method further includes, in response to receiving the third sequence of neuromuscular signals indicating that the user is instructing the thumb on the user's hand to contact the portion of the user's hand thrice, providing data to the computing device to cause the computing device to perform the third input command.

(A4) In some embodiments of any of (A1)-(A3), the method includes receiving another sequence of neuromuscular signals indicating that the user is instructing the thumb on the user's hand to contact a different portion of the user's hand. The different portion of the user's hand is distinct from the portion of the user's hand, and the different portion of the user's hand is associated with an additional input command available at the computing device. The method includes, in response to receiving the other sequence of neuromuscular signals indicating that the user is instructing the thumb on the user's hand to contact the different portion of the user's hand, providing data to the computing device to cause the computing device to perform the additional input command.

(A5) In some embodiments of any of (A1)-(A4), the method includes receiving an additional sequence of neuromuscular signals indicating that the user is instructing the thumb on the user's hand to contact the different portion of the user's hand twice. The different portion of the user's hand is also associated with a first additional input command available at the computing device, the first additional input command being distinct from the additional input command. The method includes, in response to receiving the additional sequence of neuromuscular signals, indicating that the user is instructing the thumb on the user's hand to contact the different portion of the user's hand twice, providing data to the computing device to cause the computing device to perform the first additional input command.

(A6) In some embodiments of any of (A1)-(A5), the method includes receiving one more sequences of neuromuscular signals indicating that the user is instructing the thumb on the user's hand to contact the different portion of the user's hand thrice. The different portion of the user's hand is also associated with a second additional input command available at the computing device, the second additional input command being distinct from the additional input command and the first additional input command. In response to receiving the one more sequence of neuromuscular signals indicating that the user is instructing the thumb on the user's hand to contact the different portion of the user's hand thrice, the method includes providing data to the computing device to cause the computing device to perform the second additional input command.

(A7) In some embodiments of any of (A1)-(A6), the portion of the user's hand is a palm-side portion of a first finger of the user's hand, and the different portion of the user's hand is a palm-side portion of a second finger of the user's hand.

(A8) In some embodiments of any of (A1)-(A7), the portion of the user's hand is a palm-side portion of the first finger that is located above one of the distal phalange of the first finger, the intermediate phalange of the first finger, or the proximal phalange of the first finger; and the different portion of the user's hand is a palm-side portion of the second finger that is located above one of the distal phalange of the second finger, the intermediate phalange of the second finger, or the proximal phalange of the second finger.

(A9) In some embodiments of any of (A1)-(A8), each finger of the user's hand is associated with a different command available at the computing device.

(A10) In some embodiments of any of (A1)-(A9), the input commands each correspond to typing commands (e.g., commands which cause actuation or selection of a character or command typically found on a QWERTY keyboard).

(A11) In some embodiments of any of (A1)-(A10), performing the at least one input command at the computing device includes causing selection of an alphanumeric symbol and updating a user interface presented by the computing device to reflect selection of the symbol.

(A12) In some embodiments of any of (A1)-(A11), performing the at least one input command at the computing device includes performing an action associated with a modifier key.

(A13) In some embodiments of any of (A1)-(A12), the sequence of neuromuscular signals indicating that the user is instructing the thumb on the user's hand to contact the portion of the user's hand is received without requiring the thumb to make contact with the portion of the user's hand.

(A14) In some embodiments of any of (A1)-(A13), the sequence of neuromuscular signals is processed using a trained statistical model that was determined using stored sequences of neuromuscular signals to determine that the user is instructing the thumb on the user's hand to contact the portion of the user's hand.

(A15) In some embodiments of any of (A1)-(A14), the sequence of neuromuscular signals is received without requiring the user to wear sensors on any part of the user's hand (e.g., no sensors worn on individual digits, but a wearable device can still be worn on user's wrist or forearm (not hand) to detect the neuromuscular signals).

(A16) In some embodiments of any of (A1)-(A15), the performance of the at least one command at the computing device includes causing a visual change within an artificial-reality interface controlled at least in part by the computing device.

(A17) In some embodiments of any of (A1)-(A16), causing the visual change within the virtual-reality or augmented-reality interface includes causing the visual change within a messaging application available within the artificial-reality interface.

(B1) In accordance with some embodiments, a wearable device for causing performance of commands at a computing device based on neuromuscular signals from thumb-initiated gestures is provided. The wearable device includes a plurality of neuromuscular sensors (which are electrodes for the purposes of this example) for detecting a sequence of neuromuscular signals indicating that a user is instructing a thumb on the user's hand to contact a portion of the user's hand. The portion of the user's hand is associated with at least one input command available at a computing device. The device includes a processor communicatively coupled with the plurality of electrodes. A processor in communication with the wearable device (either local to or remotely located from the wearable device) is configured to receive the sequence of neuromuscular signals indicating that the user is instructing the thumb on the user's hand to contact a portion of the user's hand. In response to receiving the sequence of neuromuscular signals indicating that the user is instructing the thumb on the user's hand to contact the portion of the user's hand, the processor provides data to the computing device to cause the computing device to perform the at least one input command.

(B2) In some embodiments of (B1), the processor is further configured to perform or cause performance of the method of any of claims (A2)-(A17).

(C1) In accordance with some embodiments, a system for performing commands at a computing device based on neuromuscular signals from thumb-initiated gestures detected by a wearable device is presented. The system includes a wearable device. The wearable device includes a plurality of neuromuscular sensors (e.g., electrodes in some example embodiments) for detecting a sequence of neuromuscular signals indicating that a user is instructing a thumb on the user's hand to contact a portion of the user's hand. The portion of the user's hand is associated with at least one input command available at a computing device. The system includes a processor communicatively coupled with the wearable device. The processor is configured to receive data regarding the sequence of neuromuscular signals indicating that the user is instructing the thumb on the user's hand to contact a portion of the user's hand. The processor is also configured to determine that the user is instructing the thumb on the user's hand to contact the portion of the user's hand, and, in response, to provide data to the computing device to cause the computing device to perform the at least one input command. The computing device is configured to receive the data and perform the at least one input command within a user interface generated at least in part by the computing device.

(C2) In some embodiments of (C1), the processor of the system is further configured to perform or cause performance of the method of any of claims (A2)-(A17).

(D1) In accordance with some embodiments, a wearable device for causing performance of commands at a computing device based on neuromuscular signals (e.g., surface electromyography signals) from thumb-initiated gestures is provided. The wearable device includes means for detecting a sequence of neuromuscular signals indicating that a user is instructing a thumb on the user's hand to contact a portion of the user's hand. The portion of the user's hand is associated with at least one input command available at a computing device. The wearable device also includes means for receiving data regarding the sequence of neuromuscular signals indicating that the user is instructing the thumb on the user's hand to contact a portion of the user's hand and means for, in response to receiving the sequence of neuromuscular signals indicating that the user is instructing the thumb on the user's hand to contact the portion of the user's hand, providing data to the computing device to cause the computing device to perform the at least one input command.

(D2) In some embodiments of (D1), the wearable device further includes means for performing or causing performance of the method of any of (A2)-(A17).

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the subject matter described herein.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features as the person of skill in this art will appreciate upon reading this disclosure.

FIGS. 3A and 3B illustrate an example of a computing device performing one or more input commands based on detected sequences or patterns of neuromuscular signals, in accordance with some embodiments.

FIGS. 7A-7D are detailed flow diagrams illustrating a method of causing performance of commands at a computing device based on neuromuscular signals from thumb-initiated gestures, in accordance with some embodiments.

FIGS. 8A-8C illustrate a wearable device, in accordance with some embodiments.

Figure 1A:
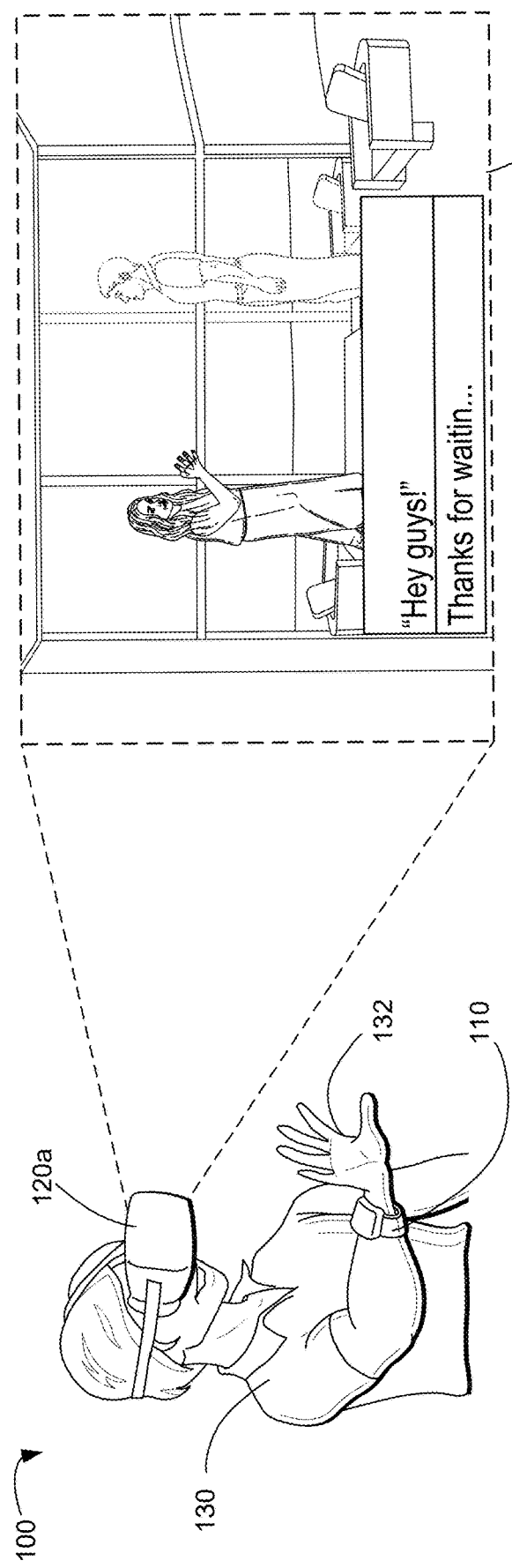
FIGS. 1A and 1B illustrates gesture detection systems used in conjunction with a messaging application in an artificial-reality environment, in accordance with some embodiments.

In accordance with common practice, the various features illustrated in the drawings may not be drawn to scale. Accordingly, the dimensions of the various features may be arbitrarily expanded or reduced for clarity. In addition, some

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to avoid obscuring pertinent aspects of the embodiments described herein.

Figure 1B:
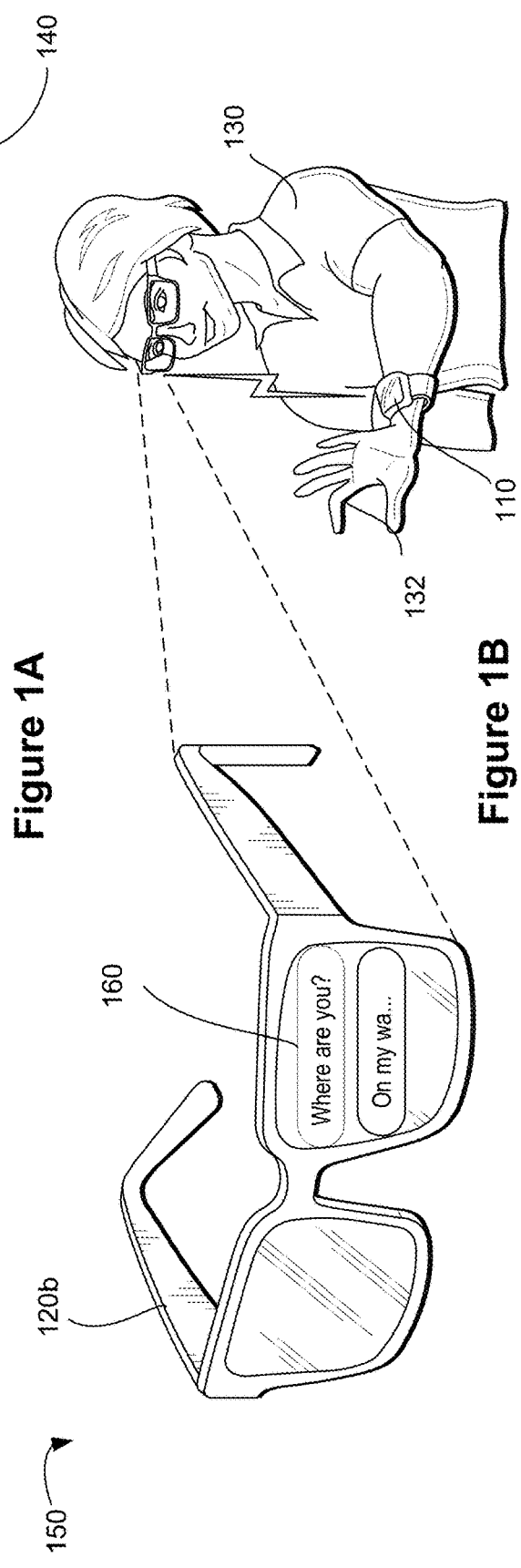

FIGS. 1A and 1B illustrate gesture detection systems 100 and 150, in accordance with some implementations. In some embodiments, the gesture detection system 100 includes wearable device 110 communicatively coupled to one or more computing devices 120 (e.g., controllable devices). In some embodiments, the wearable device 110 is one or more of a human-machine interface, an interface device, a control device, a control interface, and/or other similar devices. The wearable device 110 is configured to receive one or more neuromuscular signals travelling to a hand 132 (after travelling via a user's wrist, forearm, and/or arm, depending on where the wearable device 110 is worn) of the user 130 and determine one or more instructions based on the user 130's actions, which are provided to one or more computing devices 120 as described in detail below. The neuromuscular signals as used herein refer to actual touching or intention to touch as neuromuscular signals travel to the user's 130 hand even when performance of the motor action is blocked (such as when the user's hand 132 is restrained or when the user 130 has a physical impairment (such as a missing limb or finger)). In some embodiments, the one or more computing devices 120 are controllable devices, such as one or more of a head-mounted device (e.g., artificial reality headset), a smartphone, a tablet, a laptop, a computer, a robot, an augmented reality system (such as augmented-reality glasses (another instance of a computing device 120b) depicted in FIG. 1B), a virtual-reality system, a vehicle, a virtual avatar, a user interface, and/or other similar electronic device and/or controllable interfaces.

In some embodiments, the wearable device 110 includes a plurality of neuromuscular sensors 810 (FIG. 8A; also referred to herein as sensors, which in some embodiments are electrodes used to sense the neuromuscular signals) for receiving or detecting a sequence of neuromuscular signals indicating that the user 130 is instructing (or intending to instruct) a thumb on his or her hand 132 to contact some other predefined portion of his or her hand 132 (predefined in the sense that the other portion of the user's hand can be associated in memory with particular input commands, such that the relationship between a respective portion of the user's and a particular input command is predefined in the memory when the thumb-initiated gestures are later detected). In some embodiments, the plurality of neuromuscular sensors 810 of the wearable device 110 are configured to receive or detect a pattern of neuromuscular signals indicating that the user 130 is instructing (or intending to instruct) a thumb on his or her hand 132 to contact a portion of his or her hand 132. One or more portions of the user's hand 132 are associated with at least one input command available at a computing device 120, such that the one or more portions of the user's hand 132 are predefined hand portions each respectively associated with one or particular input commands to be performed upon detecting the user's intention to contact a respective predefined hand portion with their thumb. In some embodiments, the sequence or pattern of neuromuscular signals are detected using at least one sensor of the plurality of neuromuscular sensors 810. Alternatively, in some embodiments, the sequence or pattern of neuromuscular signals are detected using two or more sensors of the plurality of neuromuscular sensors 810. In some embodiments, the plurality of neuromuscular sensors 810 include one or more of surface electromyography (sEMG) sensors, mechanomyography sensors, or sonomyography sensors. For example, the sequence (or a pattern of) neuromuscular signals can be detected by a wearable device 110, such as a wearable neuromuscular-signal-monitoring device, that includes electrodes at least partially surrounding a portion of an arm of the user 130, such as a portion of the arm of the user 130 located behind a wrist of the user 130. In some embodiments, the sequence of neuromuscular signals is received without requiring the user 130 to wear sensors on any part of their hand (e.g., individual fingers, phalanges, palm, thumb, etc.).

Figure 8A:
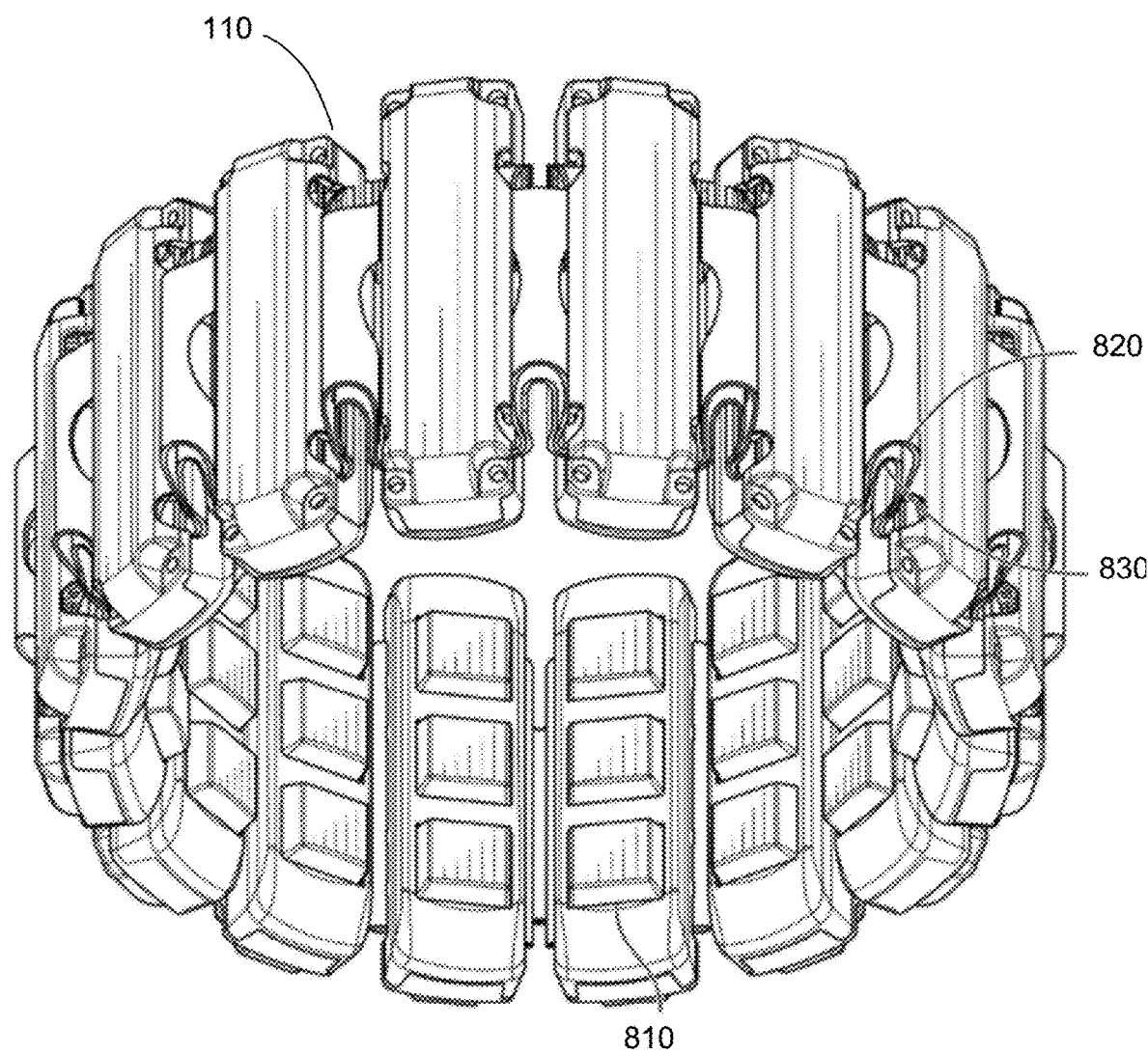
Figure 8B:
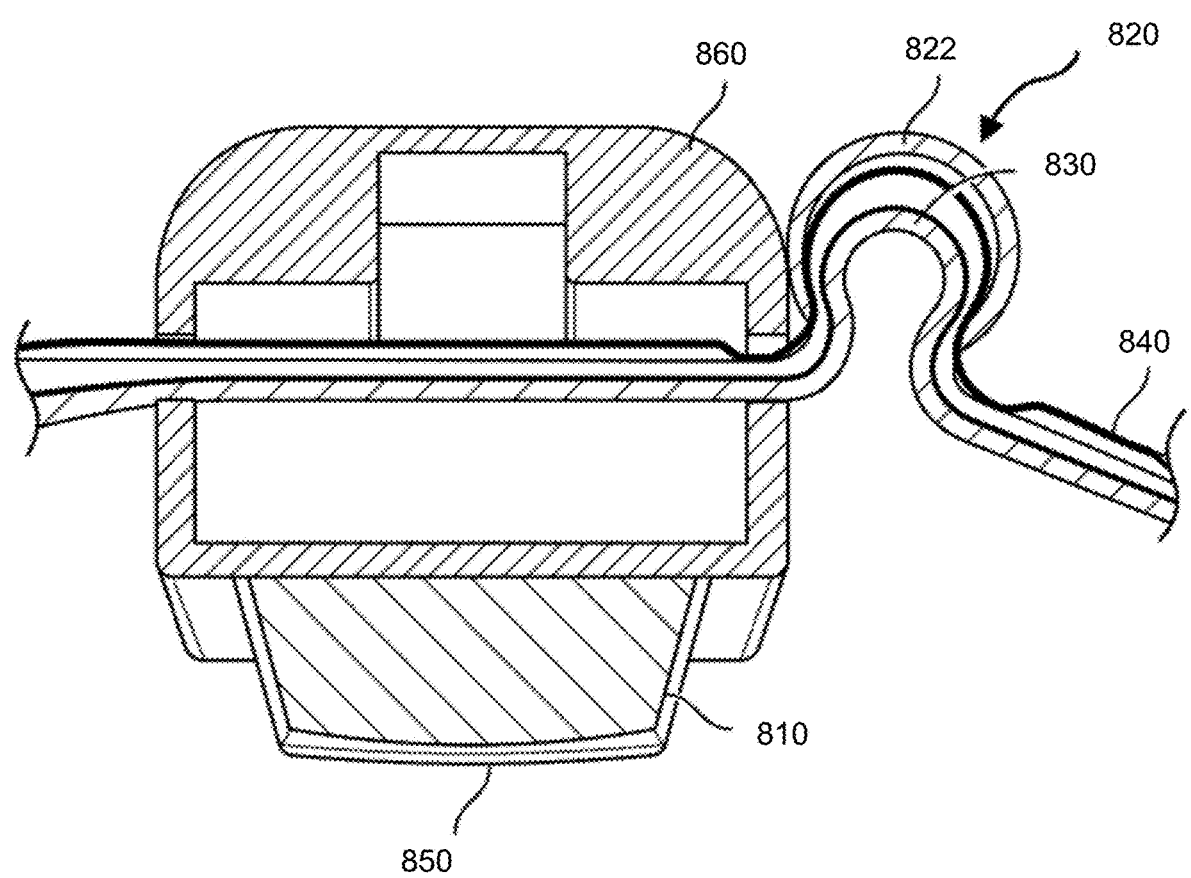

An example of such a wearable neuromuscular-signal-monitoring device is also shown in FIGS. 8A-8C. The plurality of neuromuscular sensors 810 are described in detail below in reference to FIGS. 8A-8C. Additional details regarding an example wearable neuromuscular-signal-monitoring device, and its ability to monitor neuromuscular signals (including one or more of neuromuscular-signal, MMR, or SMG signals) travelling through the human body, are provided in commonly-owned U.S. Patent Publication No. US 2020/0310539, which is incorporated by reference for all purposes herein. For example, FIGS. 1-7 and 29-30, and paragraphs [0038]-[0060] and [0129]-[0188], respectively, of U.S. Patent Publication No. US 2020/0310539 show a wearable device and machine-learning model for interpreting neuromuscular signals that can be used to detect the thumb-initiated gestures described herein.

In response to receiving the sequence (or pattern) of neuromuscular signals, the wearable device 110 provides data to the computing device 120 to cause the computing device 120 to perform the at least one input command corresponding to the sequence of neuromuscular signals. More specifically, the wearable device 110 is configured to cause a communicatively coupled computing device 120 to perform one or more commands based on neuromuscular signals from thumb-initiated gestures. In some embodiments, the provided data can be the neuromuscular signals themselves, which can then be interpreted at the computing device 120 as causing performance of the at least one input command (e.g., by using a trained statistical model to predict a motor action for the thumb intended by the received sequence of neuromuscular signals).

In some embodiments, the wearable device 110 includes a processor 920 (described below in reference to FIG. 9) communicatively coupled with the plurality of neuromuscular sensors 810. The processor 920 of the wearable device 110 is configured to receive the sequence of neuromuscular signals and determine one or more instructions that cause the computing device 120 to perform the at least one input command. The wearable device 110, after determining the one or more instructions, provides the data to the computing device 120. More specifically, in some other embodiments, the provided data can be an instruction that does not contain the neuromuscular signals themselves, but instead directly instructs the computing device 120 to perform the at least one input command without needing to process the neuromuscular signals themselves. For example, the wearable device 110 can perform the necessary signal-processing operations to match the detected neuromuscular signals to an associated input command based on which part of the user's hand 130 the thumb contacted or intends to contact, the wearable device 110 then provides the associated input command to the computing device 120.

In some embodiments, the computing device 120a receives the data and performs the at least one input command within a user interface generated 140 at least in part by the computing device 120. In some embodiments, the computing device 120 performs the at least one input command by causing a visual change within an artificial-reality interface controlled at least in part by the computing device 120. In some embodiments, the visual change within the virtual-reality or augmented-reality interface includes causing the visual change within a messaging application available with the artificial-reality interface (as is shown in the example of FIG. 1A, the user is viewing a virtual-reality interface and is able to input text to a messaging application by using one-handed thumb-initiated gestures). By allowing the user 130 to perform one-handed, thumb-based gestures to control aspects of the messaging application within the artificial-reality interfaces, the systems described herein help to provide users with a subtle, socially-acceptable, and low-friction input method, while still allowing users to have one hand free.

The data provided, by the wearable device 110, to the computing device 120a that causes the computing device 120a performs the at least one input command within a user interface generated 140 can also apply to all other artificial-reality environments, including the AR environment depicted in FIG. 1B. For example, the computing device 120b can receive the data and perform the at least one input command within a user interface 160 generated at least in part by the computing device 120b. In some embodiments, the computing device 120b performs the at least one input command by causing a visual change within an artificial-reality interface controlled at least in part by the computing device 120b. In some embodiments, the visual change within the augmented-reality user interface 160 includes causing the visual change within a messaging application available with the augmented-reality user interface 160 (as is shown in the example of FIG. 1B, the user 130 is viewing a virtual-reality interface and is able to input text to a messaging application by using one-handed thumb-initiated gestures).

Figure 2B:
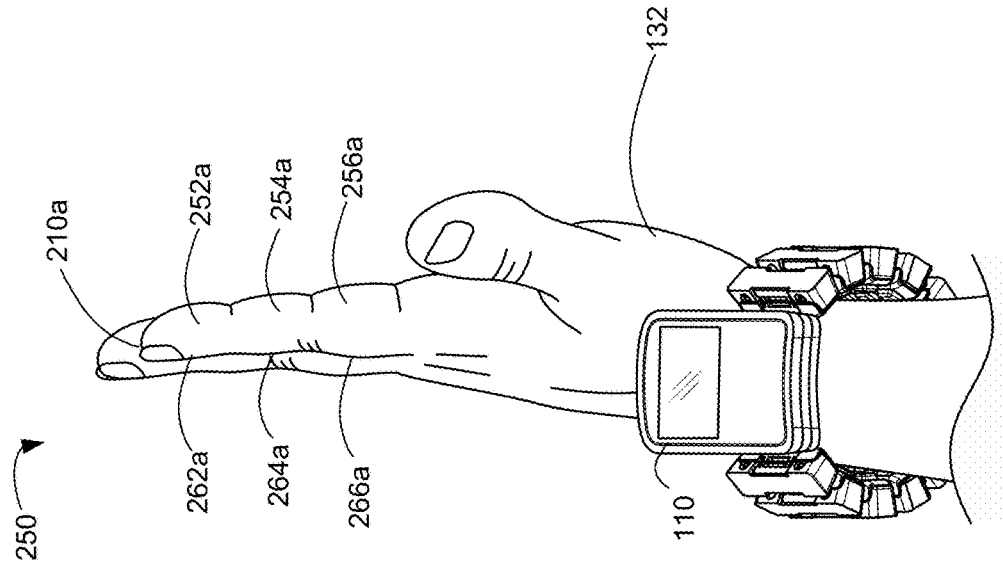
FIGS. 2A and 2B illustrate portions of a user's hand associated with one or more input commands, in accordance with some embodiments.
Figure 2A:
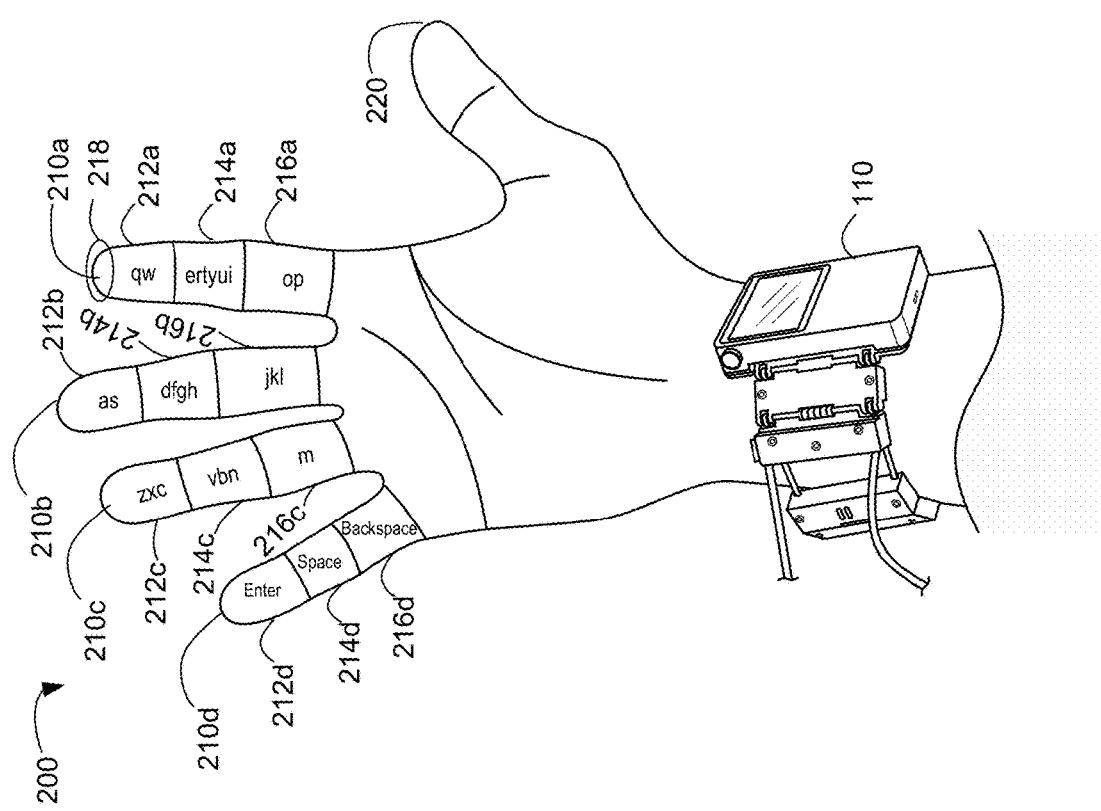

FIG. 2A illustrates a hand 132 of a user 130 and the wearable device 110 (worn on the user's wrist), in accordance with some embodiments. FIG. 2A shows a palm-side view 200 (or palmar side view) of the hand 132 (which in this example is the user 130's right hand) with each finger 210a-210d spread apart including a thumb 220. As described above in FIG. 1, predefined portions (or areas) of the user's hand 132 can each be associated with at least one input command available at a computing device 120 (FIG. 1). In some embodiments, each finger 210a-210d is associated at least one input command available at the computing device 120 (FIG. 1). In some embodiments, one or more portions of each finger 210a-210d are associated with at least one input command available at the computing device 120. For example, the palm-side view 200 of the hand 132 shows that each of at least three portions of a first finger 210a (e.g., located above each of a distal phalange 212a, an intermediate phalange 214a, and a proximal phalange 216a) is associated with at least one input command available at the computing device 120. In another example, only a particular portion (e.g., tip portion 218) of the first finger 210a is associated at least one input command. Examples of the input commands available at the computing device 120, in accordance with some embodiments, are discussed in detail below.

In some embodiments, one or more portions of the user's hand 132 are each associated with at least one different (or unique) input command available at a computing device 120 (FIG. 1). For instance, each respective portion of each finger 210a-210d of the user's hand 132 that is located above each of the distal phalange 212a-212d, the intermediate phalange 214a-214d, or the proximal phalange 216a-216d is respectively associated with different sets of one or more input commands available at the computing device 120. For example, as shown in FIG. 2A, a first portion of the first finger 210a (e.g., portion above the distal phalange 212a of the index finger) is associated with one or more first input commands (e.g., two commands, one each to cause selection of the q and w characters), and a second portion of the first finger 210a (e.g., portion above the intermediate phalange 214a of the index finger) is associated with one or more second input commands distinct from the first input commands (e.g., five commands, one each to cause selection of the e, r, t, y, u, and i symbols). In another example, in some embodiments, a third portion of the first finger 210a (e.g., portion above proximal phalange 216a of the index finger) is associated with one or more third input commands distinct from the first and second input commands (e.g., two commands, one each to cause selection of the o and p symbols). In some embodiments, each finger 210a-210d (and/or portion thereof) is associated with at least one different (or unique) input command available at a computing device 120. For example, a third portion of the second finger 210b (e.g., portion above the proximal phalange 216b) is associated with one or more fourth input commands distinct from the first, second, and third input commands (e.g., three commands, one each to cause selection of the j, k, and l symbols).

One or more input commands may be associated with any other portions of the user's hand 132 or fingers 210a-210d, such as the upper portions of the hand 132 (e.g., dorsal portions of the hand 132) and side portions of each finger 210a-210d. For example, as shown in side view 250 of the user's hand 132, one or more input commands can be associated with side portions of the user's first finger 210a (e.g., side portion above the distal phalange 252a, side portion above the intermediate phalange 254a, and/or side portion above the proximal phalange 256a). Additionally or alternatively, in another example, one or more input commands can be associated with upper portions of the user's first finger 210a (e.g., upper portion of the distal phalange 262a, upper portion of the intermediate phalange 264a, and/or upper portion of the proximal phalange 266a). In some embodiments, one or more commands can be detected unique neuromuscular signals. For example, a modifier key, such as a shift command, can be performed by pressing in middle of palm for threshold period of time, such as 2-3 seconds to shift to another character set (e.g., upper case characters or characters for a different language). In some embodiments, the thumb 220 to finger 210a-210d commands are interpreted based on the shifted character set up until the user 130 disables the shift command by again pressing in middle of palm for a threshold period of time (e.g., 2 or 3 seconds).

In some embodiments, users are able to associate different portions or areas of each finger 210a-210d with one or more different input commands. For example, users are able to go through a setup or training process that allows them to define which input commands (e.g., alphanumeric characters) to associate with the areas near or above each phalange of their fingers or other portions (such as the side portions discussed above) of their hands. The users 130 are able to associate any number of input commands to any one or more portions of their hands. In some embodiments, a user 130 can leave one or more fingers 210a-210d (or portion thereof) empty or otherwise unassociated with any input commands. FIG. 2A is a schematic representation for illustration purposes. In some embodiments, the characters and modifier keys need not actually be on the user's hand 132. For example, in some embodiments, when the user 130 is wearing an artificial-reality device, that device can cause the user 130 to see the characters and modifier keys on a representation of their hand in the artificial-reality environment.

In some embodiments, the at least one input command is a typing command or a plurality of available typing commands. The available typing commands are commands typically provided at a physical or virtual keyboard, such as a QWERTY keyboard, number pads, etc. In some embodiments, the available typing commands include both (i) commands to select any alphanumeric keys (including a, b, c, and 1, 2, 3, etc. keys), (ii) special characters (including !, @, #, $, etc.), and (iii) other keyboard commands (including commands associated with modifier keys, such as "Tab"; "Caps Lock"; "Shift"; "Delete"; etc.)). In some embodiments, the at least one input command includes system-defined commands (e.g., camera control, system or application controls (e.g., "file," "menu," "minimize," "maximize," "close," etc.). In some embodiments, the at least one input command includes user-defined commands (e.g., key binds, macros, etc.) In some embodiments, the at least one input command includes interface device commands. The interface device commands are commands typically provided at a physical or virtual controller, such as a video game controller (e.g., one or more specific buttons), a musical instrument (e.g., keys and/or notes), a camera (e.g., zoom, panning, filters, etc.), a drone (e.g., trim, throttle, pitch control, etc.), etc. As described below, in some embodiments, one or more sequences or patterns of neuromuscular signals can be defined by the user 130 as being associated with these various input commands (which can also be defined on an application-specific basis, such that a same finger portion can be associated with different input commands when different applications are in use, e.g., perform a typing command while a messaging application is in use, but perform a video game command while a video game application is in use). As was noted above, associations between respective portions of the user's hand and respective input comments can be predefined and stored in a memory of the computing device and/or the wearable device, such that when a thumb-initiated gesture at a respective portion of the user's hand is detected, the predefined association between that respective portion and a respective input command can be retrieved to allow for performance of the respective input command.

As described above in reference to FIG. 1, the wearable device 110, receives (or detects) a sequence or pattern of neuromuscular signals indicating that the user 130 is instructing (or intending to instruct) the thumb 220 on the user's hand 132 to contact a portion of the user's hand 132. In particular, the sequence or pattern of neuromuscular signals is based on the user 130 touching or intending to touch one or more portions of their hand 132 with their thumb 220. For example, the sequence or pattern of neuromuscular signals can be based on the user touching or intending to touch with their thumb 220, the first finger 210a or one or more portions of the first finger 210a (e.g., the portion above the distal phalange 212a, the portion above the intermediate phalange 214a, and/or the portion above the proximal phalange 216a). In some embodiments, the sequence or the pattern of neuromuscular signals is based on a single touch or intention to touch of a portion of the user's hand 132 using their thumb 220 (e.g., touching a particular portion of the user's hand 132, applying a predefined amount of force, length of time in which the touch is maintained, etc.). In some embodiments, the sequence or the pattern of neuromuscular signals is based on multiple touches or intentions to touch one or more portions of the user's hand 132 using their thumb 220 (e.g., double taps (or greater), touching or intending to touch portions of the user's hand 132 in accordance with a predefined order, simultaneously touching or intending to touch at least two portions of the user's hand 132, etc.).

In some embodiments, the sequence of neuromuscular signals is processed using a trained statistical model that was determined using stored sequences of neuromuscular signals to determine that the user 130 is instructing the thumb 220 on his or her hand 132 to contact the portion of his or her hand 132. Information regarding each of the stored patterns of neuromuscular signals (e.g., which can be stored after a user performs a variety of different motor actions with their thumbs 220 to categorize the various neuromuscular signals associated with such different motor actions) can be in a memory 930 (FIG. 9) of the computing device 120 and can then be used for developing a machine-learning model (e.g., trained statistical model) that can then process and categorize later sequences of neuromuscular signals to then cause performance of commands (e.g., typing commands) at computing devices 120, as is described herein. In some embodiments, the processing of the neuromuscular signals can be performed on the wearable device 110 directly or can be performed at the computing device 120 (based on data regarding the sequences of neuromuscular signals being provided to the computing device 120, which can help to share the processing loads amongst these the computing device and the wearable device).

Based on a determination that the detected thumb-based gestures are associated with one or more input commands, a computing device 120 is caused to perform the one or more input commands. More specifically, the computing device 120 performs one or more input commands based on a detected sequences or patterns of neuromuscular signals indicating that the user 130 is instructing or intending his or her thumb 220 to contact a predefined portion of his or her hand 132 that is already associated with a particular input command (e.g., a command to cause performance of any of the typing commands shown as associated with portions of the user's fingers in FIG. 2A).

FIGS. 3A and 3B illustrate an example of a computing device 120 performing one or more input commands based on detected and interpreted sequences or patterns of neuromuscular signals, in accordance with some embodiments. In particular, FIG. 3A illustrates example user thumb movements that can be detected based on sensed sequences or patterns of neuromuscular signals and interpreted as thumb-to-finger gestures that the user intends intended to perform, and FIG. 3B illustrates corresponding input commands performed by a computing device 120 in response to each of the detected sequences or patterns of neuromuscular signals (i.e., interpreted thumb-to-finger gestures).

The example provided in FIG. 3A, shows a hand 132 moving to perform a first motor action 310 through a sixth motor action 335. Each motor action (interpreted by the wearable device 110 based on detected neuromuscular signals) is associated with one or more input commands that, when provided to a computing device 120, cause the computing device 120 to perform the one or more input commands as shown between the changes in a first user interface 350 through a sixth user interface 375. In some embodiments, the user interface can be projected in an artificial-reality (e.g., virtual reality or augmented reality) user interface, or can be associated with a display, such as an OLED display coupled with the computing device 120 (as shown in FIG. 3B). For brevity, the six actions described below may be a collection of detected sequences or patterns of neuromuscular signals indicating that a same gesture has been performed multiple times (such as two (twice), three (thrice), etc. number of times). For example, the second action 315 may include more than one instance of the thumb 220 contacting or intending to contact one or more portions of the user's hand 132. Although the examples provided below refer to up to a sixth motor action, the skilled artisan in this field will appreciate upon reading this disclosure that any number of actions can be detected by the wearable device 110 and provided to the computing device 120 to cause the computing device 120 to perform the one or more input commands associated with the detected actions.

The first action 310 shows the hand in a stationary position. As such, the wearable device 110 does not detect a sequence or pattern of neuromuscular signals indicating performance of a thumb-based gesture, and thus does not provide one or more input commands to the computing device 120 (e.g., first user interface 350 shows no text input). A second action 315 shows a thumb 220 of the hand 132 contacting a portion of the user's hand 132, specifically, a portion of a first finger 210a (i.e., a portion of the first finger that is above the distal phalange 212a of the first finger 210a). The wearable device 110 receives (and/or detects) a sequence or pattern of neuromuscular signals (e.g., detected using one or more electrodes of a plurality of neuromuscular sensors 810; FIG. 8A) indicating that the thumb 220 is contacting or intending to contact the portion above the distal phalange 212a of the first finger 210a. The detected sequence or pattern of signals can be processed using a machine-learning model to make the determination that the thumb 220 is contacting or intending to contact the portion above the distal phalange 212a of the first finger 210a. In response to that determination, the wearable device 110 determines one or more input commands associated with the thumb contacting the portion above the distal phalange 212a of the first finger 210a and provides the one or more input commands to the computing device 120 to perform the one or more input commands. In some embodiments, performing the one or more input commands at the computing device 120 includes causing selection of an alphanumeric symbol and updating a user interface presented by the computing device 120 to reflect selection of the symbol. For example, as shown in the second user interface 355, the second action 315 results in the input text "Q" being populated into a text-input portion of the messaging application that is displayed on the display of the device 120.

In some embodiments, the sequence of neuromuscular signals indicating that the user 130 (FIG. 1) is instructing the thumb 220 on his or her hand 132 to contact the portion of his or her hand 132 are received without requiring the thumb 220 to make contact with the portion of his or her hand 132. In other words, the detected neuromuscular signals can provide sufficient information to allow the determination to be conducted without requiring (or before) any actual contact between the user's thumb 220 and the portion of his or her hand 132.

In some embodiments, determining that a user 130 is instructing the thumb 220 on his or her hand 132 to contact the portion of his or her hand 132 at least twice (i.e., such that the thumb 220 would make contact with the portion of his or her hand 132 at least two times, separated by an amount of contact-separation time) also includes determining that the amount of contact-separation time is lower than some predetermined contact-separation time threshold (e.g., less than 100 ms), such that if the contacts are going to occur beyond that predetermining contact-separation time threshold amount of time, then those two contacts would both trigger the at least one input command (e.g., actuation or selection of the "q" character for a single thumb contact at the portion above the distal portion 212a of finger 210a) and would not trigger a different second input command (e.g., actuation or selection of the "w" character for a double thumb contact at the portion above the distal portion 212a of finger 210a). Although the example above is for double taps, any number of taps can be detected. Further, continuous taps can result in the cycling of characters (from "q" to "w" back to "q") or a specific user defined input command (e.g., triple tap for "www" causing the computing device 120 to launch a web browser).

Similarly, in some embodiments, determining that a user 130 is instructing the thumb 220 on his or her hand 132 to contact the portion of his or her hand 132 at least twice also includes determining that the duration (or length) of a contact is at least equal to or greater than some predetermined contact-duration time threshold (e.g., 250 ms). For example, in some embodiments, a single contact event that continues for at least the predetermined contact-continuation time threshold (i.e., a long press that is held for at least 250 ms) can result in the cycling of input commands, such as characters cycling from "q" to "w" back to "q".

A third action 320 shows the thumb 220 of the hand 132 contacting a portion of the user's hand 132 a second time (at a different portion of the hand 132). In this example, the thumb 220, after contacting the portion of the first finger 210a, moves to contact a portion above the proximal phalange 216c of a third finger 210c. The wearable device 110 receives (and/or detects) a sequence or pattern of neuromuscular signals indicating that the thumb 220 is twice contacting or intending to contact the portion above the proximal phalange 216c of the third finger 210c and determines one or more input commands associated with the proximal phalange 216c of the third finger 210c. The wearable device 110 further provides the one or more input commands associated with the portion above the proximal phalange 216c of the third finger 210c to the computing device 120 to perform the one or more input commands. For example, as shown in the third user interface 360, the third action 315 results in the input text "Qm" being populated.

In some embodiments, instead of or in addition to monitoring for neuromuscular signals indicating multiple contacts of the thumb 220 at the portion of the user's hand 132, the wearable device 110 described herein can also monitor changes in force applied by the thumb 220 at the portion of the user's hand 132. For instance, in accordance with a determination (made by either the computing device 120 or the wearable device 110) that the monitored or received neuromuscular signals (e.g., the sequences of neuromuscular signals in these examples) indicate that the user 130 is instructing the thumb 220 on his or her hand 132 to contact the portion of his or her hand 132 with a threshold amount of force, then the data to cause the computing device 120 to perform the input command can be provided to the computing device 120. In some embodiments, to distinguish between different forced contacts (or taps), a force level is continually measured based on the power of a signal, which is then quantized (or grouped or categorized) into one of at least two (distinct) force thresholds. The at least two force thresholds, in some embodiments, include a soft contact force threshold, an intermediate contact force threshold, or hard contact force threshold. The above examples are non-limiting and any number of force thresholds can be used. In this way, the inventive system described herein can cause performance of the commands at the computing device 132 based on either or both of neuromuscular signals indicating repeated contacts or contacts that satisfy specific force thresholds (in one example, if the contact exceeds a particular force threshold, then a particular input command can be performed repeatedly (e.g., continued actuation of a character that is then displayed at the text-input region of the messaging application on device 120) until the contact no longer exceeds the particular force threshold).

As an example, in a fourth user interface 365, the text "Quick Match" has been typed into text-input portion of the messaging application displayed on the computing device 120 (e.g., based on a detected sequences or patterns of neuromuscular signals discussed above). In particular, the fourth user interface 365 shows the text "quick match" being auto-populated by the computing device 120 performing one or more input commands based on a fourth action 325, which, in this example, is a hard press of the portion above the distal phalange 212c of the third finger 210c by the thumb 220 where the hard press above the distal phalange 212c of the third finger 210c was defined by the user 130 to auto populate acronyms defined by the user 130. The wearable device 110 receives (and/or detects) a sequence or pattern of neuromuscular signals indicating that the thumb 220 is hard pressing or intending to hard press the portion above the distal phalange 212c of the third finger 210c and determines one or more input commands associated with the hard press above the proximal phalange 216c of the third finger 210c. The wearable device 110 further provides the one or more input commands associated with the hard press above portion of the proximal phalange 216c of the third finger 210c to the computing device 120 to perform the one or more input commands, in this case, auto populating Qm to quick match.

A fifth action 330 shows the thumb 220 of the hand 132 contacting a portion of the user's hand 132 another time. In this example, the thumb 220, after contacting the portion of the third finger 210c, moves to contact a portion above an intermediate phalange 214b of a second finger 210b. The wearable device 110 receives (and/or detects) a sequence or pattern of neuromuscular signals indicating that the thumb 220 is contacting or intending to contact the portion above the intermediate phalange 214b of the second finger 210b and determines one or more input commands associated with the intermediate phalange 214b of the second finger 210b. The wearable device 110 further provides the one or more input commands associated with the portion above the intermediate phalange 214b of the second finger 210b to the computing device 120 to perform the one or more input commands. As described above, the user can define unique commands for each portion of the hand 132. In some embodiments, the user can further define unique commands to be performed by touching a portion of the hand 132 in a certain way. For example, a user can define a long press (e.g., presses longer than 5 seconds) to perform a special command. In this example, or user defined gestures a long press of the intermediate phalange 214b of a second finger 210b to deliver (or send) the typed message as shown in the fifth user interface 370. Although not shown, in some embodiments, the thumb 220 of the hand 132 can contacting a portion of the user's hand 132 that corresponds to a modifier key, such as a shift command, that can be used to generate symbols, such as "?" For example, the user 130 may contact the palm of the hand 132 to cause the characters shown in FIG. 2A to change to special characters.

With the illustrated sixth action 335 (hand at rest), the wearable device 110 further waits for any additional user actions. While the hand is at rest, no action is performed at the computing device 120 as shown in the sixth user interface 375. Once an additional motor action is detected, one or more additional input commands can then be provided to the computing device 120 based on associations between the detected additional motor action and input commands to be performed at the computing device.

The above examples are non-limiting. Any combination or number of input commands can be associated to different portions of the user hand 132. As described above, FIG. 2A is a schematic representation for illustration purposes. Different characters can be assigned to different portions of the hand as defined by the user. Additionally, while FIGS. 3A-3B provide an example of a computing device 120 as a smartphone that can be in communication with the wearable device that is detected the neuromuscular signals, the skilled artisan upon reading this disclosure will appreciate that other example computing devices 120 can also be used to display messaging applications and cause actuation of keyboard symbols or commands based on detected sequences or patterns of neuromuscular signals from thumb-initiated gestures. Other examples computing devices 120 include devices for presenting artificial-reality interfaces (AR or VR headsets or glasses) and also include a display that can be associated with the wearable device itself.

Figure 4B:
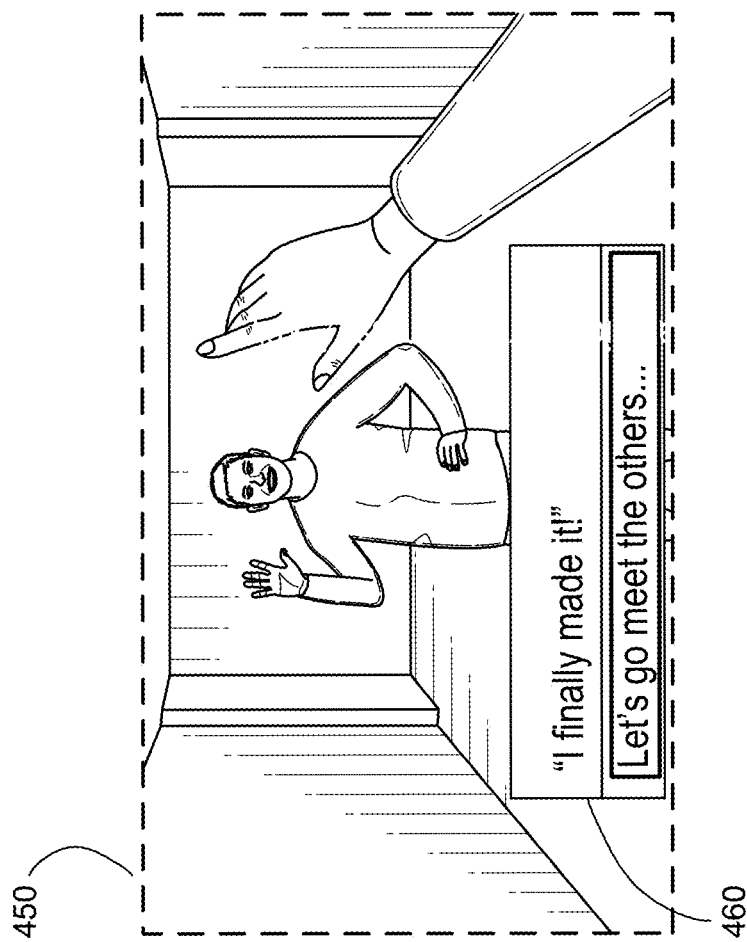
FIGS. 4A and 4B illustrate another example of detected sequences or patterns of neuromuscular signals by the wearable device, in accordance with some embodiments.
Figure 4A:
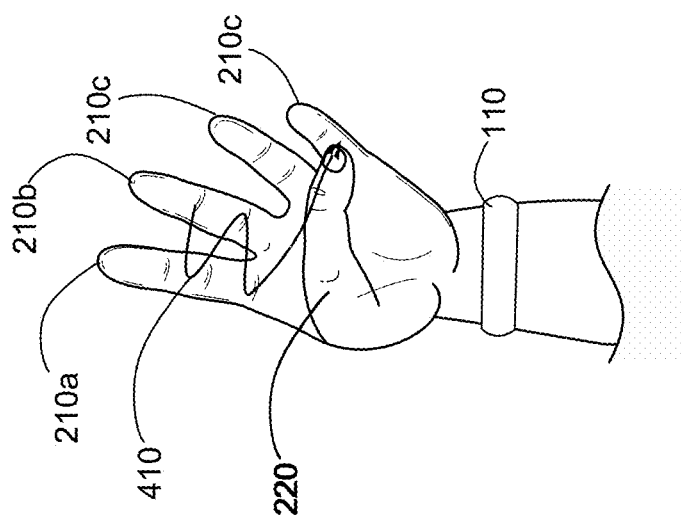

FIGS. 4A and 4B illustrate another example of detected sequences or patterns of neuromuscular signals by the wearable device 110, in accordance with some implementations. In particular, FIG. 4A illustrates example user thumb 220 using swiping movements that can detected based on sequences or patterns of neuromuscular signals sensed by the neuromuscular sensors the wearable device described herein, and FIG. 3B illustrates a corresponding input command performed by a computing device 120 (e.g., within a AR/VR interface 450) in response to the thumb-based swiping movements that were detected based on sequences or patterns of neuromuscular signals.

As shown in FIG. 4A, the thumb 220 is moved (e.g., slid or swiped) across portions of the fingers 210a-210d to provide one or more input commands to the computing device 120. For example, the wearable device 110 receives a sequence or pattern of neuromuscular (e.g., sEMG) signals indicating that the user 130 is instructing or intending the thumb 220 on the user's hand 132 to contact the different portions of his or her hand 132 in accordance with the swiping movement shown in FIG. 4A. In response to receiving the sequence or pattern of neuromuscular signals indicating the swiping movement, the wearable device 110 can then provide data to the computing device 120 to cause the computing device 120 to perform one or more input commands. Additionally or alternatively, in some embodiments, the thumb 220 is moved (e.g., slid or swiped) across side portions of the user's hand 132 (e.g., (e.g., side portions 252a, 254a, and 256a of the first finger 210a shown in FIG.

2B) and/or upper portions of the user's hand 132 (e.g., upper portions 262a, 264a, and 266a of the first finger 210a shown in FIG. 2B) to provide one or more input commands to the computing device 120.

For instance, as shown in FIG. 4B, the computing device 120 receives the data and performs at least one input command within an artificial-reality interface (e.g., VR/AR interface) 450 controlled at least in part by the computing device 120. As shown in the artificial-reality interface 450, the at least one input command cause a visual change (which can also be a number of different visual changes to cause typing of each of the depicted characters) "Let's go meet the others . . . " within a messaging application 460 available within the artificial-reality interface 450.

Figure 5:
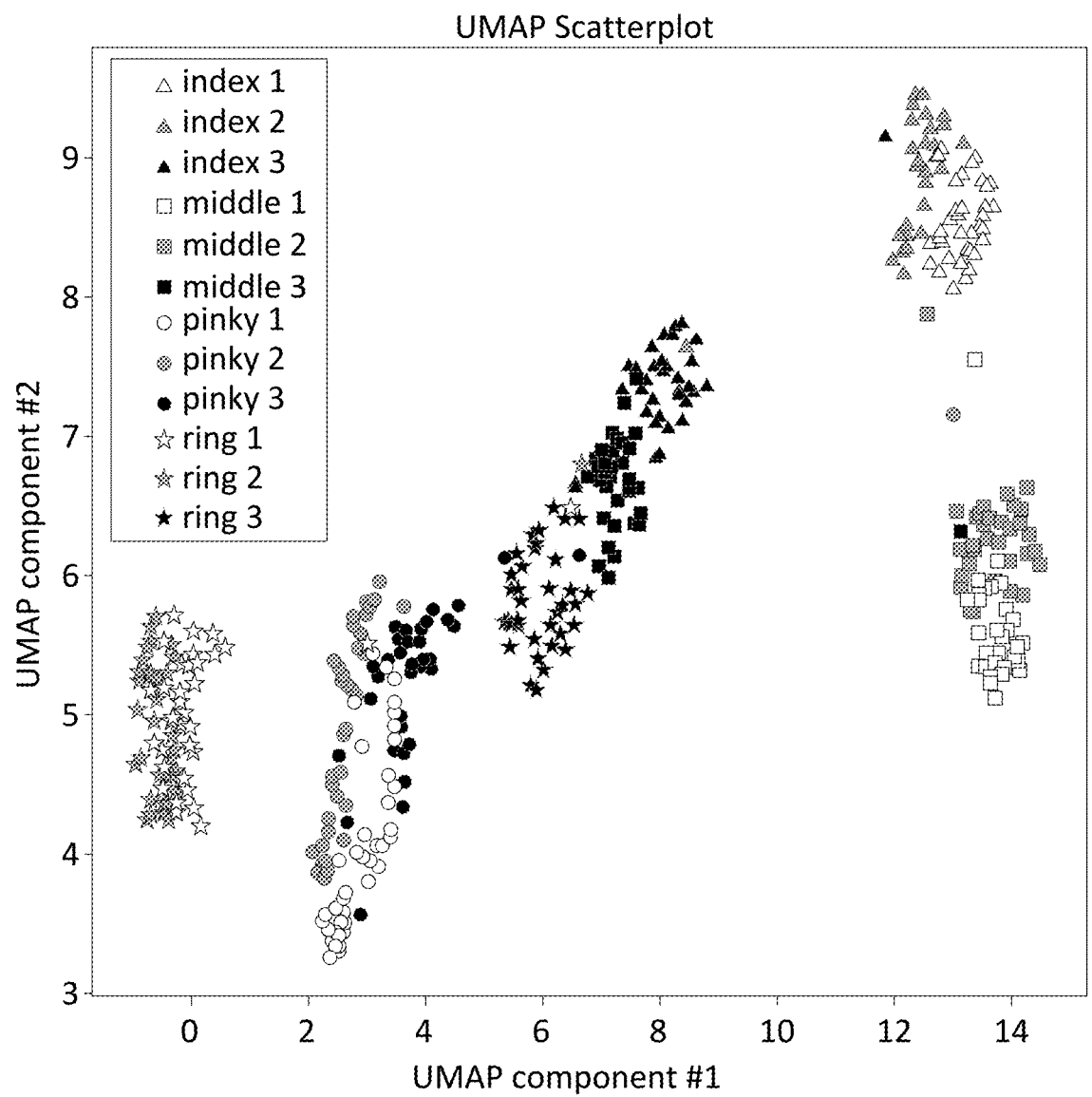
FIG. 5 illustrates clusters produced from the detected sequences or patterns of neuromuscular signals, in accordance with some embodiments.

FIG. 5 illustrates clusters produced from the detected sequences or patterns of neuromuscular signals, in accordance with some embodiments. Clusters for each finger (except the thumb) are shown, three clusters for each finger. Each cluster represents a type of finger tap on a respective finger (or portion thereof). For example, a first cluster for a first finger may indicate a finger tap on a portion above a distal phalange of the first finger, a second cluster for the first finger may indicate a finger tap on a portion above an intermediate phalange of the first finger, and a third cluster for the first finger may indicate a finger tap on a portion above a proximal phalange of the first finger. Data around each event may be sliced in epochs in preparation for the cluster analysis. In one example, a window of 150 ms may be centered around each event to slice the data, and any other suitable window size may be used in a similar manner. Thereafter, each of the epochs may be vectorized and subjected to a statistical analysis (e.g., K-Means clustering process) to extract the clusters. For visualization purposes, a dimensionality reduction process based on Uniform Manifold Approximation and Projection (UMAP) may be applied to plot the clusters shown in FIG. 5, including at least 30 events for each class of event (i.e., type of finger taps on a respective finger (or portion thereof)).

The clusters in the UMAP plot shown in FIG. 5 are generated by using a 16 channel device (e.g., wearable device 110). Preprocessing is performed on 16 signals received from these 16 channels to generates features (48 features in this example). The generated features go to one or more Machine Learning (ML) training models. In FIG. 5, the 48 generated features are reduced into two dimensions for visualization (Component 1 and component 2 represent those two dimensions). Those two dimensions carry much less information than the total 48 features. FIG. 5 provides a visual representation of all the different finger contact (or tap) clusters only by using two dimensions (i.e., Component 1 and component 2). In practice, all of the user actions and gestures can be decoded and discriminated with high confidence and accuracy using one or more generated features and sophisticated ML architectures (like deep neural networks).

Figure 6:
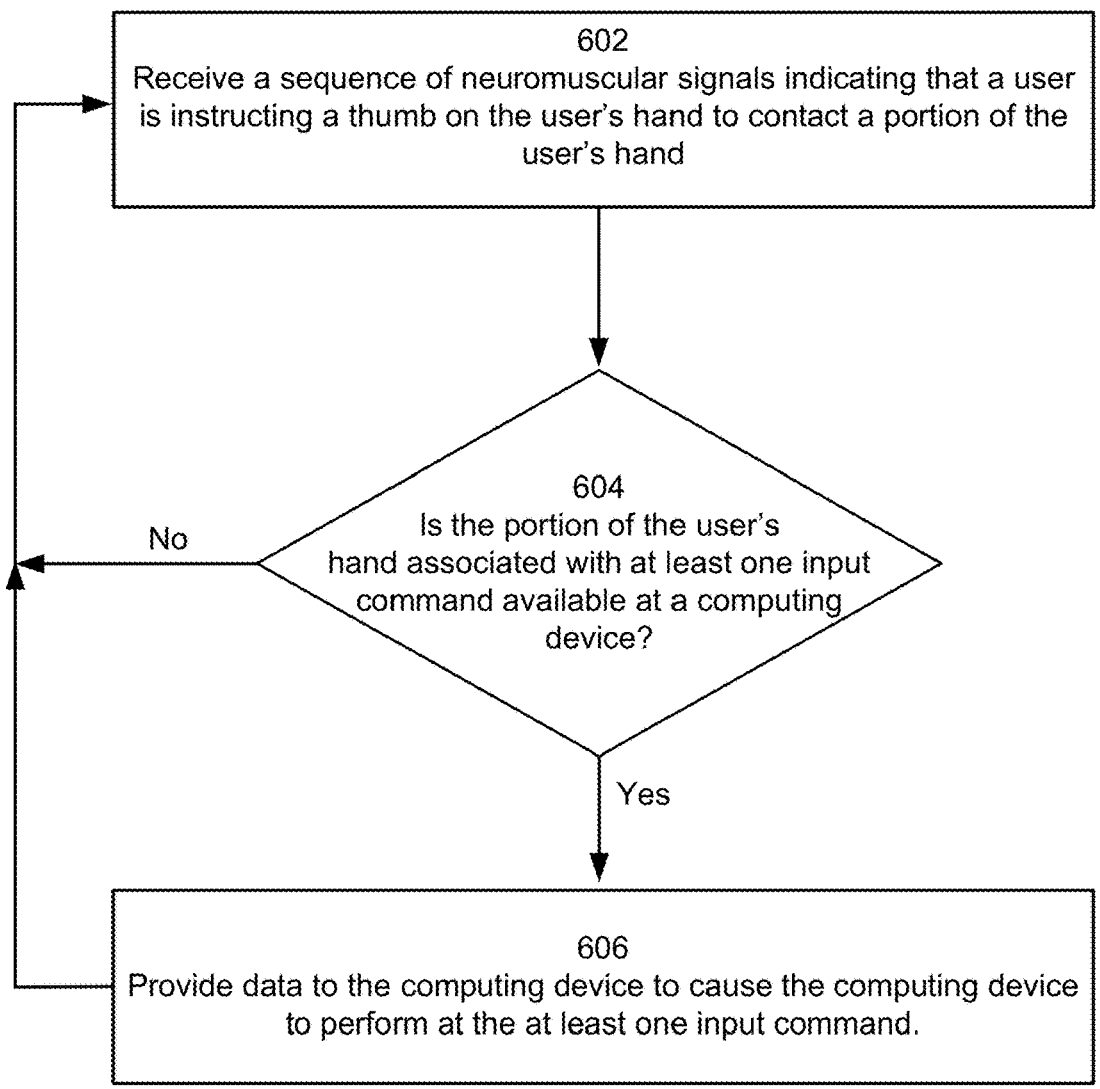
FIG. 6 is an overview flow diagram illustrating a method of causing performance of commands at a computing device based on neuromuscular signals from thumb-initiated gestures, in accordance with some embodiments.
Figure 7A:
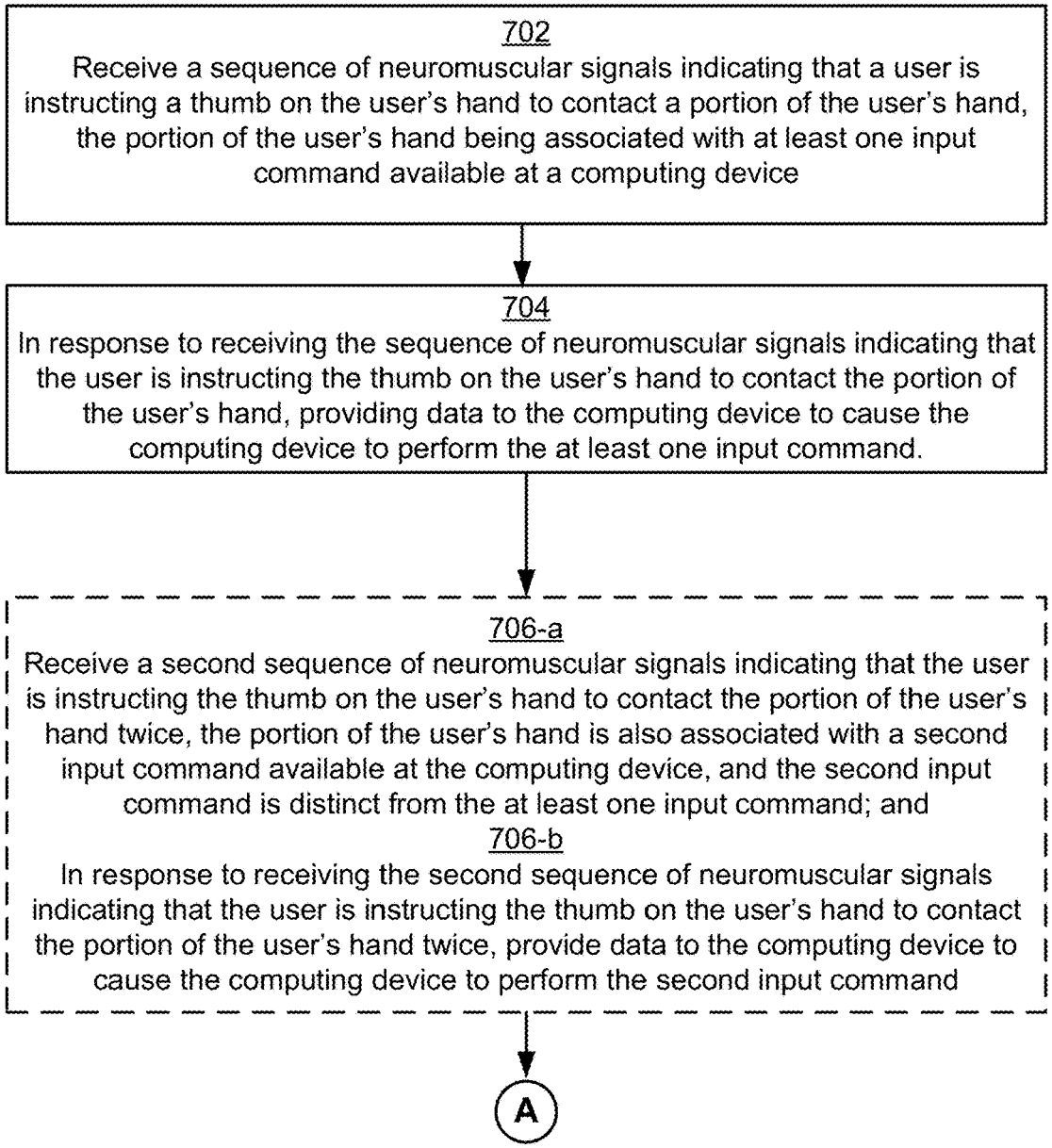
Figure 7B:
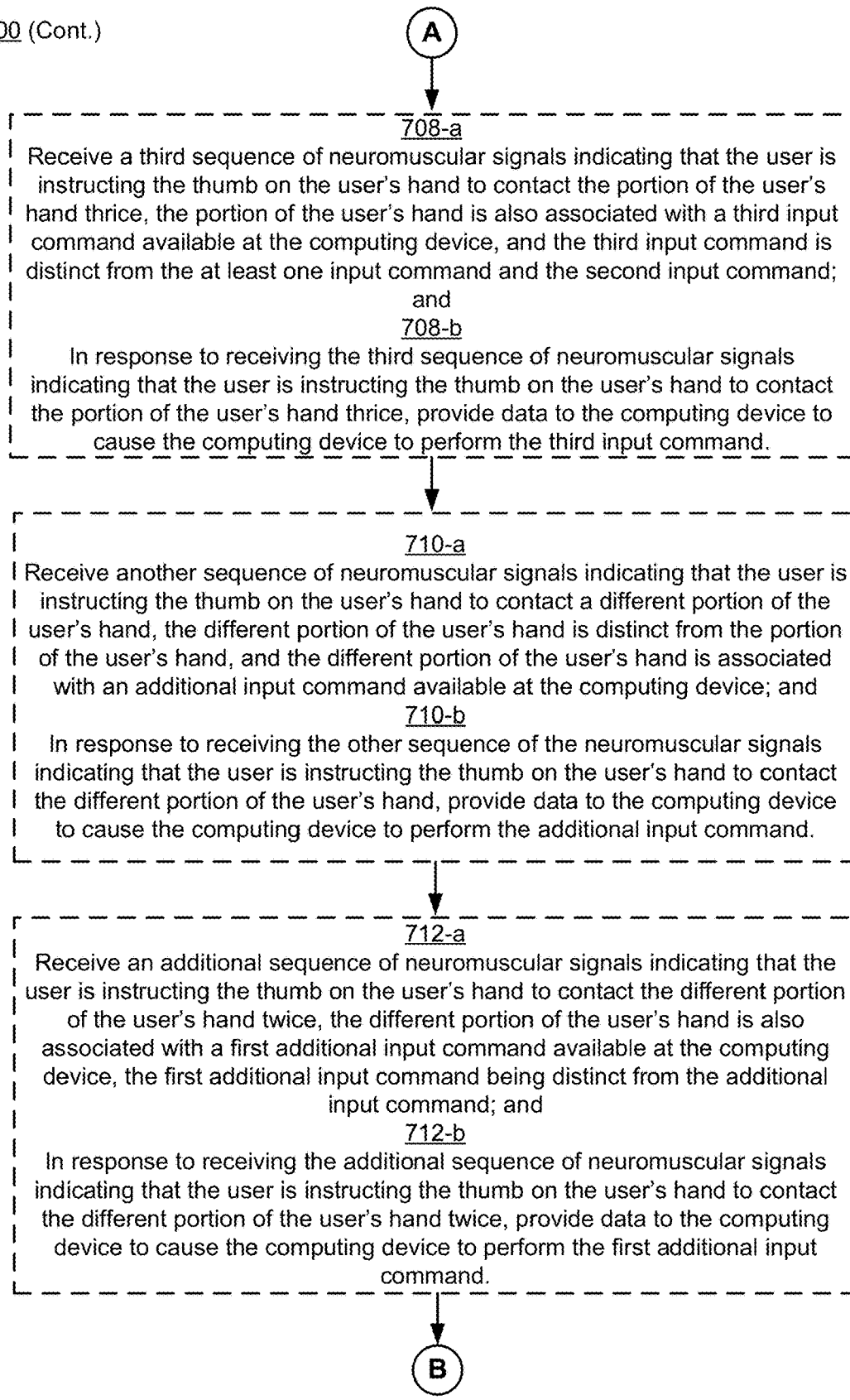
Figure 9:
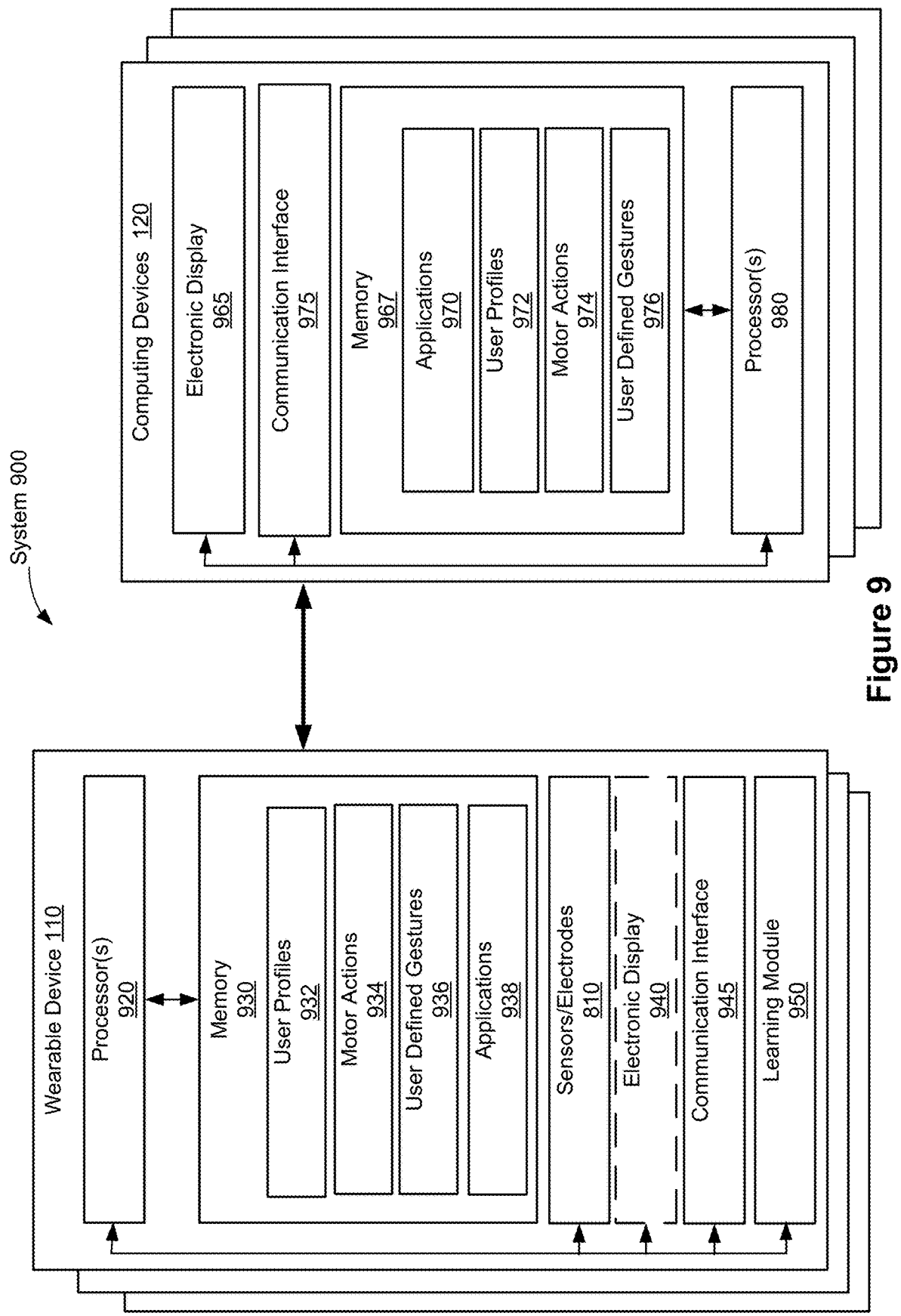
FIG. 9 is a block diagram illustrating a system including a wearable device, in accordance with various embodiments.

FIG. 6 is an overview flow diagram illustrating a method 600 of causing performance of commands at a computing device based on neuromuscular signals from thumb-initiated gestures, in accordance with some embodiments. Operations (e.g., steps) of the method 600 may be performed by one or more processors 920 (FIG. 9) of a wearable device 110 (FIG. 1). At least some of the operations shown in FIG. 6 correspond to instructions stored in a computer memory or computer-readable storage medium (e.g., memory 930 of the wearable device 110 as shown in FIG. 9). Operations 602-606 can also be performed in part using one or more processors and/or using instructions stored in memory or computer-readable medium of a computing device 120 (FIG. 1; e.g., a head-mounted display device can perform operations 602-606 alone or in conjunction with the one or more processors of the wearable device 110).

The method 600 includes receiving (602), by the wearable device 110, a sequence or a pattern of neuromuscular signals (e.g., detected using one of more of surface electromyography (sEMG) sensors, mechanomyography sensors, and sonomyography sensors) indicating that a user is instructing (or intending) a thumb 220 on the user's hand 132 to contact a portion of the user's hand 132. The method 600 includes determining (604) whether the portion of the user's hand 132 is associated with at least one input command available at a computing device 120. In accordance with a determination that the portion of the user's hand 132 is not associated with at least one input command available at the computing device 120 (which determination occurs at 604-No), the method 600 includes returning to operation (602) and waiting to detect additional neuromuscular signals.

Alternatively, in accordance with a determination that the portion of the user's hand 132 is associated with at least one input command (e.g., one of the input commands discussed in the examples above, such as typing commands or videogame input commands, among other possible examples) available at the computing device 120, the method 600 includes providing (606, which occurs after the determination at 604-Yes), by the wearable device 110, data to the computing device 120 to cause the computing device 120 to perform at the at least one input command. The method 600 further includes returning to operation (602) and waiting to detect additional neuromuscular signals. Additional operations that can be performed in conjunction with method 600 are described in reference to FIGS. 7 and 8, below.

FIGS. 7A-7D are detailed flow diagrams illustrating a method 700 of causing performance of commands at a computing device based on neuromuscular signals from thumb-initiated gestures, in accordance with some embodiments. Operations (e.g., steps) of the method 700 may be performed by one or more processors 920 (FIG. 9) of a wearable device 110 (FIG. 1). At least some of the operations shown in FIGS. 7A-7D correspond to instructions stored in a computer memory or computer-readable storage medium (e.g., memory 930 of the wearable device 110 as shown in FIG. 9). Operations 702-734 can also be performed in part using one or more processors and/or using instructions stored in memory or computer-readable medium of a computing device 120 (FIG. 1; e.g., a head-mounted display device can perform operations 702-734 alone or in conjunction with the one or more processors of the wearable device 110).

The method 700 includes receiving (702), at the wearable device 110, a sequence of neuromuscular signals indicating that a user 130 (FIG. 1) is instructing a thumb 220 (FIG. 2) on the user's hand 132 (FIG. 1) to contact a portion of the user's hand 132. The portion of the user's hand 132 is associated with at least one input command available at a computing device 120. For example, respective portions of the user's hand 132 can be associated with commanding actuation/selection of alphanumeric characters and modifier keys, as illustrated schematically on hand 132 shown in FIG. 2. In response to receiving the sequence of neuromuscular signals indicating that the user is instructing the thumb on the user's hand to contact the portion of the user's hand, the method 700 includes providing (704), by the wearable device 110, data to the computing device 120 to cause the computing device 120 to perform the at least one input command. For example, causing a visual change in a user interface (such as displaying actuated alphanumeric characters in a text-input portion of a messaging application, as is described above in reference to FIGS. 3A-4B.

In some implementations, the method 700 includes receiving (706-*a*) a second sequence of neuromuscular signals indicating that the user is instructing the thumb 220 on the user's hand 132 to contact the portion of the user's hand 132 twice. The portion of the user's hand 132 is also associated with a second input command available at the computing device 120, and the second input command is distinct from the at least one input command (e.g., the second input command can command actuation/selection of an "x" character, while the first input command can command actuation/selection of a "z" character, as is shown in FIG. 2A for thumb-initiated gestures intended to contact a finger portion above distal phalange 212*c*). In response to receiving the second sequence of neuromuscular signals indicating that the user 130 is instructing the thumb 220 on the user's hand 132 to contact the portion of the user's hand 132 twice, the method 700 includes providing (706-*b*), by the wearable device 110, data to the computing device 120 to cause the computing device to perform the second input command.

In some embodiments, the method 700 includes receiving (708-*a*) a third sequence of neuromuscular signals indicating that the user 130 is instructing the thumb 220 on the user's hand 132 to contact the portion of the user's hand 132 thrice. The portion of the user's hand 132 is also associated with a third input command available at the computing device 120, and the third input command is distinct from the at least one input command and the second input command (e.g., continuing the example provided above, the third input command can command actuation/selection of a "c" character, as is shown in FIG. 2A for thumb-initiated gestures intended to thrice contact a finger portion above distal phalange 212*c*). In response to receiving the third sequence of neuromuscular signals indicating that the user 130 is instructing the thumb 220 on the user's hand 132 to contact the portion of the user's hand 132 thrice, the method 700 includes providing (708-*b*), by the wearable device 110, data to the computing device 120 to cause the computing device 120 to perform the third input command.

In some embodiments, the method 700 includes receiving (710-*a*) another sequence of neuromuscular signals indicating that the user 130 is instructing the thumb 220 on the user's hand 132 to contact a different portion of the user's hand 132. The different portion of the user's hand 132 is distinct from the portion of the user's hand 132, and the different portion of the user's hand 132 is associated with an additional input command available at the computing device 120 (e.g., continuing the example provided above, the additional input command can command actuation/selection of a "v" character, as is shown in FIG. 2A for thumb-initiated gestures intended to contact a finger portion above intermediate phalange 214*c*). In response to receiving the other sequence of the neuromuscular signals indicating that the user 130 is instructing the thumb 220 on the user's hand 132 to contact the different portion of the user's hand 132, the method includes providing (710-*b*), by the wearable device 110, data to the computing device 120 to cause the computing device 120 to perform the additional input command.

In some embodiments, the method 700 includes receiving (712-*a*) an additional sequence of neuromuscular signals indicating that the user 130 is instructing the thumb 220 on the user's hand 132 to contact the different portion of the user's hand 132 twice. The different portion of the user's hand 132 is also associated with a first additional input command available at the computing device 120 the first additional input command being distinct from the additional input command (e.g., continuing the example provided above, the first additional input command can command actuation/selection of an "b" character, as is shown in FIG. 2A for thumb-initiated gestures intended to twice contact a finger portion above intermediate phalange 212*b*). In response to receiving the additional sequence of neuromuscular signals indicating that the user 130 is instructing the thumb 220 on the user's hand 132 to contact the different portion of the user's hand 132 twice, the method 700 includes providing (712-*b*), by the wearable device 110, data to the computing device 120 to cause the computing device 120 to perform the first additional input command.

In some embodiments, the method 700 includes receiving (714-*a*) one more sequences of neuromuscular signals indicating that the user 130 is instructing the thumb 220 on the user's hand 132 to contact the different portion of the user's hand 132 thrice. The different portion of the user's hand 132 is also associated with a second additional input command available at the computing device 120, the second additional input command being distinct from the additional input command and the first additional input command (e.g., continuing the example provided above, the second additional input command can command actuation/selection of an "n" character, as is shown in FIG. 2A for thumb-initiated gestures intended to thrice contact a finger portion above intermediate phalange 212*b*). In response to receiving the one more sequence of neuromuscular signals indicating that the user is instructing the thumb 220 on the user's hand 132 to contact the different portion of the user's hand 132 thrice, the method 700 includes providing (714-*b*), by the wearable device 110, data to the computing device 120 to cause the computing device 120 to perform the second additional input command.

In some embodiments, the portion of the user's hand 132 is (716-*a*) a palm-side portion of a first finger of the user's hand, and the different portion of the user's hand is (716-*b*) a palm-side portion of a second finger of the user's hand. For example, FIGS. 2A and 2B depict different phalange sections of each finger 210*a*-210*d* being associated with different keyboard input commands. In some embodiments, the portion of the user's hand 132 is (718-*a*) a palm-side portion of the first finger that is located above one of the distal phalange of the first finger, the intermediate phalange of the first finger, or the proximal phalange of the first finger, and the different portion of the user's hand is (718-*b*) a palm-side portion of the second finger that is located above one of the distal phalange of the second finger, the intermediate phalange of the second finger, or the proximal phalange of the second finger. In some embodiments, each finger of the user's hand 132 is associated (720) with a different command available at the computing device 132. Different portions of the user's hand 132 are described above in reference to FIGS. 2A and 2B.

Alternatively or in addition, other portions of the user's hand can also be associated with input commands that can be performed in response to thumb-initiated gestures. For instance, swiping along a side portion of the user's hand can be used instead of or in addition to the thumb-initiated gestures associated with palm-side finger portions of the user's hand. As one example, instead of using palm-side portions, the associations depicted in FIG. 2A can instead apply to side portions of the user's fingers. As another example, alphabetic characters can be associated with side portions of one of the user's fingers (e.g., finger 210*a*) such that the user can slide their thumb along the side of finger 210*a* to scroll through (such scrolling can be displayed within a display of the associated computing device that is executing the input commands) and select an alphabetic character; numeric characters can be associated with side portions of a different one of the user's fingers (e.g., finger 210*b*) such that the user can slide their thumb along the side of finger 210*a* to scroll through (such scrolling can be displayed within a display of the associated computing device that is executing the input commands) and select a numeric character; and modifier keys can be associated with side portions of another one of the user's fingers (e.g., finger 210*c*) such that the user can slide their thumb along the side of finger 210*a* to scroll through (such scrolling can be displayed within a display of the associated computing device that is executing the input commands) and select one of the modifier keys.

In some embodiments, the input commands each correspond (722) to typing commands. In some embodiments, performing (724) the at least one input command at the computing device includes causing selection of an alphanumeric symbol and updating a user interface presented by the computing device 120 to reflect selection of the symbol. In some embodiments, performing (726) the at least one input command at the computing device 120 includes performing an action associated with a modifier key.

In some embodiments, the sequence of neuromuscular signals is processed (728) using a trained statistical model that was determined using stored sequences of neuromuscular signals to determine that the user is instructing the thumb on the user's hand to contact the portion of the user's hand. In some embodiments, the sequence of neuromuscular signals is received (730) without requiring the user to wear sensors on any part of the user's hand. In some embodiments, performance of the at least one command at the computing device includes (732) causing a visual change within an artificial-reality (e.g., virtual-reality or augmented-reality) interface controlled at least in part by the computing device. In some embodiments, causing (734) the visual change within the virtual-reality or augmented-reality interface includes causing the visual change within a messaging application available with the artificial-reality interface.

FIG. 8A illustrates a wearable device 110, in accordance with some embodiments. As described above, the wearable device 110 is used to generate control information (e.g., sensed data about neuromuscular signals or instructions to perform certain commands after the data is sensed) for causing a computing device 120 (FIG. 1) to perform one or more input commands. In some embodiments, the wearable device 110 includes a plurality of neuromuscular sensors 810. In some embodiments, the plurality of neuromuscular sensors 810 includes a predetermined number of (e.g., 16) neuromuscular sensors (e.g., EMG sensors) arranged circumferentially around an elastic band 820. The plurality of neuromuscular sensors 810 may include any suitable number of neuromuscular sensors. In some embodiments, the number and arrangement of neuromuscular sensors 810 depends on the particular application for which the wearable device 110 is used. For instance, a wearable device 110 configured as an armband, wristband, or chest-band may include a plurality of neuromuscular sensors 810 with different number of neuromuscular sensors and different arrangement for each use case, such as medical use cases as compared to gaming or general day-to-day use cases. For example, at least 16 neuromuscular sensors 810 may be arranged circumferentially around elastic band 820.

In some embodiments, the elastic band 820 is configured to be worn around a user's lower arm or wrist (as shown in FIG. 1). The elastic band 820 may include a flexible electronic connector 840 (shown in FIG. 8B). In some embodiments, the flexible electronic connector 840 interconnects separate sensors and electronic circuitry that are enclosed in one or more sensor housings 860. Alternatively, in some embodiments, the flexible electronic connector 840 interconnects separate sensors and electronic circuitry that are outside of the one or more sensor housings 860. Each neuromuscular sensor of the plurality of neuromuscular sensors 810 can include a skin-contacting surface 850 that includes one or more electrodes. One or more sensors of the plurality of neuromuscular sensors 810 can be coupled together using flexible electronics incorporated into the wearable device 110.

FIG. 8B illustrates a cross-sectional view through one of the neuromuscular sensors of the plurality of neuromuscular sensors 810, and the elastic band 820 of the wearable device 110 shown in FIG. 8A. The neuromuscular sensors of the plurality of neuromuscular sensors 810 may include a plurality of electrodes located within a skin-contacting surface 850. In some embodiments, the elastic band 820 includes an outer flexible layer 822 and an inner flexible layer 830 that enclose, at least in part, a flexible electronic connector 840.

In some embodiments, the output of one or more of the sensing components may be optionally processed using a hardware-based signal processing circuit (e.g., to perform amplification, filtering, rectification, and/or another suitable signal processing function). In some embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect.

FIG. 8C illustrates another embodiment of a wearable device 870 (which is another example of a wearable device 110), in accordance with some embodiments. The wearable device 870 includes paired sensor channels 885*a*-885*f* along an interior surface of a wearable structure 875 that are configured to detect neuromuscular signals. Different number of paired sensors channels can be used (e.g., one pair of sensors, three pairs of sensors, four pairs of sensors, or six pairs of sensors). The wearable structure 875 can include a band portion 890, a capsule portion 895, and a cradle portion (not pictured) that is coupled with the band portion 890 to allow for the capsule portion 895 to be removably coupled with the band portion 890. For embodiments in which the capsule portion 895 is removable, the capsule portion 895 can be referred to as a removable structure, such that in these embodiments the wearable device includes a wearable portion (e.g., band portion 890 and the cradle portion) and a removable structure (the removable capsule portion which can be removed from the cradle). In some embodiments, the capsule portion 895 includes the one or more processors 920 and/or other components of the wearable device 110 described below in reference to FIG. 9. The wearable structure 875 is configured to be worn by a user 130. More specifically, the wearable structure 875 is configured to couple the wearable device 870 to a wrist, arm, forearm, or other portion of the user's body. Each paired sensor channels 885*a*-885*f* includes two electrodes 880 (e.g., electrodes 880*a*-880*l*) for sensing neuromuscular signals based on differential sensing within each respective sensor channel. The wearable device 870 can further include a grounding 877 and shielding electrode 879.

The techniques described above can be used with any device for sensing neuromuscular signals, including the arm-wearable devices of FIG. 8A-8C, but could also be used with other types of wearable devices for sensing neuromuscular signals (such as body-wearable or head-wearable devices that might have neuromuscular sensors closer to the brain or spinal column).

FIG. 9 is a block diagram illustrating a system 900 including a wearable device 110 (FIGS. 1 and 8A-8C) and one or more computing devices 120, in accordance with various embodiments. While some example features are illustrated, various other features have not been illustrated for the sake of brevity and so as not to obscure pertinent aspects of the example embodiments disclosed herein. To that end, as a non-limiting example, the system 900 can include one or more wearable devices 110 (sometimes referred to as "armbands," "wristbands," "arm-wearable devices," "wrist-wearable devices," or simply "apparatuses"), which can be used in conjunction with one or more computing devices 120. In some embodiments, the system 900 provides the functionality of an artificial-reality device (e.g., virtual-reality device, an augmented-reality device, a mixed-reality device, hybrid reality device, or a combination thereof). In some embodiments, the system 900 includes presentation of a user interface and/or one or more user applications (e.g., games, word processors, messaging applications, calendars, clocks, etc.).

In some embodiments, the system 900 provides the functionality to control or provide commands to the one or more computing devices 120 based on a wearable device 110 determining motor actions or intended motor actions of the user 130 (FIG. 1). A motor action is an intended motor action when before the user performs the motor action or before the user completes the motor action, the detected neuromuscular signals travelling through the neuromuscular pathways can be determined to be responsible for causing the motor action. For example, a motor action as used herein is detected based on a sensed sequences of neuromuscular signals indicating that the user 130 is instructing (or intending) a thumb 220 (FIG. 2) on his or her hand 132 to contact a portion of his or her hand 132.

The wearable device 110 includes a wearable structure worn by the user 130 (e.g., elastic band 820 of FIGS. 8A and 8B; or wearable structure 875 described above in reference to FIG. 8C). In some embodiments, the wearable device 110 collects information about a portion of the user's body (e.g., the user's hand) that can be used as input to perform one or more command the computing device 120. In some embodiments, the collected information about a portion of the user's body (e.g., the user's hand) can be used as input to perform one or more command at the wearable device 110 (e.g., selecting content to present on an electronic display 940 of the wearable device 110 or controlling one or more applications 938 locally stored on the wearable device 110). The information collected about the portion of the user's body include neuromuscular signals that can be used by the one or more processors 920 of the wearable device 110 to determine a motor action that the user intends to perform with their hand (e.g., a sequence of neuromuscular signals indicating that the user 130 is instructing (or intending) a thumb 220 (FIG. 2) on his or her hand 132 to contact a portion of his or her hand 132).

In the illustrated embodiment, the wearable device 110 includes one or more of the one or more processors 920, memory 930, sensors (or plurality of neuromuscular sensors 810), an electronic display 940, a communication interface 945, and a learning module 950. In some embodiments, the memory 930 includes one or more user profiles 932, motor actions 934, user defined gestures 936, and applications 938. The wearable device 110 can include additional components that are not shown in FIG. 9, such as a power source (e.g., an integrated battery, a connection to an external power source), a haptic feedback generator, etc. In some embodiments, one or more of the components shown in FIG. 9 are housed within a capsule (or housing; e.g., capsule portion 895 of FIG. 8C) of the wearable device 110.

In some embodiments, the plurality of neuromuscular sensors 810 include one or more hardware devices (e.g., electrodes) that contact the user's skin and detect neuromuscular signals from neuromuscular pathways under the user's skin 137. The plurality of neuromuscular sensors 810 are configured to detect different neuromuscular signals responsible for causing digit movements, wrist movements, arm movements, thumb movements, hand movements, etc. from the different neuromuscular signals detected from the user's skins 137 (or neuromuscular pathways). In some embodiments, the plurality of neuromuscular sensors 810 are used in pairs to form respective channels for detecting the neuromuscular signals. In some embodiments, the wearable device 110 includes at least six pairs of sensors (e.g., as shown in FIG. 8C).

The one or more processors 920 are configured to receive the neuromuscular signals detected by the plurality of neuromuscular sensors 810 and determine a motor action 934 to be performed based on those detected neuromuscular signals. In some embodiments, each motor action 934 is associated with causing one or more input commands. The input commands when provided to a computing device 120 cause the computing device 120 to perform an action. Alternatively, in some embodiments the one or more input commands can be used to cause the wearable device 110 to perform one or more actions locally (e.g., presented at a display on the electronic display 940, operate one or more applications 938, etc.). For example, the wearable device 110 can be a smartwatch and the one or more input commands can be used to cause the smartwatch to perform one or more actions. In some embodiments, the motor action 934 and its associated input commands are stored in memory 930. In some embodiments, the motor actions 934 can include digit movements, hand movements, wrist movements, arm movements, pinch gestures, thumb movements, hand clenches (or fists), waving motions, and/or other movements of the user's hand or arm.

In some embodiments, the user can define one or more gestures using the learning module 950. Specifically, in some embodiments, the user can enter a training phase in which a user defined gesture is associated with one or more input commands that when provided to a computing devices 120 cause the computing device 120 to perform an action. Similarly, the one or more input commands associated with the user-defined gesture can be used to cause the wearable device 110 to perform one or more actions locally. The user-defined gesture, once trained, is stored in memory 930. Similar to the motor actions 934, the one or more processors 920 can use the detected neuromuscular signals by the plurality of neuromuscular sensors 810 to determine that a user defined gesture was performed by the user.

The one or more applications 938 stored in memory 930 can be productivity-based applications (e.g., calendars, organizers, word processors), social applications (e.g., social platforms, messaging applications, etc.), games, etc. In some embodiments, the one or more applications 938 can be presented to the user via the electronic display 940. In some embodiments, the one or more applications 938 are used to facilitate the transmission of information (e.g., to another application running on a computing device). In some embodiments, the user can provide one or more input commands based on the determined motor action to the applications 938 operating on the wearable device 110 to cause the applications 938 to perform the input commands. Additional information on one or more applications is provided below in reference to applications 970 of the computing device 120.

Additionally, different user profiles 932 can be stored in memory 930. This allows the wearable device 110 to provide user-specific performance. More specifically, the wearable device 110 can be tailored to perform as efficiently as possible for each user.

The communication interface 945 enables input and output to the computing devices 120. In some embodiments, the communication interface 945 is a single communication channel, such as USB. In other embodiments, the communication interface 945 includes several distinct communication channels operating together or independently. For example, the communication interface 945 may include separate communication channels for sending input commands to the computing devices 120 to cause the computing devices 120 to perform one or more actions. In some embodiments, data from the plurality of neuromuscular sensors 810 and/or the determined motor actions are sent to the computing devices 120, which then interprets the appropriate input response based on the received data. The one or more communication channels of the communication interface 945 can be implemented as wired or wireless connections. In some embodiments, the communication interface 945 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

A computing device 120 can present user interfaces to a user. Examples of user-interface content presented within the user interfaces can include images, video, audio, or some combination thereof. Additional examples of user-interface content include executed virtual-reality applications and/or augmented-reality applications to process input data from the neuromuscular sensors 810 on the wearable device 110. In some embodiments, the user-interface content is based on received information from one or more applications 970 (e.g., productivity applications, social applications, games, etc.). Each computing device 120 can include an electronic display 965 for presenting user-interface content to the user. In various embodiments, the electronic display 965 includes a single electronic display 965 or multiple electronic displays 965 (e.g., one display for each eye of a user). The computing device 120 includes a communication interface 975 that enables input and output to other devices in the system, and which also allow the computing device 120 to receive data from the wearable device 110. The communication interface 975 is similar to the communication interface 945.

In some embodiments, the computing device 120 receives instructions (and/or processed or unprocessed neuromuscular signal data) from the wearable device 110. In response to receiving the instructions, the computing device 120 performs one or more actions associated with the instructions (e.g., perform the one or more input commands in an artificial-reality environment). Alternatively, in some embodiments, the computing device 120 receives instructions from an external device communicatively coupled to the wearable device 110 (the external device can be responsible for processing the data collected from sensed sequences or patterns of neuromuscular signals), and in response to receiving the instructions, performs one or more actions associated with the instructions. In some embodiments, the computing device 120 receives instructions from the wearable device 110, and in response to receiving the instructions, provides the instruction to an external device communicatively coupled to the computing device 120 which performs one or more actions associated with the instructions. Although not shown, in the embodiments that include a distinct external device, the external device may be connected to the wearable device 110, and/or the computing device 120 via a wired or wireless connection. The external device may be remote game consoles, additional displays, additional head-mounted displays, and/or any other additional electronic devices that can be could to be coupled in conjunction with the wearable device 110 and/or the computing devices 120.

The computing device 120 can be implemented as any kind of computing device, such as an integrated system-on-a-chip, a microcontroller, a desktop or laptop computer, a server computer, a tablet, a smart phone or other mobile device. Thus, the computing device 120 includes components common to computing devices, such as a processor, random access memory, a storage device, a network interface, an I/O interface, and the like. The processor may be or include one or more microprocessors or application specific integrated circuits (ASICs). The memory 967 may be or include RAM, ROM, DRAM, SRAM and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards, and USB devices.

In the example shown in FIG. 9, the computing device 120 further includes applications 970. In some embodiments, the applications 970 are implemented as software modules that are stored on the storage device and executed by the processor 980. Some embodiments of the computing device 120 includes additional or different components than those described in conjunction with FIG. 9. Similarly, the functions further described below may be distributed among components of the computing device 120 in a different manner than is described here.

Each application 970 is a group of instructions that, when executed by a processor, generates specific content for presentation to the user. For example, applications 970 can include an artificial-reality application that generates virtual-reality content (such as a virtual reality environment) and that further generate artificial-reality content in response to inputs received from the wearable devices 110 (based on determined user motor actions). Examples of artificial-reality applications include gaming applications, conferencing applications, and video playback applications. Additional examples of applications 970 can also include productivity-based applications (e.g., calendars, organizers, word processors, etc.), social-based applications (e.g. social-media platforms, dating platforms, etc.), entertainment (e.g., shows, games, movies, etc.), travel (e.g., ride share applications, hotel applications, airline applications, etc.).

In some embodiments, the computing device 120 allows the applications 970 to operate in conjunction with the wearable device 110. In some embodiments, the computing device 120 receives information from the sensors 118 of the wearable device 110 and provide the information to an application 970. Based on the received information, the application 970 determines user-interface content to provide to the computing device 120 (or the wearable device 110) for presentation to the user via the electronic display 965 and/or a type of haptic feedback. For example, if the computing device 120 receives information from the sensors 118 on the wearable device 110 indicating that the user has performed an action (e.g., performed a sword slash in a game, opened a file, typed a message, etc.), the application 970 generates content for the computing device 120 (or the wearable device 110) to present, the content mirroring the user's instructions based on determined motor actions by the wearable device 110. Similarly, in some embodiments, the applications 970 receive information directly from the sensors 118 on the wearable device 110 (e.g., applications locally saved to the wearable device 110) and provide media content to the computing device 120 for presentation to the user based on the information (e.g., determined motor actions by the wearable device 110)

In some implementations, the computing device 120 includes user profiles 972, motor actions 974, and user-defined gestures 976 stored in memory 967. The user profiles 972, motor actions 974, and user-defined gestures 976 are similar to the user profiles 932, motor actions 934, and user-defined gestures 936 stored in memory 930 of the wearable device 110. The user profiles 972, motor actions 974, and user-defined gestures 976 are used to perform one or more actions at the computing device 120. For example, the computing devices 120, in some embodiments, can perform some of the signal analysis to determine motor actions based on sensed neuromuscular signals. Although not shown, the computing device 120 can further include a learning module similar to the learning module 950 of the wearable device 110 that can be used by the computing devices 120 to allow the user to define one or more gestures.

Figures 10A, 10B:
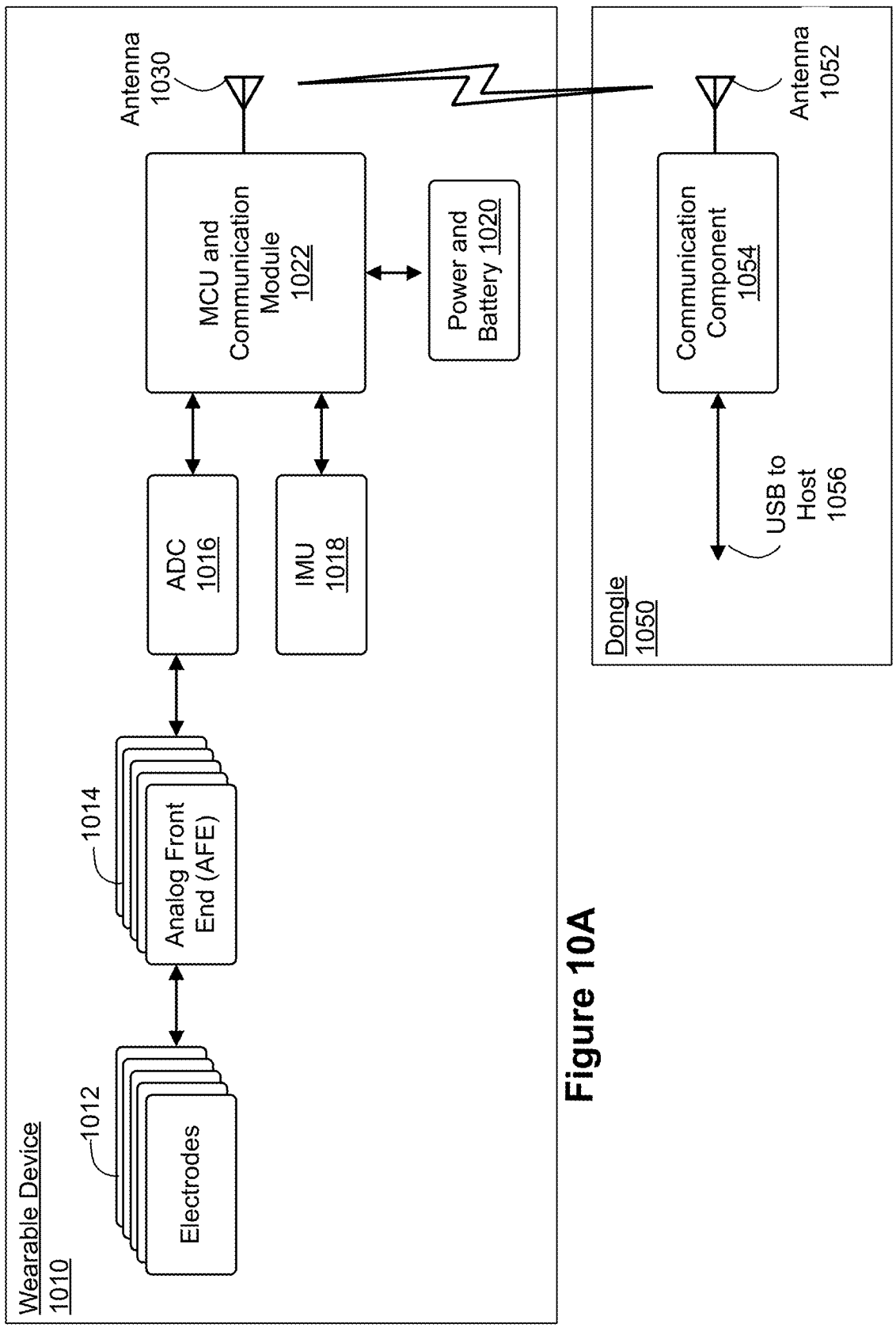
FIGS. 10A and 10B illustrate block diagrams of one or more internal components of an apparatus that includes one or more neuromuscular sensors, in accordance with some embodiments.

FIGS. 10A and 10B illustrate block diagrams of one or more internal components of an apparatus, such as a wearable device 110, that can include one or more neuromuscular sensors 810, such as EMG sensors. The apparatus may include a wearable device 1010, which can be an instance of wearable device 110 described above in reference to FIG. 1, and a dongle portion 1050 (shown schematically in FIG. 10B) that may be in communication with the wearable device 1010 (e.g., using BLUETOOTH or another suitable short range wireless communication technology). In some embodiments, the function of the dongle portion 1050 (e.g., including components similar to those represented schematically by the block diagram of FIG. 10B) is integrated in a device. For example, the function of the dongle portion 1050 may be included within a head-mounted device, allowing the wearable device 1010 to communicate with the head-mounted device (including VR headsets and AR glasses). Alternatively or additionally, in some embodiments, the wearable device 1010 is in communication with integrated communication devices (e.g., BLUETOOTH or another suitable short range wireless communication technology) of with one or more electronic devices, augmented reality systems, computer systems, robots, vehicles, virtual avatars, user interfaces, etc. In some embodiments, the dongle portion 1050 is optional.

FIG. 10A illustrates a block diagram of the wearable device 1010, in accordance with some implementations. In some embodiments, the wearable device 1010 includes one or more sensors 1012, an analog front end 1014, an analog-to-digital converter (ADC) 1016, one or more (optional) inertial measurement unit (IMU) sensor 1018, a microcontroller (MCU) 1022 and communication module (e.g., BLUETOOTH or another suitable short range wireless communication technology), a power supply 1020, and an antenna 1030.

The one or more sensors 1012 can be an instance of the neuromuscular sensors or plurality of neuromuscular sensors 810 described above in reference to FIGS. 8A-8C. In some embodiments, each sensor 1012 includes one or more electrodes for detecting electrical signals originating from a body of a user (i.e., neuromuscular signals). In some embodiments, the sensor signals from the sensors 1012 are provided to the analog front end 1014. In some embodiments, the analog front end 1014 is configured to perform analog processing (e.g., noise reduction, filtering, etc.) of the sensor signals. The processed analog signals are provided to the ADC 1016, which converts the processed analog signals into digital signals. In some embodiments, the digital signals are further processed by one or more central processing units (CPUs), such as the MCU 1022. In some embodiments, the MCU 1022 receives and processes signals from additional sensors, such as IMU sensors 1018 or other suitable sensors. The output of the processing performed by MCU 1022 may be provided to antenna 1030 for transmission to the dongle portion 1050 or other communicatively coupled communication devices.

In some embodiments, the wearable device 1010 includes or receives power from, the power supply 1020. In some embodiments, the power supply 1020 includes a battery module or other power source.

FIG. 10B illustrates a block diagram of the dongle portion 1050, in accordance with some embodiments. The dongle portion 1050 includes one or more of an antenna 1052, a communication component 1054 (e.g., a BLUETOOTH radio (or other receiver circuit), and a device output 1056 (e.g., a USB output).

The antenna 1052 is configured to communicate with the antenna 1030 associated with wearable device 1010. In some embodiments, communication between antennas 1030 and 1052 occur using any suitable wireless technology and protocol, non-limiting examples of which include radiofrequency signaling and BLUETOOTH. In some embodiments, the signals received by antenna 1052 of dongle portion 1050 are received by the communication component 1054, and provided to a host computer (e.g., computing device 120) through the device output 1056 for further processing, display, and/or for effecting control of a particular physical or virtual object or objects.

In some embodiments, the dongle portion 1050 is inserted, via the device output 1056, into a separate computer device (e.g., a laptop, a phone, a computer, tablet, etc.), that may be located within the same environment as the user, but not carried by the user. This separate computer may receive control signals from the wearable device 1010 and further process these signals to provide a further control signal to one or more devices, such as a head-mounted device or other devices identified in FIG. 10A. For example, the control signals provided to the separate computer device may trigger the head-mounted device to modify the artificial reality view or perform one or more commands based on a sequence or a pattern of signals provided by the user (and detected by the one or more sensors 1012). In some embodiments, the dongle portion 1050 (or equivalent circuit in a head-mounted device or other device) may be network enabled, allowing communication with a remote computer (e.g., a server, a computer, etc.) through the network. In some embodiments, the remote computer may provide control signals to the one or more devices to trigger the one or more devices to perform one or more commands (e.g., modify the artificial reality view). In some embodiments, the dongle portion 1050 is inserted into the one or more devices to improve communications functionality. In some embodiments, when the dongle portion 1050 is inserted into the one or more devices, the one or more devices perform further processing (e.g., modification of the AR image) based on the control signal received from the wearable device 1010.

In some embodiments, the dongle portion 1050 is included in the one or more devices (e.g., a head-mounted device, such as an artificial reality headset). In some embodiments, the circuit described above in FIG. 10B is provided by (i.e., integrated within) components of the one or more devices. In some embodiments, the wearable device 1010 communicates with the one or more devices using the described wireless communications, and/or a similar schematic circuit, or a circuit having similar functionality.

Although some examples provided with reference to FIGS. 1-10B are discussed in the context of EMG sensors as the example neuromuscular sensors, examples of neuromuscular sensors can also include, but are not limited to, mechanomyography (MMG) sensors, sonomyography (SMG) sensors, and electrical impedance tomography (EIT) sensors. The approaches described herein may also be implemented in wearable interfaces that communicate with computer hosts through wires and cables (e.g., USB cables, optical fiber cables), in addition to the wireless communication channels described in conjunction with various embodiments herein. Further embodiments also include various subsets of the above embodiments including embodiments in FIGS. 1-10 combined or otherwise rearranged.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of causing performance of commands at a computing device based on neuromuscular signals from thumb-initiated gestures, the method comprising:
   receiving a sequence of neuromuscular signals indicating that a user is instructing a thumb on the user's hand to contact a portion of the user's hand, wherein the portion of the user's hand is associated with at least one input command available at a computing device;
   in response to receiving the sequence of neuromuscular signals indicating that the user is instructing the thumb on the user's hand to contact the portion of the user's hand, providing data to the computing device to cause the computing device to perform the at least one input command;
   receiving a second sequence of neuromuscular signals indicating that the user is instructing the thumb on the user's hand to contact the portion of the user's hand twice, wherein the portion of the user's hand is also associated with a second input command available at the computing device, and the second input command is distinct from the at least one input command; and
   in response to receiving the second sequence of neuromuscular signals indicating that the user is instructing the thumb on the user's hand to contact the portion of the user's hand twice, providing data to the computing device to cause the computing device to perform the second input command.

2. The method of claim 1, further comprising:
   receiving a third sequence of neuromuscular signals indicating that the user is instructing the thumb on the user's hand to contact the portion of the user's hand thrice, wherein the portion of the user's hand is also associated with a third input command available at the computing device, and the third input command is distinct from the at least one input command and the second input command; and
   in response to receiving the third sequence of neuromuscular signals indicating that the user is instructing the thumb on the user's hand to contact the portion of the user's hand thrice, providing data to the computing device to cause the computing device to perform the third input command.

3. The method of claim 1, further comprising:
   receiving another sequence of neuromuscular signals indicating that the user is instructing the thumb on the user's hand to contact a different portion of the user's hand, wherein the different portion of the user's hand is distinct from the portion of the user's hand, and the different portion of the user's hand is associated with an additional input command available at the computing device; and in response to receiving the other sequence of the neuromuscular signals indicating that the user is instructing the thumb on the user's hand to contact the different portion of the user's hand, providing data to the computing device to cause the computing device to perform the additional input command.

4. The method of claim 3, further comprising:

receiving an additional sequence of neuromuscular signals indicating that the user is instructing the thumb on the user's hand to contact the different portion of the user's hand twice, wherein a different portion of the user's hand is also associated with a first additional input command available at the computing device, the first additional input command being distinct from the additional input command; and in response to receiving the additional sequence of neuromuscular signals indicating that the user is instructing the thumb on the user's hand to contact the different portion of the user's hand twice, providing data to the computing device to cause the computing device to perform the first additional input command.

5. The method of claim 4, further comprising:

receiving one more sequence of neuromuscular signals indicating that the user is instructing the thumb on the user's hand to contact the different portion of the user's hand thrice, wherein the different portion of the user's hand is also associated with a second additional input command available at the computing device, the second additional input command being distinct from the additional input command and the first additional input command; and in response to receiving the one more sequence of neuromuscular signals indicating that the user is instructing the thumb on the user's hand to contact the different portion of the user's hand thrice, providing data to the computing device to cause the computing device to perform the second additional input command.

6. The method of claim 3, wherein:

the portion of the user's hand is a palm-side portion of a first finger of the user's hand, and the different portion of the user's hand is a palm-side portion of a second finger of the user's hand.

7. The method of claim 6, wherein:

the portion of the user's hand is a palm-side portion of the first finger that is located above one of a distal phalange of the first finger, an intermediate phalange of the first finger, or a proximal phalange of the first finger, and the different portion of the user's hand is a palm-side portion of the second finger that is located above one of the distal phalange of the second finger, the intermediate phalange of the second finger, or the proximal phalange of the second finger.

8. The method of claim 7, wherein each finger of the user's hand is associated with a different command available at the computing device.

9. The method of claim 1, wherein the at least one input command and the second input command each correspond to typing commands.

10. The method of claim 9, wherein performing the at least one input command at the computing device comprises causing selection of an alphanumeric symbol and updating a user interface presented by the computing device to reflect selection of the alphanumeric symbol.

11. The method of claim 9, wherein performing the at least one input command at the computing device comprises performing an action associated with a modifier key.

12. The method of claim 1, wherein the sequence of neuromuscular signals indicating that the user is instructing the thumb on the user's hand to contact the portion of the user's hand are received without requiring the thumb to make contact with the portion of the user's hand.

13. The method of claim 1, wherein the sequence of neuromuscular signals is processed using a trained statistical model that was determined using stored sequences of neuromuscular signals to determine that the user is instructing the thumb on the user's hand to contact the portion of the user's hand.

14. The method of claim 1, wherein the sequence of neuromuscular signals is received without requiring the user to wear sensors on any part of the user's hand.

15. The method of claim 1, wherein performance of the at least one command at the computing device includes causing a visual change within an artificial-reality interface controlled at least in part by the computing device.

16. The method of claim 15, wherein causing the change within the artificial-reality interface includes causing the visual change within a messaging application available with the artificial-reality interface.

17. The method of claim 1, wherein the portion of the user's hand that is associated with the at least one input command and the portion of the user's hand that is associated with the second input command are a same portion of a finger of the user's hand.

18. The method of claim 17, wherein the same portion of the finger of the user's hand is at least one of a distal phalange portion of the finger, a medial phalange portion of the finger, and a proximal phalange portion of the finger.

19. A wearable device for causing performance of commands at a computing device based on neuromuscular signals from thumb-initiated gestures, the wearable device comprising:

a plurality of electrodes for detecting a sequence of neuromuscular signals indicating that a user is instructing a thumb on the user's hand to contact a portion of the user's hand, wherein the portion of the user's hand is associated with at least one input command available at a computing device; and a processor communicatively coupled with the plurality of electrodes, the processor configured to:

receive the sequence of neuromuscular signals indicating that the user is instructing the thumb on the user's hand to contact a portion of the user's hand; and in response to receiving the sequence of neuromuscular signals indicating that the user is instructing the thumb on the user's hand to contact the portion of the user's hand, provide data to the computing device to cause the computing device to perform the at least one input command;

receive a second sequence of neuromuscular signals indicating that the user is instructing the thumb on the user's hand to contact the portion of the user's hand twice, wherein the portion of the user's hand is also associated with a second input command available at the computing device, and the second input command is distinct from the at least one input command; and in response to receiving the second sequence of neuromuscular signals indicating that the user is instructing the thumb on the user's hand to contact the portion of the user's hand twice, provide data to the computing device to cause the computing device to perform the second input command.

20. A system for performing commands at a computing device based on neuromuscular signals from thumb-initiated gestures detected by a wearable device, the system comprising:
- a wearable device, the wearable device including:
  - a plurality of electrodes for detecting a sequence of neuromuscular signals indicating that a user is instructing a thumb on the user's hand to contact a portion of the user's hand, wherein the portion of the user's hand is associated with at least one input command available at a computing device; and
  - a processor communicatively coupled with the plurality of electrodes, the processor configured to:
    - receive the sequence of neuromuscular signals indicating that the user is instructing the thumb on the user's hand to contact a portion of the user's hand; and
    - in response to receiving the sequence of neuromuscular signals indicating that the user is instructing the thumb on the user's hand to contact the portion of the user's hand, 6 Response to Final Office Action provide data to the computing device to cause the computing device to perform the at least one input command;
    - receive a second sequence of neuromuscular signals indicating that the user is instructing the thumb on the user's hand to contact the portion of the user's hand twice, wherein the portion of the user's hand is also associated with a second input command available at the computing device, and the second input command is distinct from the at least one input command; and
    - in response to receiving the second sequence of neuromuscular signals indicating that the user is instructing the thumb on the user's hand to contact the portion of the user's hand twice, provide data to the computing device to cause the computing device to perform the second input command; and
- the computing device configured to receive the data and perform the at least one input command and the second input command, respectively, within a user interface generated at least in part by the computing device.

* * * * *